(12) United States Patent
Francis et al.

(10) Patent No.: US 12,705,557 B2
(45) Date of Patent: Aug. 11, 2026

(54) INTEGRATING VEHICLE DATA FOR PROVIDER AND PERSONAL RENTAL VEHICLES INTO A VEHICLE-FLEET PLATFORM AND FLEET MANAGEMENT INTERFACE

(71) Applicant: Lyft, Inc., San Francisco, CA (US)

(72) Inventors: Youssef Francis, San Francisco, CA (US); Christopher Patrick Cunningham, Miami, FL (US); Mark Leslie Snyder, Oakland, CA (US); Evan Scott Madow, San Francisco, CA (US); Stephen Joseph Calvillo, San Francisco, CA (US); Derek John Knapp, San Francisco, CA (US); Gordon Dee Tindall, Los Angeles, CA (US); Keith Amir Abdulla, San Francisco, CA (US); Victor Steven Gallet, San Mateo, CA (US); Refael Zikavashvili, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 86 days.

(21) Appl. No.: 17/138,658

(22) Filed: Dec. 30, 2020

(65) Prior Publication Data

US 2022/0207450 A1 Jun. 30, 2022

(51) Int. Cl.
*G06Q 10/0631* (2023.01)
*G06F 3/0482* (2013.01)
(Continued)

(52) U.S. Cl.
CPC ..... *G06Q 10/06315* (2013.01); *G06F 3/0482* (2013.01); *G06F 16/2455* (2019.01);
(Continued)

(58) Field of Classification Search
None
See application file for complete search history.

(56) References Cited

U.S. PATENT DOCUMENTS 4,815,190 A 3/1989 Haba, Jr. et al.
6,324,749 B1 12/2001 Katsuura et al.
(Continued)

FOREIGN PATENT DOCUMENTS

DE 102016107091 A1 11/2016
JP 5777373 B2 9/2015
(Continued)

OTHER PUBLICATIONS

"How HyreCar Works." Retrieved from [URL: https://web.archive.org/web/20200713184448/https://www.hyrecar.com/howitworks] on Nov. 20, 2024, Archived on Jul. 13, 2020. (Year: 2020).*
(Continued)

*Primary Examiner* — Susanna M. Diaz
(74) *Attorney, Agent, or Firm* — Keller Preece PLLC

(57) ABSTRACT

The present disclosure relates to systems, non-transitory computer-readable media, and methods for receiving and integrating vehicle data for a fleet of different types of rental vehicles from across different databases to generate vehicle-data summaries for such rental vehicles—as well as for surfacing tools for dispatch, service, and other vehicle managing functions. In some cases, the disclosed systems further identifies and integrates service data from vehicle service centers associated with the rental vehicles into a central database and into the vehicle-data summaries. Such a fleet of rental vehicles can include personal-rental vehicles, provider-rental vehicles—such as express-provider-rental vehicles and flexible-provider-rental vehicles—as well as third-party-rental vehicles. By integrating service, renter, or other vehicle data for disparate rental vehicles into a consolidated vehicle-fleet-platform database, for instance, the
(Continued)

disclosed systems can display and sort vehicle-data summaries in a centralized fleet management interface.

20 Claims, 22 Drawing Sheets

(51) Int. Cl.
*G06F 16/2455* (2019.01)
*G06Q 10/02* (2012.01)
*G06Q 10/10* (2023.01)
*G06Q 10/20* (2023.01)
*G06Q 30/0645* (2023.01)
*G06Q 50/40* (2024.01)
*G07C 5/00* (2006.01)
*H04L 67/12* (2022.01)

(52) U.S. Cl.
CPC ............. *G06Q 10/10* (2013.01); *G06Q 10/20* (2013.01); *G06Q 30/0645* (2013.01); *G06Q 50/40* (2024.01); *G07C 5/006* (2013.01); *G07C 5/008* (2013.01); *H04L 67/12* (2013.01); *G06Q 10/02* (2013.01); *G06Q 2240/00* (2013.01)

(56) References Cited

U.S. PATENT DOCUMENTS 6,772,027 B2 8/2004 Kurihara
8,849,685 B2 9/2014 Oden
8,949,028 B1 2/2015 Klampfl et al.
9,940,596 B1 4/2018 Briggs et al.
10,096,176 B1 * 10/2018 Namineni .............. G07C 5/008
10,185,921 B1 1/2019 Heller et al.
10,423,934 B1 * 9/2019 Zanghi ............... G06Q 10/1097
10,708,277 B2 7/2020 Thorley et al.
10,796,248 B2 10/2020 Liu et al.
10,895,463 B1 1/2021 Cope et al.
11,402,223 B1 8/2022 Grealish-Rust et al.
2002/0082814 A1 6/2002 Doner
2002/0152615 A1 10/2002 Kurihara
2005/0073434 A1 4/2005 Arquette et al.
2005/0089053 A1 4/2005 Zhu
2005/0257358 A1 11/2005 Giarrizzo, Jr.
2007/0050221 A1 3/2007 Singh et al.
2008/0010107 A1 1/2008 Small et al.
2008/0133283 A1 6/2008 Backer et al.
2009/0106036 A1 4/2009 Tamura et al.
2010/0293030 A1 11/2010 Wu
2011/0060480 A1 * 3/2011 Mottla ............... G07C 9/00309 701/2
2011/0314665 A1 12/2011 Kilibarda
2013/0238167 A1 9/2013 Stanfield et al.
2013/0318002 A1 11/2013 Tomiyama et al.
2014/0129301 A1 * 5/2014 Van Wiemeersch ... G07B 15/02 705/13
2015/0206206 A1 * 7/2015 Puente ............... G06Q 30/0645 705/307
2016/0078695 A1 3/2016 McClintic et al.
2016/0093216 A1 * 3/2016 Lee ....................... H04W 4/029 340/870.11
2016/0140649 A1 5/2016 Kleve et al.
2016/0298977 A1 10/2016 Newlin et al.
2016/0352113 A1 12/2016 Zhao et al.
2016/0364678 A1 12/2016 Cao
2017/0153624 A1 6/2017 Cameron
2017/0316535 A1 * 11/2017 Hirose ................... G06Q 50/40
2018/0253700 A1 9/2018 Coquillette et al.
2018/0276595 A1 9/2018 Gariepy et al.
2019/0025856 A1 * 1/2019 Turato .................. H04L 9/3234
2019/0057335 A1 2/2019 Dyer
2019/0080274 A1 3/2019 Kovach et al.
2019/0139258 A1 5/2019 Slattery et al.
2019/0318549 A1 * 10/2019 Zeira ...................... G07C 5/006
2020/0111268 A1 4/2020 Montague et al.
2020/0132480 A1 4/2020 Majima et al.
2020/0258018 A1 * 8/2020 Brady .............. G06Q 10/06315
2020/0273333 A1 8/2020 Elshenawy et al.
2020/0342418 A1 10/2020 Zatta et al.
2020/0342419 A1 10/2020 Zatta et al.
2020/0342420 A1 10/2020 Zatta et al.
2020/0356909 A1 11/2020 Tan et al.
2020/0394623 A1 * 12/2020 Gardner ............... G06Q 20/405
2021/0101563 A1 * 4/2021 Azarko ................. B60R 25/241
2021/0304153 A1 9/2021 Calvillo et al.
2022/0333936 A1 10/2022 Schirano

FOREIGN PATENT DOCUMENTS

KR 10-2016-0103376 A 9/2016
WO WO-2004001643 A1 * 12/2003 ............. G06Q 10/10
WO 2004-059446 A2 7/2004
WO 2005-124699 A1 12/2005
WO WO 2012-157343 A1 11/2012
WO 2013-061289 A1 5/2013
WO 2013-177087 A2 11/2013
WO 2017-205961 A1 12/2017
WO 2018-102475 A1 6/2018

OTHER PUBLICATIONS

"HyreCar Provides Corporate Update and New Insurance Partnership with Lloyd's Apollo Insurance Syndicate." Business Wire, Jun. 16, 2020. (Year: 2020).*
"HyreCar Deploys Mobile App w/Identity Verification." Online Product News, 38.4 Worldwide Videotex, Apr. 1, 2019. (Year: 2019).*
"Introducing: Mobile Service from Lyft." Retrieved from [URL: https://www.lyft.com/hub/posts/introducing-mobile-service] on Sep. 30, 2025, Published on Apr. 17, 2019. (Year: 2019).*
English Translation of Sumino et al. (WO-2004001643-A1). (Year: 2004).*
Nam, D., Yang, D., An, S., Yu, JG, Jayakrishnan, R., & Masoud, N. (2018). Designing a Transit-Feeder System using Multiple Sustainable Modes: Peer-to-Peer (P2P) Ridesharing, Bike Sharing, and Walking. Transportation Research Record, 2672(8), 754- 763. http://dx.doi.org/10.1177/0361198118799031 (Year: 2018).
U.S. Appl. No. 16/727,773, filed Mar. 13, 2023, Office Action.
U.S. Appl. No. 16/727,746, filed May 24, 2023, Office Action.
U.S. Appl. No. 16/834,977, filed Jun. 5, 2023, Office Action.
International Search Report and Written Opinion as received in PCT/US2020/030297 dated Aug. 12, 2020.
U.S. Appl. No. 16/727,773, filed Sep. 6, 2022, Office Action.
U.S. Appl. No. 16/727,746, filed Nov. 22, 2022, Office Action.
Bhadra, Dipasis, David A. Knorr, and Benjamin Levy. "Benefits of virtual queuing at congested airports using ASDE-X: A case study of JFK airport." Air Traffic Control Quarterly 20.3 (2012): 225-251.
U.S. Appl. No. 16/727,715, filed Aug. 17, 2023, Office Action.
U.S. Appl. No. 16/727,746, filed Dec. 12, 2023, Office Action.
U.S. Appl. No. 16/834,977, filed Nov. 29, 2023, Office Action.
U.S. Appl. No. 16/834,977, filed Mar. 28, 2024, Office Action.
U.S. Appl. No. 16/727,715, filed Apr. 24, 2024, Office Action.
U.S. Appl. No. 16/727,746, filed Jul. 25, 2024, Office Action.
U.S. Appl. No. 16/727,715, filed Sep. 4, 2024, Notice of Allowance.
U.S. Appl. No. 16/834,977, filed Feb. 26, 2025, Notice of Allowance.
U.S. Appl. No. 16/834,977, filed Oct. 22, 2024, Office Action.
U.S. Appl. No. 19/989,930, filed Dec. 17, 2025, Office Action.

* cited by examiner

Figure 5:
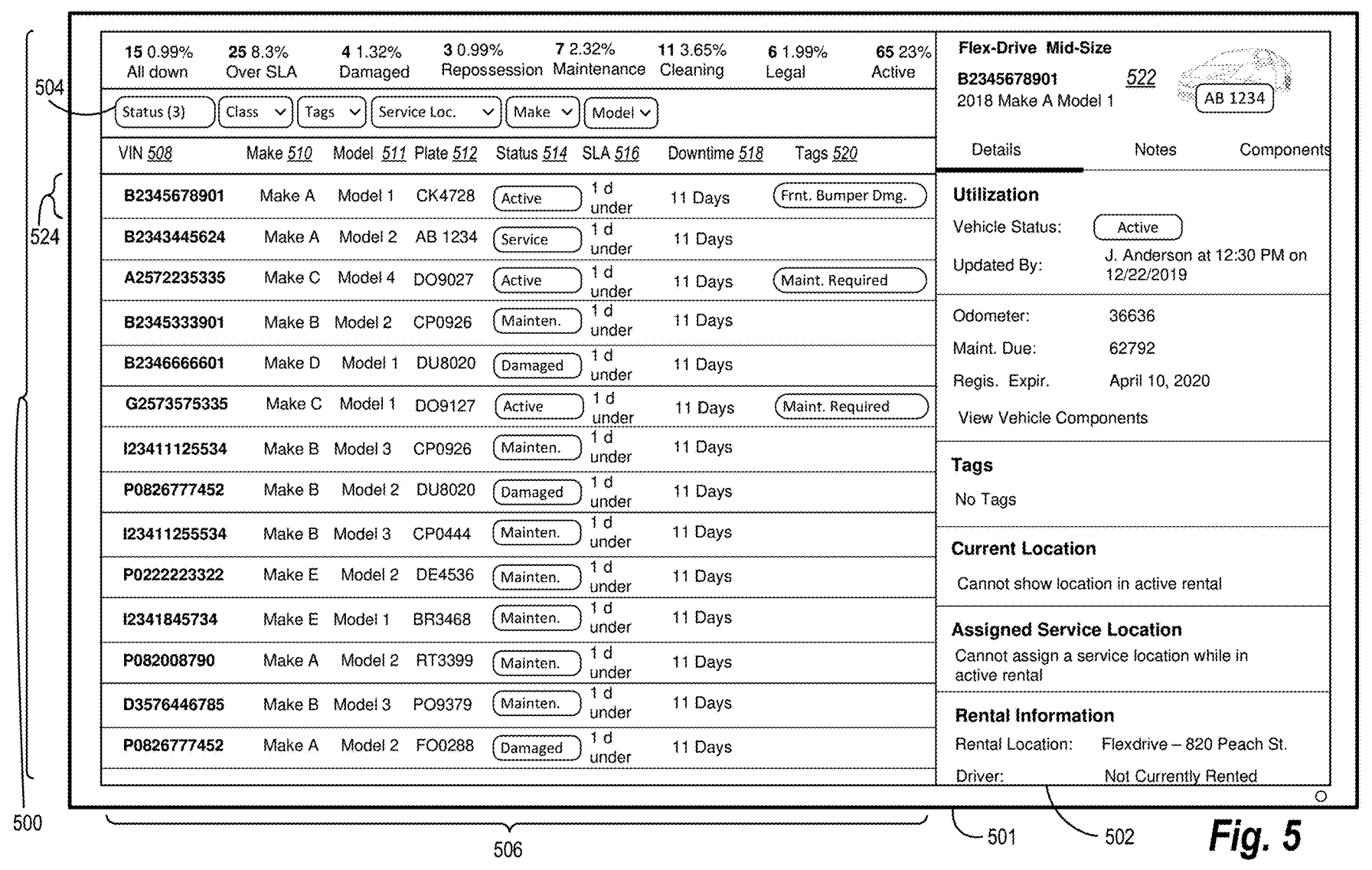

500

504

524

15 0.99% All down | 25 8.3% Over SLA | 4 1.32% Damaged | 3 0.99% Repossession | 7 2.32% Maintenance | 11 3.65% Cleaning | 6 1.99% Legal | 65 23% Active Status (3) | Class | Tags | Service Loc. | Make | Model

| VIN 508 | Make 510 | Model 511 | Plate 512 | Status 514 | SLA 516 | Downtime 518 | Tags 520 |
|---|---|---|---|---|---|---|---|
| **B2345678901** | Make A | Model 1 | CK4728 | Active | 1 d under | 11 Days | Frnt. Bumper Dmg. |
| **B2343445624** | Make A | Model 2 | AB 1234 | Service | 1 d under | 11 Days | |
| **A2572235335** | Make C | Model 4 | DO9027 | Active | 1 d under | 11 Days | Maint. Required |
| **B2345333901** | Make B | Model 2 | CP0926 | Mainten. | 1 d under | 11 Days | |
| **B2346666601** | Make D | Model 1 | DU8020 | Damaged | 1 d under | 11 Days | |
| **G2573575335** | Make C | Model 1 | DO9127 | Active | 1 d under | 11 Days | Maint. Required |
| **I23411125534** | Make B | Model 3 | CP0926 | Mainten. | 1 d under | 11 Days | |
| **P0826777452** | Make B | Model 2 | DU8020 | Damaged | 1 d under | 11 Days | |
| **I23411255534** | Make B | Model 3 | CP0444 | Mainten. | 1 d under | 11 Days | |
| **P0222223322** | Make E | Model 2 | DE4536 | Mainten. | 1 d under | 11 Days | |
| **I2341845734** | Make E | Model 1 | BR3468 | Mainten. | 1 d under | 11 Days | |
| **P082008790** | Make A | Model 2 | RT3399 | Mainten. | 1 d under | 11 Days | |
| **D3576446785** | Make B | Model 3 | PO9379 | Mainten. | 1 d under | 11 Days | |
| **P0826777452** | Make A | Model 2 | FO0288 | Damaged | 1 d under | 11 Days | |

Flex-Drive Mid-Size
B2345678901 522
2018 Make A Model 1
AB 1234

Details | Notes | Components

Utilization
Vehicle Status: Active
Updated By: J. Anderson at 12:30 PM on 12/22/2019

Odometer: 36636
Maint. Due: 62792
Regis. Expir. April 10, 2020
View Vehicle Components

Tags
No Tags

Current Location
Cannot show location in active rental

Assigned Service Location
Cannot assign a service location while in active rental

Rental Information
Rental Location: Flexdrive – 820 Peach St.
Driver: Not Currently Rented 506 501 502

Location Manager

Choose a region

| Region ID 702 | Hubs 704 | Vehicle Service 706 | Express Drive 708 | Rental Lots 710 | Impound Lots 712 | Storage Facilities 714 | Miscellaneous 716 |
|---|---|---|---|---|---|---|---|
| PHI | 1 | 1 | 1 | 0 | 0 | 0 | 39 |
| PHX | 1 | 1 | 2 | 0 | 0 | 0 | 12 |
| PIT | 1 | 0 | 1 | 0 | 0 | 0 | 10 |
| PVD | 1 | 0 | 1 | 0 | 0 | 0 | 6 |
| RDU | 0 | 0 | 1 | 0 | 0 | 0 | 0 |
| RIC | 0 | 0 | 2 | 0 | 0 | 0 | 0 |
| RNO | 1 | 0 | 0 | 0 | 0 | 0 | 0 |
| SAN | 1 | 1 | 1 | 0 | 0 | 0 | 8 |
| SAT | 1 | 0 | 1 | 0 | 0 | 0 | 11 |
| SEA | 2 | 0 | 3 | 0 | 0 | 0 | 12 |
| SFO | 1 | 2 | 3 | 0 | 0 | 0 | 14 |
| SLC | 0 | 0 | 1 | 0 | 0 | 0 | 0 |

Location Manager

Choose a region 722

Lyft Locations Service Locations 724

Queues Services Show Disabled Locations

727

| Location Name 726 | Type 728 | Queues 730 | Address 732 | Services 734 | |
|---|---|---|---|---|---|
| Lyft Collision Center – San Carlos | Lyft | Vehicle Service | 171 Industrial Road | Collision | Go to queue |
| Lyft Collision Center – San Francisco | Lyft | Vehicle/Mobile Service | 615 Bayshore Rd | Maint. , Service | Go to queue |
| Lyft HQ Compliance Pop-Up | Lyft | Hub | 185 Berry St | | Go to queue |
| Oakland – Flexdrive – 1699 W Grand Ave | Lyft | Hub Express Drive | 1699 W Grand St | Hub | Go to queue |
| San Francisco – Hertz – 1320 San Mateo Ave | Third-Party | Express Drive | 1320 San Mateo Ave | | Go to queue |
| San Francisco – Hertz – 30085 Industry Pkwy | Third-Party | Express Drive | 30085 Industry Pkwy | | Go to queue |
| Oakland – Collision Center – 1222 W Frost Ave | Lyft | Hub Express Drive | 1222 W Frost Ave | Hub | Go to queue |
| San Francisco – Rental Center – 123 Apple St | Third-Party | Express Drive | 123 Apple St | | Go to queue |
| San Francisco – Rental Center – 928 Gold St | Third-Party | Express Drive | 928 Gold St | | Go to queue |

Figure 7C:
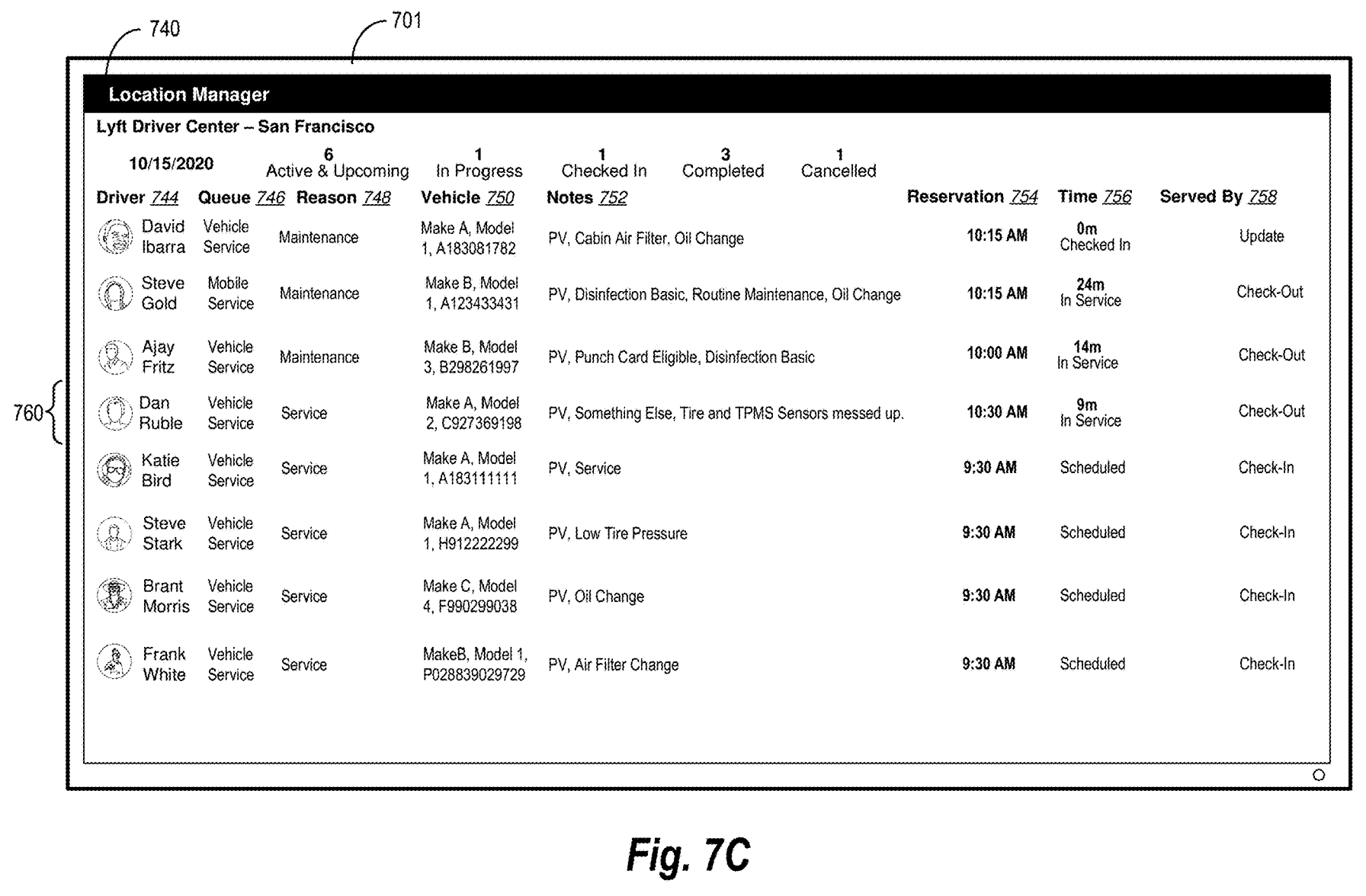

Location Manager

Lyft Driver Center – San Francisco

| **10/15/2020** | 6 Active & Upcoming | 1 In Progress | 1 Checked In | 3 Completed | 1 Cancelled |
|---|---|---|---|---|---|

| Driver 744 | Queue 746 | Reason 748 | Vehicle 750 | Notes 752 | Reservation 754 | Time 756 | Served By 758 |
|---|---|---|---|---|---|---|---|
| David Ibarra | Vehicle Service | Maintenance | Make A, Model 1, A183081782 | PV, Cabin Air Filter, Oil Change | 10:15 AM | 0m Checked In | Update |
| Steve Gold | Mobile Service | Maintenance | Make B, Model 1, A123433431 | PV, Disinfection Basic, Routine Maintenance, Oil Change | 10:15 AM | 24m In Service | Check-Out |
| Ajay Fritz | Vehicle Service | Maintenance | Make B, Model 3, B298261997 | PV, Punch Card Eligible, Disinfection Basic | 10:00 AM | 14m In Service | Check-Out |
| Dan Ruble | Vehicle Service | Service | Make A, Model 2, C927369198 | PV, Something Else, Tire and TPMS Sensors messed up. | 10:30 AM | 9m In Service | Check-Out |
| Katie Bird | Vehicle Service | Service | Make A, Model 1, A183111111 | PV, Service | 9:30 AM | Scheduled | Check-In |
| Steve Stark | Vehicle Service | Service | Make A, Model 1, H912222299 | PV, Low Tire Pressure | 9:30 AM | Scheduled | Check-In |
| Brant Morris | Vehicle Service | Service | Make C, Model 4, F990299038 | PV, Oil Change | 9:30 AM | Scheduled | Check-In |
| Frank White | Vehicle Service | Service | MakeB, Model 1, P028839029729 | PV, Air Filter Change | 9:30 AM | Scheduled | Check-In |

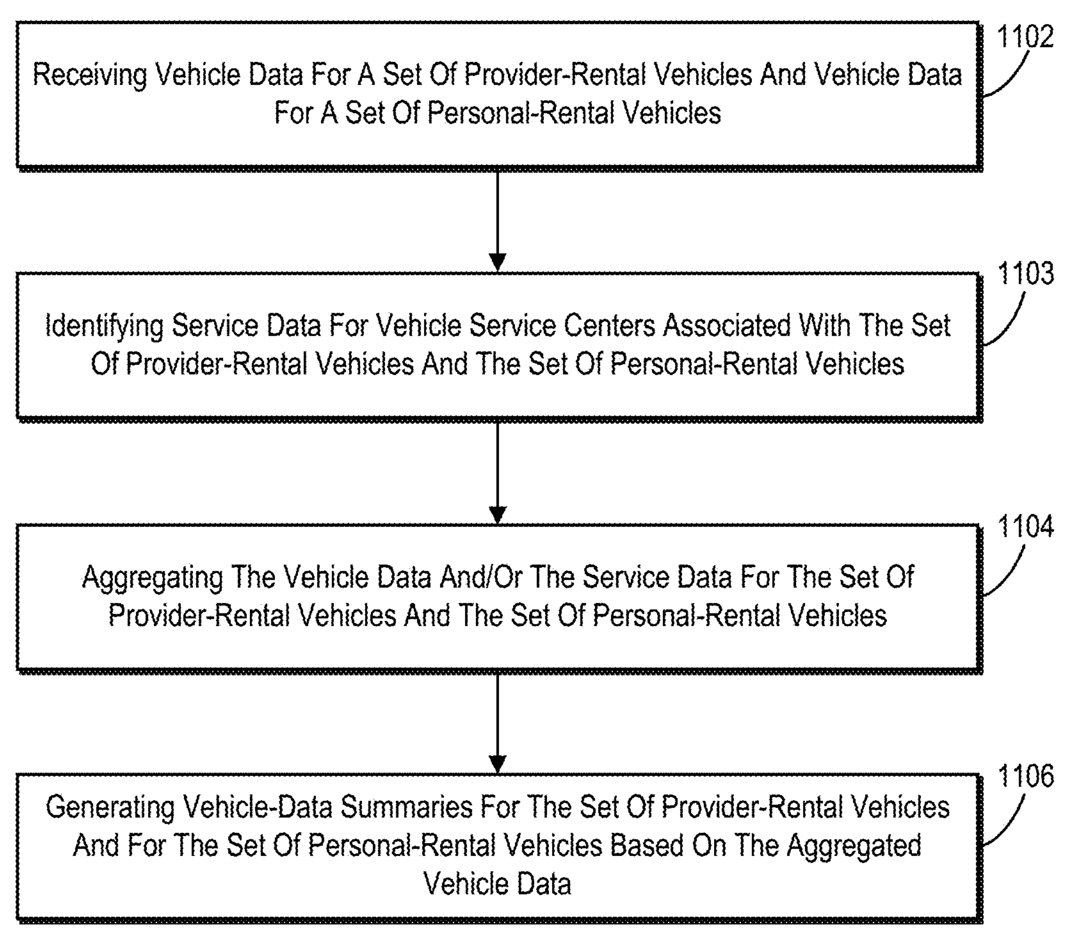
*Fig. 11*

INTEGRATING VEHICLE DATA FOR PROVIDER AND PERSONAL RENTAL VEHICLES INTO A VEHICLE-FLEET PLATFORM AND FLEET MANAGEMENT INTERFACE

BACKGROUND

In recent years, rental-vehicle-computing systems have developed and implemented computing tools for managing different rental vehicles. Indeed, the proliferation of web and mobile applications enable requesting computing devices to remotely submit rental requests for use of various rental vehicles. Many such rental-vehicle-computing systems can organize rental vehicle information for different types of rental vehicles in separate systems that can use different digital protocols to communicate with vehicles' computing devices, such as separate and disconnected databases or servers dedicated to differing services.

Although conventional rental-vehicle-computing systems can organize rental vehicle information in a variety of separate systems, conventional systems often face a number of technical problems, particularly with regard to efficiency and accuracy. In particular, conventional rental-vehicle-computing systems inefficiently organize and separate vehicle information into a variety of separate systems. To illustrate, rental-vehicle-computing systems often execute servers or software platforms isolated from other computing devices (or other software platforms) hosting services that receive and manage vehicle information corresponding to rental vehicles. For example, some rental-vehicle-computing systems use one software platform to manage rental vehicle pick-ups and drop-offs and another separate software platform to manage rental vehicle maintenance services and/or rental locations.

Because of such isolated software platforms or other disassociated system components, many conventional rental-vehicle-computing systems execute separate software applications with different and disconnected graphical user interfaces that confuse users. For instance, some rental-vehicle-computing systems deploy one software application for managing repairs or services of rental vehicles, another software application for reservations, and link to yet another software application for affiliated third party vehicles, where each software application uses separate graphical user interfaces and separate data. By deploying separate software applications and corresponding graphical user interfaces, conventional rental-vehicle-computing systems force users to navigate and interact with isolated menus, options, and other user-interface tools to locate or present various rental vehicle information. Such excessive interactions and navigation can consume more computing resources than necessary or practical for conventional rental-vehicle-computing systems.

In addition to inefficient user navigation and user interactions, many conventional rental-vehicle-computing systems present incomplete (or even inaccurate) rental vehicle information fetched from an isolated database or software platform. As mentioned, conventional rental-vehicle-computing systems often interact with a variety of isolated computing devices utilizing a variety of different systems, including isolated databases or software platforms for rentals, vehicle servicing, etc. Because of such isolation, many conventional systems can access and present only an incomplete or siloed snapshot of rental vehicle information.

SUMMARY

This disclosure describes embodiments of systems, non-transitory computer-readable media, and methods that provide benefits and/or solve one or more of the foregoing or other problems in the art. For example, the disclosed systems can receive and integrate vehicle data for a fleet of different types of rental vehicles—and/or service data from vehicle service centers associated with such rental vehicles—from across different databases into a central platform. Based on one or both of the integrated vehicle data and service data, the disclosed systems generate vehicle-data summaries for such rental vehicles as well as generate and display surface tools for dispatch, service, and other vehicle managing functions. Such a fleet of rental vehicles can include personal-rental vehicles, provider-rental vehicles, such as express-provider-rental vehicles and flexible-provider-rental vehicles—as well as third-party-rental vehicles. By integrating service, renter, or other vehicle data for disparate rental vehicles into a consolidated vehicle-fleet-platform database, the disclosed systems can display and sort vehicle-data summaries in a centralized fleet management interface.

From within such a fleet management interface, the disclosed systems can sort disparate rental vehicles or renters according to historical data, vehicle manufacturing information, usage data, service status, or other criteria. In addition to sorting, the disclosed systems can further utilize the vehicle-fleet-platform database and fleet management interface to schedule or aggregate various appointment schedules for rental pickup or drop-off and vehicle servicing at either a vehicle service center or on site at a vehicle's location using mobile services. Upon reservation or schedule, the disclosed systems can provide a virtual code, including a near field communication code, to a renter computing device and facilitate exchange of the virtual code with a rental vehicle at a rental location to enable contactless pick-up.

BRIEF DESCRIPTION OF THE DRAWINGS

The detailed description provides one or more embodiments with additional specificity through the use of the accompanying drawings, as briefly described below.

FIG. 5 illustrates a computing device presenting an example fleet management interface in accordance with one or more embodiments.

FIGS. 7A-7C illustrate a computing device presenting example fleet-location-management interfaces in accordance with one or more embodiments.

FIG. 11 illustrates a flowchart of a series of acts in a method of generating vehicle-data summaries for a set of provider-rental vehicles and for a set of personal-rental vehicles based on aggregated vehicle data in accordance with one or more embodiments.

DETAILED DESCRIPTION

Figure 1:
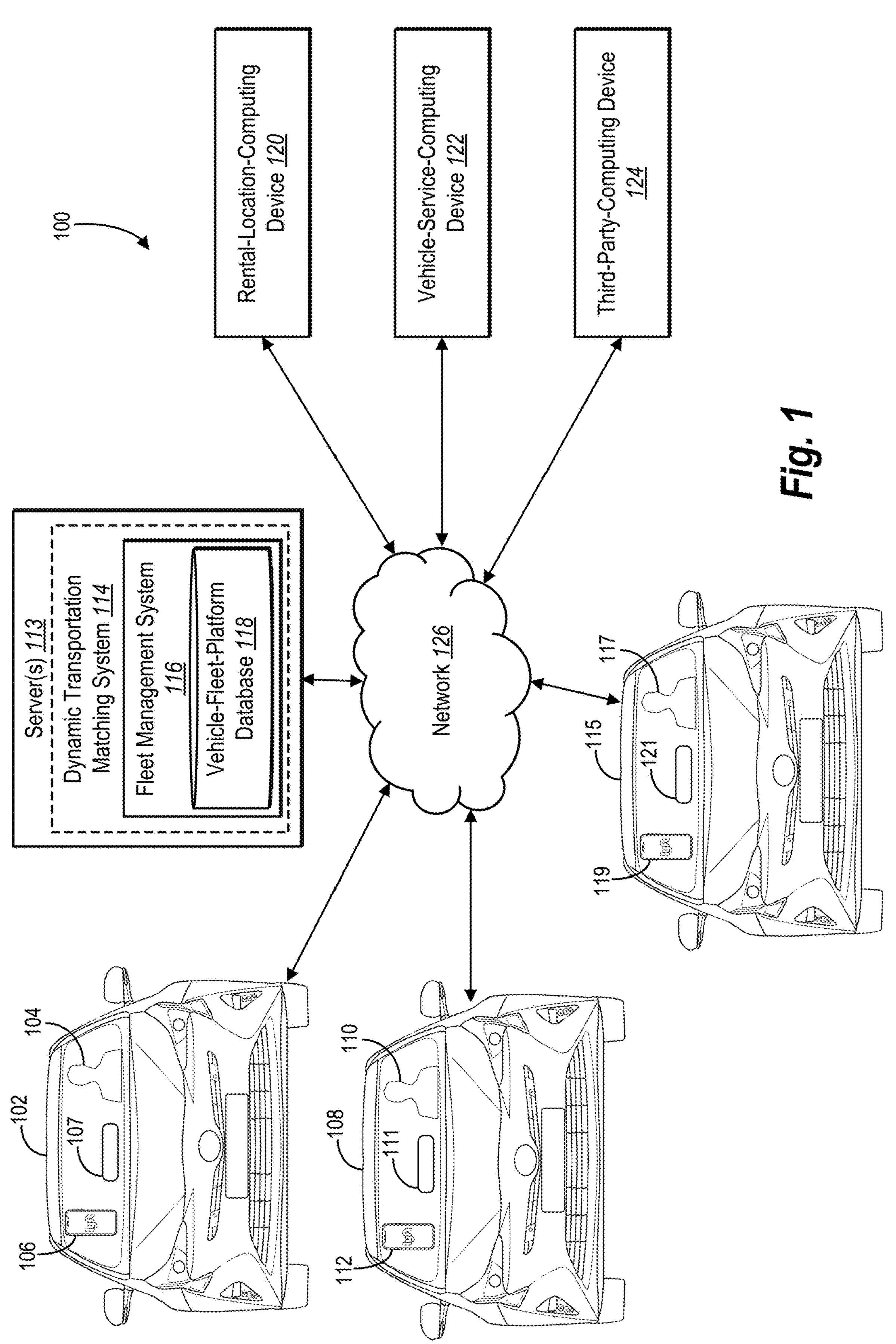
FIG. 1 illustrates a diagram of an environment in which a fleet management system can operate in accordance with one or more embodiments.

This disclosure describes one or more embodiments of a fleet management system that receives and integrates vehicle data for a fleet of different types of rental vehicles—and/or service data from vehicle service centers associated with such rental vehicles—from across different databases into a central platform. Based on one or both of the integrated vehicle data and service data, the fleet management system generates vehicle-data summaries or surface management tools for such rental vehicles in graphical user interfaces. By surfacing summaries or tools in an integrated user interface, the fleet management system can facilitate the dispatch, scheduling, and service of a variety of rental vehicles from a fleet. Such a fleet of rental vehicles can include personal-rental vehicles, provider-rental vehicles—including express-provider-rental vehicles and flexible-provider-rental vehicles—as well as third-party-rental vehicles. By integrating service, renter, or other vehicle data for disparate rental vehicles into a consolidated vehicle-fleet-platform database, the disclosed systems can display and sort vehicle-data summaries in a centralized fleet management interface.

As indicated above, the fleet management system can receive vehicle data for provider-rental vehicles used in part for transporting transportation requestors according to a provider-use rental and vehicle data for personal-rental vehicles operated by a renter according to a personal-use rental. The fleet management system can further aggregate the vehicle data for both the provider-rental vehicles and the personal-rental vehicles into a vehicle-fleet-platform database. In some cases, the fleet management system further identifies (and aggregates into the vehicle-fleet-platform database) service data for vehicle service centers associated with the provider-rental vehicles and the personal-rental vehicles. Based on one or both of the aggregated vehicle data and the aggregated service data, the fleet management system generates vehicle-data summaries for display within the fleet management interface. Such vehicle-data summaries may include or correspond to service information from the service data. Using the vehicle data or the vehicle-data summaries, the fleet management system can further organize or sort the vehicle-data summaries or other data within the fleet management interface based on user selection of selectable criteria.

When or while integrating vehicle data, in one or more embodiments, the fleet management system receives vehicle data from a variety of computing devices. For example, the fleet management system receives vehicle data from either first-party or third-party computing devices for corresponding rental vehicles. Independent of whether the rental vehicles are first or third party, in one or more embodiments, the fleet management system receives vehicle data from computing devices associated with rental vehicles, including renter computing devices, vehicle-service-computing devices at fleet-vehicle centers, and/or rental-location-computing devices. More directly, in some embodiments, the fleet management system receives vehicle data from in-vehicle-computing devices, including telematics devices.

From these and other computing devices, the fleet management system receives and aggregates a variety of vehicle data into a vehicle-fleet-platform database. To illustrate, in one or more embodiments, the fleet management system receives and aggregates rental data, such as renter history, pickup history, and/or drop-off history. Independent or together with such rental data, in one or more embodiments, the fleet management system dynamically aggregates vehicle data representing service status of fleet vehicles or vehicle history, including vehicle service history, vehicle transportation history, or vehicle mileage. In some embodiments, the fleet management system also aggregates vehicle data corresponding to a particular vehicle, such as data for a vehicle manufacturer, vehicle model, vehicle identification number ("VIN"), and/or vehicle warranty.

After or while aggregating such vehicle data, in some cases, the fleet management system utilizes the fleet-vehicle database to manage a fleet-vehicle center. To illustrate, in one or more embodiments, the fleet management system can schedule service appointments based on availability of a fleet-vehicle center, vehicle parts, and transportation schedule of a vehicle. Further, in one or more embodiments, the fleet management system sends navigation instructions to fleet vehicles to travel to particular tracks of a fleet-vehicle center based on scheduled appointments.

Independent of the type of vehicle data aggregated into the vehicle-fleet-platform database, as noted above, the fleet management system can generate vehicle-data summaries based on such data. To illustrate, vehicle-data summaries can include vehicle data corresponding to a particular fleet vehicle or a corresponding renter or account. In one or more embodiments, the fleet management system further updates vehicle-data summaries utilizing new vehicle data received from the various computing devices and/or various systems. For instance, upon a change in rental-type status, the fleet management system can updating a vehicle-data summary for a personal-rental vehicle operated by a renter according to a personal-use rental to become a provider-rental vehicle for use transporting transportation requestors according to a provider-use rental (or vice versa).

Additionally, in one or more embodiments, the fleet management system provides the vehicle-data summaries for display in a fleet management interface. In some embodiments, the fleet management system provides the vehicle-data summaries to various computing devices (e.g. rental-location computing devices, vehicle-service computing devices, third-party computing devices) for presentation as rows in a table within the fleet management interface. In some embodiments, the fleet management interface includes selectable elements corresponding to various columns corresponding to categories of vehicle data to dynamically organize or sort vehicle-data summaries within the fleet management interface.

In addition to data first-party-rental vehicles for personal or transportation provider use, the fleet management system can integrate third-party-rental vehicles into the vehicle-fleet-platform database. To illustrate, the fleet management system can generate a vehicle-fleet-platform database by aggregating vehicles and vehicle data from both third-party and first-party systems. In addition to aggregating first-party and third-party associations of fleet vehicles, the fleet management system can manage and dynamically modify available corresponding personal or provider rental statuses.

Upon assigning or reserving a renter to a particular rental vehicle, in some embodiments, the fleet management system facilitates pick up or drop off of such a rental vehicle, including contactless pick-up and/or drop-off. To illustrate, in one or more embodiments, the fleet management system provides a virtual key to a renter computing device to facilitate contactless pickup of a rental vehicle. Additionally, in one or more embodiments, the fleet management system sends navigation instructions to a renter computing device to a rental location for pickup and/or drop-off of a rental vehicle. As part of pick-up or drop-off or some other event, the fleet management system can also automatically check a renter computing device into a rental location based on identifying the location of the renter computing device.

As suggested above, the fleet management system solves several technical problems that hinder conventional rental-vehicle-computing systems. For example, the fleet management system improves the efficiency and accuracy with which conventional rental-vehicle-computing systems (or other computing systems) aggregate or surface vehicle data into integrated databases or graphical user interfaces. As noted above, some conventional rental-vehicle-computing systems isolate various databases, software platforms, or other systems to manage rental vehicles, such as by using separate and independent databases or software platforms for transportation matching, user management, rental management, etc. By contrast, the disclosed fleet management system integrates vehicle data from across different types of rental vehicles—including provider-rental vehicles used for transporting transportation requestors and personal-rental vehicles for personal transportation—into an integrated vehicle-fleet-platform database. In some cases, the disclosed fleet management system also integrates service data from various fleet-vehicle centers (e.g. vehicle service centers) into the integrated vehicle-fleet-platform database. By utilizing a shared software platform and integrated database, the fleet management system reduces both the number of digital communications and cross-platform communications required by conventional systems. In some embodiments, the fleet management system integrates data about disparate rental vehicles from a variety of computing sources, such as renter computing devices, telematic computing devices, in-vehicle-computing devices, rental-location-computing devices, or vehicle-service-computing devices. Beyond internal vehicle data or service data, the fleet management system can also fetch and integrate third-party-rental-vehicle data (e.g., using an application programming interface ("API") call).

As further noted above, conventional rental-vehicle-computing systems often execute separate software applications with different and disconnected graphical user interfaces—forcing user devices to navigate across (and sometimes back-and-forth between) different graphical user interfaces. By contrast, in one or more embodiments, the fleet management system generates and presents vehicle-data summaries in a single fleet management interface (or a unified series of graphical user interfaces) by drawing from vehicle data and/or service data aggregated into an integrated vehicle-fleet-platform database. The fleet management system thus provides previously isolated vehicle data in a single, efficiently navigable graphical user interface or series of graphical user interfaces. In some implementations, the fleet management system also provides previously isolated service data in the same navigable graphical user interface or series of graphical user interfaces. Rather than navigating across software applications or between isolated graphical user interfaces, in one or more embodiments, the fleet management system dynamically organizes vehicle data within the fleet management interface based on a variety of user-selectable criteria. Accordingly, the fleet management system reduces or eliminates both excessive computer processing and excessive computing device interaction experienced by conventional rental-vehicle-computing systems to locate and present vehicle data from a variety of integrated subsystems to surface in a fleet management interface.

In part due to such integrated databases or user interfaces, the fleet management system improves the accuracy with which conventional rental-vehicle-computing systems locate and surface vehicle data. As suggested above, some conventional rental-vehicle-computing systems isolate vehicle data in separate databases such that vehicle data concerning vehicle repair may be stored in one database and not communicated to a separate database concerning rental reservations—thereby inaccurately indicating a rental vehicle undergoing maintenance or repair is available for reservation. By contrast, the fleet management system integrates vehicle data, communications, and/or service data from fleet-vehicle center systems, third-party systems, in-vehicle systems, rental-location systems, and/or renter computing device systems. More specifically, the fleet management system utilizes the integration of these subsystems to generate more accurate and more comprehensive vehicle-data summaries including vehicle data received from the variety of integrated subsystems. In a single fleet management interface, for instance, the fleet management system can surface vehicle-data summaries for personal-rental vehicles, provider-rental vehicles—such as express-provider-rental vehicles and flexible-provider-rental vehicles—as well as third-party-rental vehicles.

As illustrated by the foregoing discussion, the present disclosure utilizes a variety of terms to describe features and advantages of the fleet management system. Additional detail is now provided regarding the meaning of such terms. For example, as used herein, the term "vehicle data" refers to digital information corresponding to one or more vehicles, including rental vehicles. In particular, vehicle data can include information regarding the characteristics, the current status, and/or history of a vehicle. To illustrate, vehicle data can include vehicle manufacturer, vehicle model, vehicle identification number, vehicle mileage, vehicle service history, vehicle warranty data, vehicle collision data, vehicle appointment data, current renter, or vehicle transportation history.

Additionally, as used herein, the term "vehicle-fleet-platform database" refers to a database including vehicle data and/or service data corresponding to vehicles in a fleet. In particular, a vehicle-fleet-platform database can include the underlying data for vehicle-data summaries corresponding to rental vehicles. To illustrate, a vehicle-fleet-platform database can include vehicle data received from renter computing devices, telematic computing devices, in-vehicle-computing devices, rental-location-computing devices, and/or vehicle-service-computing devices.

Also, as used herein, the term “rental vehicle” refers to a transportation vehicle for rent by a rental requestor. In particular, a rental vehicle includes a transportation vehicle operated by a rental requestor to transport the rental requestor. Such vehicles may include, but are not limited to, an automobile, airplane, boat, motorcycle, or other vehicle. Rental vehicles may be stored at rental-vehicle locations.

Further, as used herein, the term “personal-rental vehicle” refers to a transportation vehicle for rent by a rental requestor for personal use. In particular, a personal-rental vehicle can include a vehicle for rent that is not for use to provide transportation services in a transportation matching system.

Additionally, as used herein, the term “provider-rental vehicle” refers to a transportation vehicle for rent by a rental requestor for at least partial use to provide transportation services (e.g., for a transportation matching system). To illustrate, a provider-rental vehicle can include a rental vehicle matched to a rental requestor via a transportation matching system subject to one or more of a variety of mileage schemes for providing transportation to transportation requestors within the transportation matching system.

Relatedly, as used herein, the term “flexible-provider-rental vehicle” refers to a provider-rental vehicle with a rental-requestor-selected allocation of personal mileage and transportation-services mileage. To illustrate, a flexible-provider-rental vehicle can correspond to a mileage scheme that includes a number of personal miles selected by a rental requestor. Also, as used herein, the term “express-provider-rental vehicles” refers to a provider-rental vehicle with allocation of personal mileage based on transportation-services mileage. To illustrate, an express-provider-rental vehicle can correspond to a mileage scheme including a number of personal miles earned for each mile driven while providing transportation services to transportation requestors for a transportation matching system.

Also, as used herein, the term “mileage scheme” refers to a configuration or program corresponding to vehicle mileage for a rental vehicle. In particular, a mileage scheme can include a method and/or algorithm for determining personal mileage and transportation-services mileage corresponding to a provider-rental vehicle. To illustrate, a mileage scheme can include a scheme for determining mileage based on user selection of a number of miles. Additionally, a mileage scheme can include a scheme for determining personal mileage based on a number of miles driven while providing transportation services to transportation requestors for a transportation matching system.

Further, as used herein, the term “third-party-rental vehicle” refers to a rental vehicle for rent to a rental requestor via a third party. In particular, a third-party-rental vehicle can include a rental vehicle owned by a third-party system and not by a fleet management system and/or transportation matching system directly. The disclosed fleet management system can integrate data and rental options concerning a third-party-rental vehicle, including integration into a fleet management database and/or a fleet management interface. To illustrate, a third-party-rental vehicle can include a third-party provider-rental vehicle and/or a third-party personal-rental vehicle.

Additionally, as used herein, the term “vehicle-data summary” refers to a synopsis or abbreviated sampling of vehicle data and/or service data corresponding to a particular vehicle. In particular, a vehicle-data summary can include an organized collection of data corresponding to a particular vehicle in a vehicle fleet, including data concerning a provider-rental vehicle, a personal-rental vehicle, and/or a third-party-rental vehicle. To illustrate, the fleet management system can generate a fleet management interface organizing a variety of vehicle-data summaries in separate rows in tabular form.

Also, as used herein, the term “renter-activity summary” refers to a synopsis or abbreviated sampling of data reflecting historical activities of a renter corresponding to a renter account. In particular, a renter-activity summary can include rental history data, payment history data, check in and check out data, notes data, and scheduling data. To illustrate, in one or more embodiments, the fleet management system organizes one or more renter-activity summaries into renter-specific graphical user interfaces.

Additionally, as used herein, the term “renter indicator” refers to a graphical element corresponding to or representing a renter. In particular, a renter indicator can include a graphical-user-interface element corresponding to a rental account. To illustrate, a renter indicator can include one or more graphical-user-interface elements including a photo, name, and/or username associated with a rental account. In one or more embodiments, in response to receiving user selection of a renter indicator associated with a renter, the fleet management system provides a graphical user interface associated with the renter.

Further, as used herein, the term “tag” refers to a data label or indicator. In particular, a tag can include a metadata tag associated with various vehicle data, vehicle-data summaries, and/or renter accounts. To illustrate, a tag can include a vehicle-damage tag, a vehicle-maintenance tag, a vehicle-service tag, and/or a variety of tags associated with vehicle data. As used herein, the term “vehicle-damage tag” refers to a tag denoting some kind of vehicle damage, including current and/or past damage. Additionally, as used herein, the term “vehicle-maintenance tag” refers to a tag denoting some kind of vehicle maintenance, including currently needed maintenance and/or maintenance performed in the past.

Additionally, as used herein, the term “virtual code” refers to a digital code, frequency, or signal to access and/or use a rental vehicle. To illustrate, a virtual code can include a digital key corresponding to a rental vehicle. In particular, a virtual code can include a digital key received wirelessly via the internet, including a radio frequency identification code. To further illustrate, a virtual code can include a near field communication code received at a renter computing device for contactless access to a corresponding rental vehicle.

Further, as used herein, the term “in-vehicle-computing device” refers to a computing device integrated into or attached inside a vehicle. In particular, an in-vehicle-computing device can include one or more computing systems within a vehicle that display digital messages or visual indicators for a transportation requestor or provider, track vehicle data, and/or record vehicle data. To illustrate, an in-vehicle-computing device can include various telematics computing systems, such as an inertial measurement unit, a Global Positioning System (“GPS”), a fuel usage monitor, an accelerometer, a gyroscope, and/or other systems.

Also, as used herein, the term “on-board-diagnostics port” refers to an interface for a computing device within a vehicle capable of receiving and transmitting data. To illustrate, an on-board-diagnostics port includes a socket in a vehicle with data-reporting capability. In particular, an on-board-diagnostics port can include a socket that can transmit vehicle data to a connected computing device. In one or more embodiments, the fleet management system utilizes an in-vehiclecomputing device attached to an on-board diagnostics port to transmit and/or receive vehicle data. Further, in some embodiments, the fleet management system utilizes an in-vehicle-computing device attached to an on-board diagnostics port to receive a virtual code from a renter computing device.

Additionally, as used herein, the term “service status” refers to an indicator of whether a rental vehicle is undergoing some kind of inspection, repair, or other service, including an indicator of a type of inspection, repair, or other service. In particular, a service status can include an active status, a maintenance status, a service status, or a damaged status. To illustrate, a maintenance status can include an indicator for a rental vehicle currently undergoing routine maintenance, such as tire rotation, oil change, battery replacement, etc. Relatedly, a service status can include an indicator for a rental vehicle currently undergoing a non-routine service, such as engine repair, malfunctioning part replacement, body repair, etc. Further, a damaged status can include an indicator for a currently damaged rental vehicle, including a rental vehicle currently undergoing repair for the damage. Additionally, an active status can include an indicator for a rental vehicle that is currently active, including active in a vehicle fleet.

Further used herein, the term “fleet-vehicle center” refers to a location for rental vehicles. In particular, a fleet-vehicle center can include a location for repair, maintenance, service, and drop-off of pick-up of rental vehicles. To illustrate, a fleet-vehicle center can include a multi-track vehicle location that facilitates maintenance, service, damage repair, and/or rentals for rental vehicles, including a from vehicle fleet for a transportation matching system.

In one or more embodiments, a fleet-vehicle center can include a vehicle service center. As used herein, the term “vehicle service center” refers to a location with facilities or equipment that provide a variety of vehicle services to rental vehicles, including for collision damage, general maintenance, and other vehicle services. In one or more embodiments, a vehicle service center includes separate tracks for collision damage, routine maintenance, and other vehicle services.

Relatedly, as used herein, the term “third-party-vehicle centers” refers to fleet-vehicle centers including third-party vehicles. In particular, third-party-vehicle centers can include rental locations, service locations, maintenance locations, and/or damage repair locations that include and/or service third-party vehicles. In some embodiments, a third-party vehicle center is managed in whole or in part by a third-party system.

As indicated above, this disclosure includes illustrative figures portraying example embodiments and implementations of the fleet management system. In accordance with one or more embodiments, FIG. 1 indicates a schematic diagram of an environment 100 in which a fleet management system 116 can manage various rental vehicles using a network 126 within the environment 100, including a personal-rental vehicle 102, a provider-rental vehicle 108, and a third-party-rental vehicle 115.

As mentioned, the environment 100 includes the personal-rental vehicle 102, which is associated with a personal renter 104, a personal-renter-computing device 106, and an in-vehicle-computing device 107. As discussed above, the personal-rental vehicle 102 includes rental vehicles designated for personal use, not including fulfilling transportation requests for the dynamic transportation matching system 114. In one or more embodiments, the personal-rental vehicle 102 can be a first-party vehicle associated with the dynamic transportation matching system 114 or a third-party vehicle.

Additionally, as shown in FIG. 1, the environment 100 includes the provider-rental vehicle 108, which is associated with a provider renter 110, a provider-renter-computing device 112, and an in-vehicle-computing device 111. In some embodiments, the provider-rental vehicle 108 includes rental vehicles designated for fulfilling transportation requests and/or providing other transportation services in the dynamic transportation matching system 114. Additionally, in one or more embodiments, the provider-rental vehicle 108 is further designated for some personal use by the provider renter 110. In one or more embodiments, the provider-rental vehicle 108 can be a first-party vehicle associated with the dynamic transportation matching system 114 or a third-party vehicle.

Further, as shown in FIG. 1, the environment 100 includes the third-party-rental vehicle 115, which is associated with a third-party renter 117, a third-party-renter-computing device 119, and an in-vehicle-computing device 121. In some embodiments, the third-party-rental vehicle 115 is associated with a third-party system, such as a partner rental-vehicle-computing system to the dynamic transportation matching system 114. As mentioned above, in some embodiments, the third-party-rental vehicle 115 also constitutes a personal-rental vehicle. Though FIG. 1 illustrates one personal-rental vehicle 102, one provider-rental vehicle 108, and one third-party-rental vehicle 115, the fleet management system 116 can manage any number of personal-rental vehicles, provider-rental vehicles, and third-party-rental vehicles.

Figure 12:
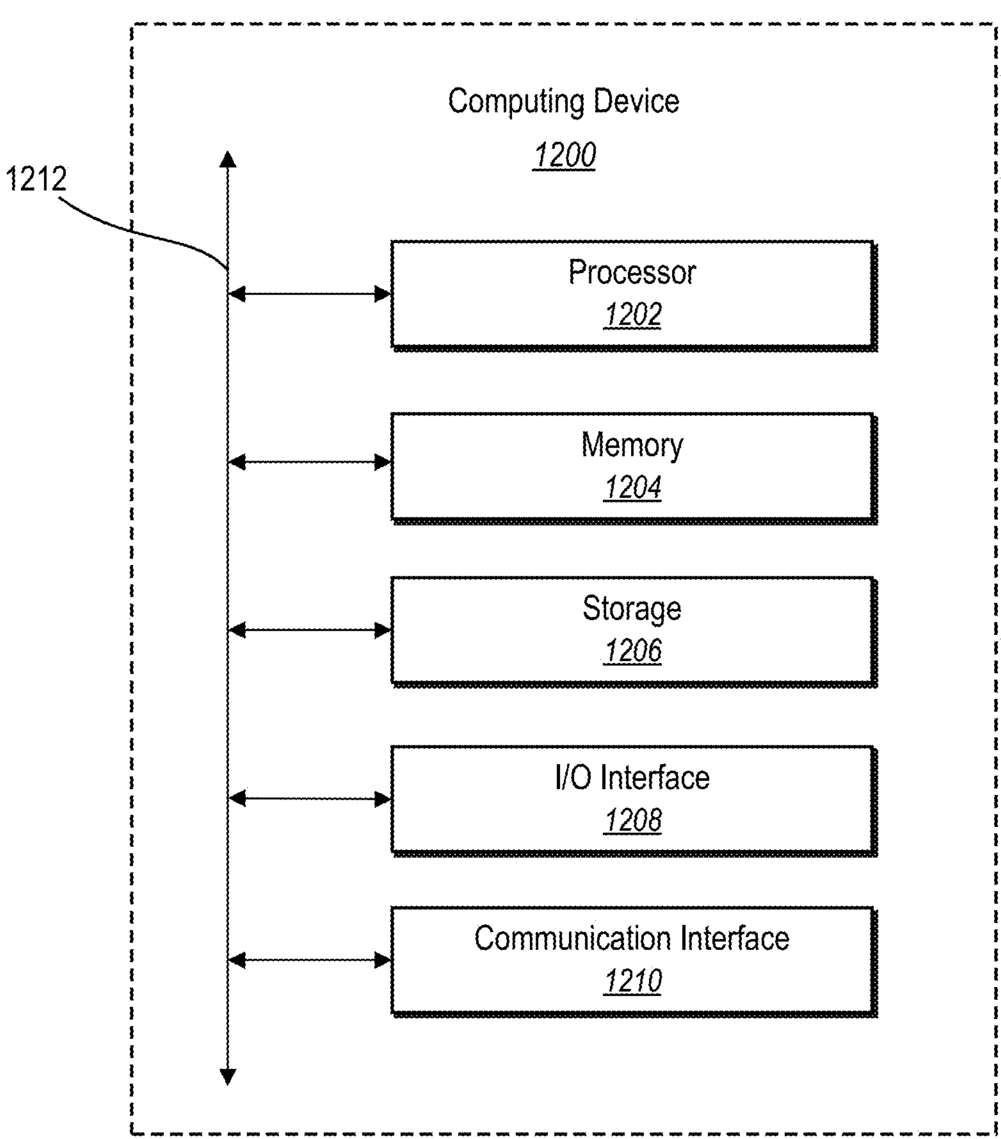
FIG. 12 illustrates a block diagram of an example computing device in accordance with one or more embodiments.

As further shown in FIG. 1, the server(s) 113 include the dynamic transportation matching system 114, which in turn includes the fleet management system 116 and the vehicle-fleet-platform database 118. In some embodiments, the environment 100 does not include the dynamic transportation matching system 114. The server(s) 113 can generate, store, receive, and transmit various types of data including data relating to mobile devices, transportation requests, and fleet vehicles. The dynamic transportation matching system 114 can use the server(s) 113 to communicate with various computing devices. For example, the server(s) 113 receive vehicle data of various types from the personal-renter-computing device 106, the provider-renter-computing device 112, the third-party-renter-computing device 119, the rental-location-computing device 120, the vehicle-service-computing device 122, and/or the third-party-renter-computing device 119. In some embodiments, the server(s) 113 sends notifications, appointment information, and other vehicle data to these various computing devices. The server(s) 113 can include one or more server device(s) that implement the dynamic transportation matching system 114, and in turn the fleet management system 116. FIG. 12 provides additional detail regarding the server(s) 113.

In one or more embodiments, the server(s) 113 can implement all or a portion of the dynamic transportation matching system 114. The dynamic transportation matching system 114 matches provider computing devices (e.g., computing devices associated with provider-rental vehicles) with transportation requestor computing devices. Additionally, in some embodiments, the dynamic transportation matching system 114 receives a transportation request from a transportation requestor computing device. The transportation request can include a pickup location and a destination location.

As also shown in FIG. 1, the server(s) 113 may include or implement all or a portion of the fleet management system 116. As indicated above, in one or more embodiments, the fleet management system 116 dynamically aggregates vehicle data into a fleet-vehicle database 118. The fleet management system 116 can utilize the vehicle-fleet-platform database 118 to generate data for, update, and provide a fleet management interface including vehicle-data summaries. Further, the fleet management system 116 can dynamically reorganize the fleet management interface based on user selection of portions of vehicle-data summaries and/or vehicle data categories.

In some embodiments, the fleet management system 116 communicates with the dynamic transportation matching system 114 and receives data from the dynamic transportation matching system 114. For example, the fleet management system 116 accesses vehicle data from various renter computing devices through the dynamic transportation matching system 114. In addition, or in the alternative, the fleet management system 116 can receive vehicle data directly from the various computing devices. Further, the fleet management system 116 can provide vehicle data, vehicle data summaries, and/or the vehicle-fleet-platform database 118 to the dynamic transportation matching system 114.

As mentioned, the environment 100 includes the personal-renter-computing device 106, the provider-renter-computing device 112, and the third-party-renter-computing device 119. In one or more embodiments, these computing devices are associated with an application (e.g., a transportation matching system application, a rental application). In some embodiments, the personal-renter-computing device 106, the provider-renter-computing device 112, and the third-party-renter-computing device 119 include an application comprising web browsers, applets, or other software applications (e.g. native applications) available to each of the personal-renter-computing device 106, the provider-renter-computing device 112, and the third-party-renter-computing device 119. Though not illustrated, the third-party-renter-computing device 119, the rental-location-computing device 120, the vehicle-service-computing device 122, and/or the third-party-renter-computing device 119 may similarly include a provider software application, a service software application, and/or a rental software application.

As also mentioned, the environment 100 includes the in-vehicle-computing devices 107, 111, and 121. To illustrate, the in-vehicle-computing device 107, 111, and 121 can each constitute a telematics computing device. More specifically, the in-vehicle-computing device 107, 111, and 121 can be included in a vehicle during manufacture or may be a separate device integrated into a vehicle after manufacture. In one or more embodiments, the in-vehicle-computing device 107, 111, and 121 receive various vehicle data from the personal-rental vehicle 102, the provider-rental vehicle 108, and the third-party-rental vehicle 115, respectively.

To illustrate, in one or more embodiments, the in-vehicle-computing devices 107, 111, and 121 each receive footage from a vehicle camera, odometer, diagnostics port, and other vehicle computing systems. Further, in one or more embodiments, the in-vehicle-computing devices 107, 111, and 121 each provide this vehicle data to the fleet management system 116.

As also shown in FIG. 1, the environment 100 includes the rental-location-computing device 120. In one or more embodiments, the rental-location-computing device 120 receives vehicle data related to rental history, pickup and/or drop-off rental locations and appointments, and other vehicle data related to vehicle rentals. Additionally, the rental-location-computing device 120 can receive vehicle data related to renters and/or renter accounts utilizing various rental vehicles. In some embodiments, the rental-location-computing device 120 provides the rental vehicle data to the fleet management system 116.

Additionally, as shown in FIG. 1, the environment 100 includes the vehicle-service-computing device 122. In one or more embodiments, the vehicle-service-computing device 122 receives and/or tracks vehicle data related to various vehicle services, including at a fleet-vehicle center. To illustrate, in one or more embodiments, the vehicle-service-computing device 122 receives vehicle data related to services performed at a service track, a damage track, and/or a collision track of a fleet-vehicle center. Further, in one or more embodiments, the vehicle-service-computing device 122 dynamically tracks availability of appointments and vehicle components at a fleet-vehicle center. Further, the vehicle-service-computing device 122 can provide the vehicle data and availability data to the fleet management system 116.

FIG. 1 also shows that the environment 100 includes the third-party-computing device 124. In one or more embodiments, the fleet management system 116 is associated with one or more third-party systems. As mentioned above, in some embodiments, the fleet management system 116 integrates one or more third-party-rental vehicles from third-party systems into the vehicle-fleet-platform database 118. The third-party-computing device 124 can receive vehicle data related to third-party vehicles, including the third-party-rental vehicle 115. In some embodiments, the third-party-computing device 124 can also be the rental-location-computing device 120 and/or the vehicle-service-computing device 122 that are maintained in a third-party system.

Figure 2:
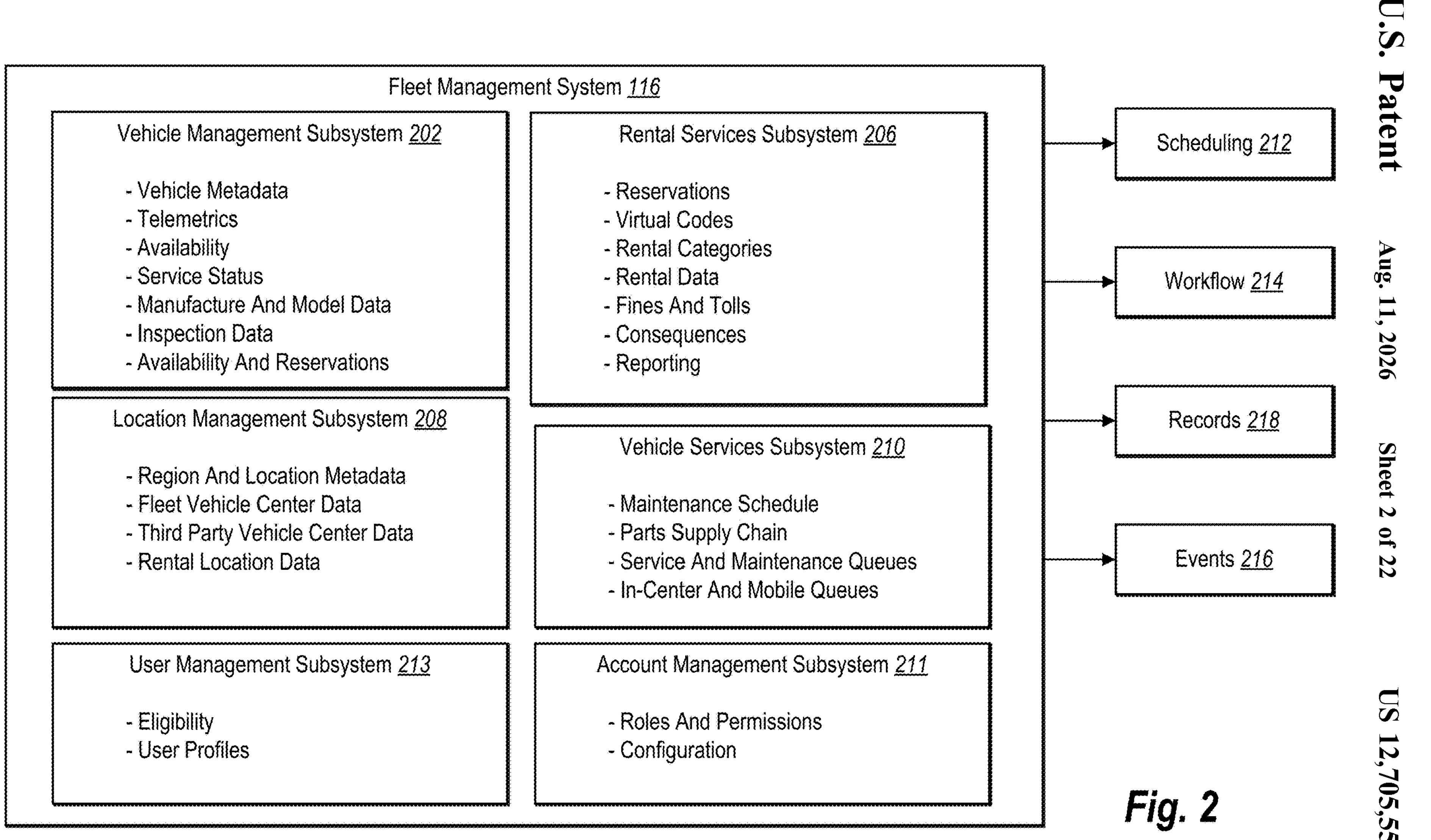
FIG. 2 illustrates an overview of a fleet management system, including various vehicle data from both provider-rental vehicles and personal-rental vehicles and corresponding functions in accordance with one or more embodiments.

As mentioned above, the fleet management system 116 can track and record a variety of vehicle data for a variety of fleet vehicles. Further, the fleet management system 116 can utilize the vehicle data to perform or execute various functions for the fleet management system 116 and/or a dynamic transportation matching system 114. More specifically, FIG. 2 illustrates the fleet management system 116 receiving, maintaining, and integrating various vehicle data, rental data, and user data for subsystems ranging from vehicle management to location or user management. In particular, the fleet management system 116 includes a vehicle management subsystem 202, a rental services subsystem 206, a location management subsystem 208, a vehicle services subsystem 210, a user management subsystem 213, and an account management subsystem 211.

As illustrated by FIG. 2, in one or more embodiments, the vehicle management subsystem 202, the rental services subsystem 206, the location management subsystem 208, the vehicle services subsystem 210, the user management subsystem 213, and/or the account management subsystem 211 store the vehicle data listed in FIG. 2 in the vehicle-fleet-platform database 118. In addition to maintaining the listed vehicle data illustrated by FIG. 2, the fleet management system 116 also performs various functions for scheduling 212, workflow 214, events 216, and records 218. While the following paragraphs describe data stored or managed, or functions performed by, various subsystems, the fleet management system 116 as a larger system can store or manage the data described below or perform the functions described below.

In one or more embodiments, the fleet management system 116 achieves interoperability of these various subsystems in order to facilitate utilization of resources across subsystems. To illustrate, the fleet management system 116 centrally manages the subsystems. Accordingly, the vehicle-fleet-platform database 118 provides unified data access across the various subsystems. By integrating vehicle data from across subsystems within the vehicle-fleet-platform database 118, the fleet management system 116 improves efficiency in both automation and predictive models. To illustrate, the fleet management system 116 can produce and utilize improved predictive models by utilizing the unified data in the vehicle-fleet-platform database 118.

As shown in FIG. 2, in one or more embodiments, the fleet management system 116 includes the vehicle management subsystem 202. More specifically, in one or more embodiments, the vehicle management subsystem 202 integrates data for both first-party vehicles and third-party vehicles into the vehicle-fleet-platform database 118 while tracking the first-party or third-party association of each vehicle. Further, in some embodiments, the vehicle management subsystem 202 tracks third-party-rental vehicles from multiple third-parties.

As further shown in FIG. 2, the vehicle management subsystem 202 manages various rental vehicles including a variety of types of vehicle data. For example, the vehicle management subsystem 202 determines and stores various vehicle metadata in the fleet-vehicle database. Further, the vehicle management subsystem 202 provides the vehicle metadata in vehicle-data summaries in a fleet management interface. For example, as shown in FIG. 2, the vehicle management subsystem 202 can determine and store telematic data, availability and reservation data, service status data, manufacturer and model data, and/or inspection data.

To illustrate, in one or more embodiments, the vehicle management subsystem 202 receives various telematics data from telematics devices associated with fleet vehicles (e.g. rental vehicles). As discussed above, the fleet management system 116 can receive telematics data from telematics devices connected to a rental vehicle and/or from computing systems within a fleet vehicle itself. For example, telematics data can include mileage information determined based on received odometer readings. Additionally, telematics data can include collision data determined based on a diagnostics port and/or a vehicle camera. The fleet management system 116 can also determine collision data based on past collision services at a vehicle-service center. Further, the vehicle management subsystem 202 can aggregate telematics data including tire pressure data, engine temperature data, oil pressure data, brakes information, battery information, fueling information, airbag information, security system information, traction information, washer fluid information, and/or various other telematics information.

As also shown in FIG. 2, the vehicle management subsystem 202 can aggregate availability data corresponding to various fleet vehicles. To illustrate, in one or more embodiments, the vehicle management subsystem 202 aggregates availability data from rental-location-computing devices, in-vehicle-computing devices, and/or renter computing devices (e.g. a personal-renter-computing device or a provider-renter computing device) into the vehicle-fleet-platform database 118. In one or more embodiments, the vehicle management subsystem 202 aggregates various data appointments associated with a renter computing device and/or renter account at a fleet-vehicle center and/or a third-party-vehicle center. The vehicle management subsystem 202 can also receive availability and/or appointment data corresponding to a rental vehicle from renter computing devices.

In some embodiments, the vehicle management subsystem 202 also aggregates service status data. For example, fleet vehicles at various times may be active or may be inactive for a variety of reasons. In one or more embodiments, the vehicle management subsystem 202 aggregates the activity and/or reason for inactivity of fleet vehicles. To illustrate, the vehicle management subsystem 202 can determine and aggregate whether a fleet vehicle has an active status, a maintenance status, a service status, or a damaged status. Relatedly, the vehicle management subsystem 202 can track and record inspection data, including results of a government safety inspection or emission inspection.

Additionally, as shown in FIG. 2, the vehicle management subsystem 202 aggregates and stores manufacture and model data corresponding to various fleet vehicles. To illustrate, in some embodiments, the vehicle management subsystem 202 aggregates vehicle makes and models. Further, the vehicle management subsystem 202 can aggregate vehicle classes, sizes, and capacities. In some embodiments, the vehicle management subsystem 202 further aggregates data associated with particular makes and models, such as warranty data corresponding to a manufacturer. In addition or in the alternative, the fleet management system 116 can track warranty data for specific rental vehicles based on a corresponding VIN.

In one or more embodiments, the vehicle management subsystem 202 tracks availability and reservation data for a variety of fleet locations, such as fleet-vehicle centers, third-party-vehicle centers, and rental locations. In some embodiments, the vehicle management subsystem 202 tracks availability of appointments, pickup times, and drop-off times. To illustrate, the vehicle management subsystem 202 can track appointments for a variety of fleet locations, such as fleet-vehicle centers and/or rental locations.

As also shown in FIG. 2, the rental services subsystem 206 aggregates and stores vehicle data corresponding to rental services. For example, the rental services subsystem 206 aggregates various reservations. In one or more embodiments, the rental services subsystem 206 aggregates pickup dates and/or appointments and drop-off dates and/or appointments. Additionally, the rental services subsystem 206 tracks rental vehicles associated with reservations and aggregates information regarding whether a reservation is for a personal-rental vehicle or a provider-rental vehicle. Further, in one or more embodiments the rental services subsystem 206 aggregates data regarding mileage schemes corresponding to reservations.

Additionally, in one or more embodiments, the rental services subsystem 206 tracks rental services data including virtual codes. As described below with regard to FIG. 9, the rental services subsystem 206 can store virtual codes that grant access to particular fleet rental vehicles for contactless pick up or drop off of a rental vehicle. In some embodiments, the rental services subsystem 206 aggregates and stores these virtual codes. Additionally, in one or more embodiments, the rental services subsystem 206 generates updated virtual codes based on a new rental appointment corresponding to a fleet rental vehicle.

As further shown in FIG. 2, the rental services subsystem 206 can also aggregate rental categories corresponding to rental vehicles. For example, in one or more embodiments, the rental services subsystem 206 tracks various categorizations of rental vehicles, including size, capacity, silhouette, doors, and other vehicle classifications. Further, in one or more embodiments, the rental services subsystem 206 provides a particular available rental vehicle in a vehicle classification for selection in a rental reservation graphical user interface. To illustrate, in one or more embodiments, the rental services subsystem 206 provides an indication of a specific rental vehicle rather than a vehicle classification.

In one or more embodiments, the rental services subsystem 206 aggregates renter data corresponding to renter accounts. The rental services subsystem 206 can aggregate rental history data from rental-location-computing devices and/or renter computing devices. Additionally, in one or more embodiments, the rental services subsystem 206 aggregates background check data, do-not-rent data indicating untrustworthy renters, outstanding balances, and other rental vehicle data.

As also shown in FIG. 2, the location management subsystem 208 aggregates vehicle data corresponding to location management. In one or more embodiments, the location management subsystem 208 tracks the physical location, including global positioning system data and address data for various locations and centers. For example, as shown in FIG. 2, the location management subsystem 208 tracks the location of fleet-vehicle centers, third-party-vehicle centers, and various rental locations.

Further, as shown in FIG. 2, the vehicle services subsystem 210 aggregates vehicle data corresponding to fleet service management. In some embodiments, the vehicle services subsystem 210 manages, tracks, and aggregates data regarding past, present, and future servicing of fleet vehicles. For example, the vehicle services subsystem 210 aggregates maintenance schedule, parts supply chain data, service and maintenance queue data, and in-center and mobile queue data. In some embodiments, the vehicle services subsystem 210 tracks availability of particular vehicle parts, vehicle supplies, and services. Further, in one or more embodiments, the vehicle services subsystem 210 tracks availability of rental vehicles and various classifications of rental vehicles. Additionally, the vehicle services subsystem 210 can determine and store maintenance schedules corresponding to fleet vehicles and a parts supply chain corresponding to various fleet locations, including vehicle-service centers.

Further, in some embodiments, the vehicle services subsystem 210 tracks various queues in fleet-vehicle centers and third-party-vehicle centers. For example, in one or more embodiments, a fleet-vehicle center includes various separate tracks for servicing fleet vehicles, including a service track, a maintenance track, and/or a collision track. In one or more embodiments, the vehicle services subsystem 210 tracks and manages in-center queues of vehicles for each of these tracks separately.

Further, in one or more embodiments, fleet-vehicle centers manage mobile service vehicles that drive to a location of a fleet rental vehicle and bring services to the fleet vehicle. In some embodiments, the vehicle services subsystem 210 monitors progress of these mobile services in real-time based on data received from mobile vehicle-service-computing devices. Accordingly, the vehicle services subsystem 210 can manage mobile queues corresponding to mobile service vehicles in addition to in-center queues.

As also shown in FIG. 2, the account management subsystem 211 aggregates and manages vehicle data corresponding to user management. To illustrate, the account management subsystem 211 can receive data corresponding to user accounts including renter account and provider accounts. In one or more embodiments, the account management subsystem 211 receives account data from renter computing devices, vehicle-service-computing devices, transportation requestor devices, and/or provider computing devices. The account management subsystem 211 can receive account data including account identifiers, account activity, account permissions, etc.

In one or more embodiments, the account management subsystem 211 determines roles and permissions associated with various user accounts based on received account data. Relatedly, the account management subsystem 211 can provide vehicle data to computing devices based on associated roles and permissions. In some embodiments, the account management subsystem 211 also manages account configuration corresponding to various renter and/or provider accounts. To illustrate, account management subsystem 211 can receive and manage account settings, including notification settings, user selections, etc.

Additionally, as shown in FIG. 2, the user management subsystem 213 aggregates and manages data corresponding to user management. To illustrate, the user management subsystem 213 can receive data corresponding to system users, including user standing and eligibility, and user profile information. In some embodiments, the fleet management system 116 tracks standing and eligibility corresponding to rental requestor accounts, provider accounts, and or transportation requestor accounts. In one or more embodiments, the user management subsystem 213 receives user data from renter computing devices, vehicle-service-computing devices, requestor devices, and/or provider computing devices. The user management subsystem 213 can receive user data including user infractions or discipline, user demographic information, and/or user activity and history data.

As discussed above, in one or more embodiments, the fleet management system 116 performs or executes various functions based on the aggregated vehicle data. To illustrate, the fleet management system 116 utilizes vehicle data received from a variety of computing devices and subsystems to determine various actions and/or options for the fleet management system 116. For example, as shown in FIG. 2, the fleet management system 116 can perform various functions for the scheduling 212, the workflow 214, the events 216, and the records 218 of various rental vehicles.

As illustrated by FIG. 2, in one or more embodiments, the fleet management system 116 determines the scheduling 212 for various appointments, including rental appointments and service appointments based on the aggregated vehicle data. The fleet management system 116 unifies scheduling by utilizing data from various subsystems. For example, the fleet management system 116 can utilize availability data, vehicle manufacturer and model data, and service status data to determine availability for pickup of a rental vehicle. In another example, the fleet management system 116 utilizes vehicle part availability data, service availability data, and fleet-vehicle center location data to identify the soonest appointment for a particular vehicle repair at a fleet-vehicle center within ten miles of the particular vehicle.

Additionally, as shown in FIG. 2, the fleet management system 116 utilizes vehicle information to manage the workflow 214 for scheduling, services, and other items. More specifically, in one or more embodiments, the fleet management system 116 utilizes vehicle data to generate various schedules for various fleet-vehicle locations. For example, the fleet management system 116 can utilize fleet-vehicle center data to determine efficient workflows for various service tracks. Accordingly, the fleet management system 116 can build various vehicle queues based on availability at the fleet-vehicle center.

Additionally, in one or more embodiments, the fleet management system 116 utilizes the aggregated vehicle data to determine and schedule the events 216. For example, in one or more embodiments, the fleet management system 116 can utilize vehicle data to determine modifications and other actions for the fleet management system 116. For example, the fleet management system 116 can identify a projected demand for a particular kind of rental vehicle relative to an actual availability of that type of rental vehicle. Based on the demand relative to the availability, the fleet management system 116 can provide notifications, incentives, or reminders to renters of the vehicle type to return the vehicle type, including to return early.

Additionally, in one or more embodiments, fleet management system 116 processes events 216 including rental events, such as consequences, fines, and tolls. In some embodiments, the fleet management system 116 provides portions of the fleet-vehicle database to a third-party system to process these rental events. In some embodiments, the fleet management system 116 and/or the third-party system provide notification of these rental events to a renter computing device.

Further, in some embodiments, the fleet management system 116 utilizes the aggregated vehicle data to generate the records 218. In addition to dynamically tracking various vehicle data in real-time, the fleet management system 116 can archive past vehicle data in the records 218. In one or more embodiments, the fleet management system 116 can utilize the records 218 to predict future vehicle data trends, and to make a variety of other determinations.

More specifically, in some embodiments, the fleet management system 116 stores all documents and audit records associated with renters and rental vehicles. In one or more embodiments, the fleet management system 116 manages document templates and document rendering, including for rental contracts, inspection reports, purchase orders, etc. To illustrate, the fleet management system 116 can generate templates for a variety of user experience points. Additionally, the fleet management system 116 stores user and vehicle audit records.

As discussed above, the fleet management system 116 generates vehicle-summaries for display within a fleet management interface. In accordance with one or more embodiments, FIG. 3 illustrates an overview of a process by which the fleet management system 116 aggregates vehicle data for provider-rental vehicles and personal-rental vehicles and generates vehicle-data summaries for the different rental vehicles for display in a fleet management interface.

Figure 3:
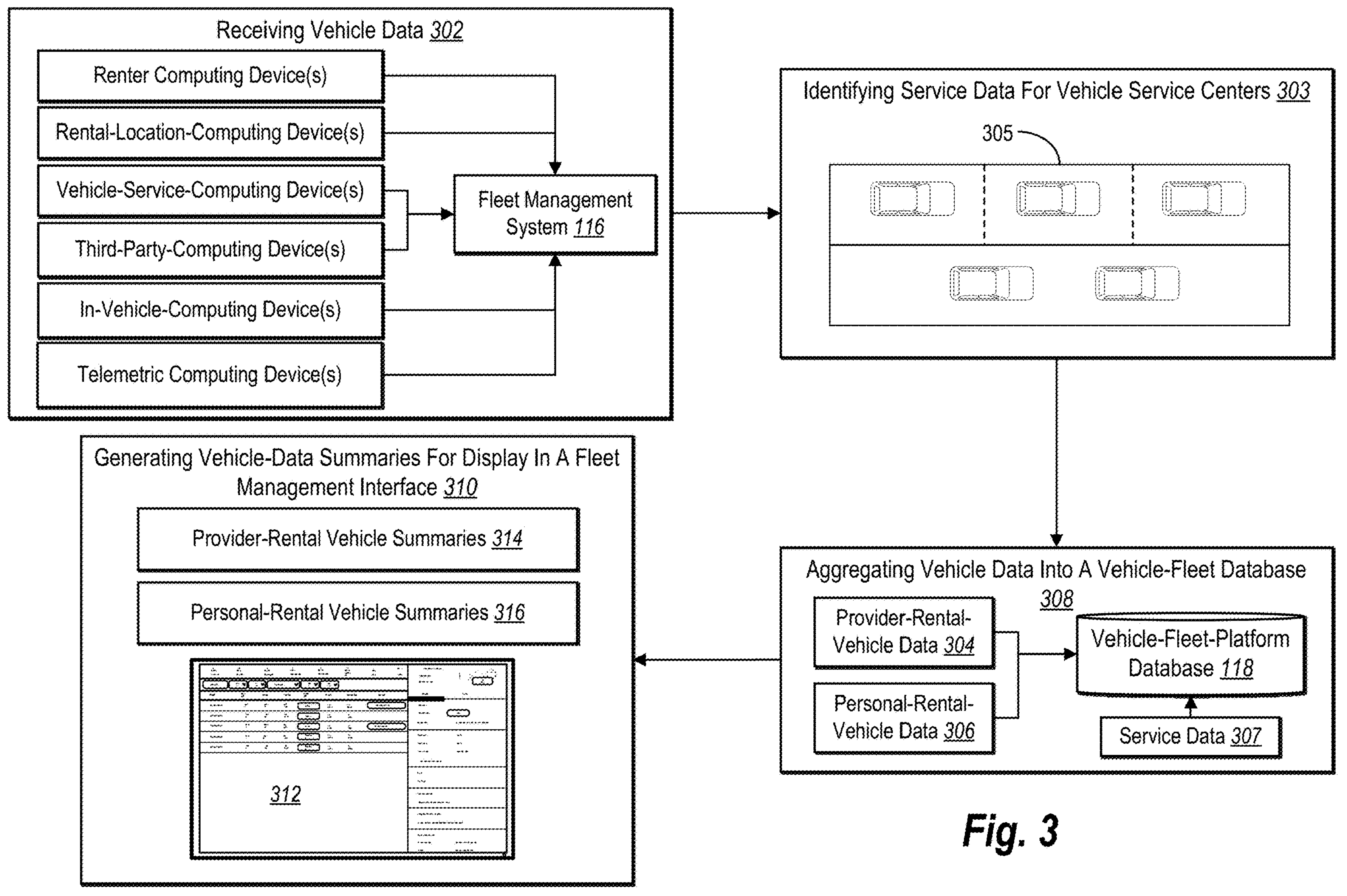
FIG. 3 illustrates an example process of the fleet management system aggregating vehicle data for provider-rental vehicles and personal-rental vehicles and generating vehicle-data summaries for the different rental vehicles for display in a fleet management interface in accordance with one or more embodiments.

As shown in FIG. 3, the fleet management system 116 performs an act 302 of receiving vehicle data. To illustrate, the fleet management system 116 receives one or both of (i) vehicle data based on data inputs associated with a set of provider-rental vehicles used in part by providers for transporting requestors according to a provider-use rental and (ii) vehicle data based on data inputs associated with a set of personal-rental vehicles operated by renters for self-transportation according to a personal-use rental. Accordingly, in some embodiments, the fleet management system 116 receives vehicle data for both provider-rental vehicles and personal-rental vehicles. Further, in one or more embodiments, the provider-rental vehicles can include flexible-provider-rental vehicles and/or express-provider rental vehicles. Provider-rental vehicles and personal-rental vehicles can likewise be third-party vehicles.

More specifically, the fleet management system 116 receives vehicle data from renter computing device(s), rental-location-computing device(s), vehicle-service-computing device(s), third-party computing device(s), in-vehicle-computing device(s), and/or telematic computing device(s). Additionally, the fleet management system 116 can receive the vehicle data from these various computing devices, including via a dynamic transportation matching system.

As discussed above, in one or more embodiments, the various computing devices can be included in a variety of subsystems. To illustrate, the rental-location-computing device(s) may be part of an entity, subsystem, and organization otherwise separate from the telematic computing device(s). Thus, the fleet management system 116 can aggregate vehicle data from a variety of subsystems that would be disconnected in conventional systems to improve overall efficiency of the vehicle fleet.

As further shown in FIG. 3, in one or more embodiments, the fleet management system 116 performs an act 303 of identifying service data for vehicle service centers. This act is optional and may or may not be performed in various embodiments. In one or more embodiments, the fleet management system 116 identifies service data for vehicle service centers associated with a set of provider-rental vehicles and a set of personal-rental vehicles.

As indicated above, the fleet management system 116 can identify and compile service data for particular rental vehicles, including fleet vehicles and/or third-party-rental vehicles. To illustrate, as shown in FIG. 3, the fleet management system 116 identifies service data concerning rental vehicles scheduled to be serviced by, currently serviced by, or previously serviced by a vehicle service center 305. The fleet management system 116 can likewise identify service data corresponding to services scheduled or performed at additional vehicle service centers. For example, the fleet management system 116 identifies prior services performed for rental vehicles, vehicle parts installed or repaired for rental vehicles, prior appointment times, prior renter interactions, and other data regarding the interactions of rental vehicles at the vehicle service center 305.

Additionally, as shown in FIG. 3, the fleet management system 116 performs an act 308 of aggregating vehicle data into a vehicle-fleet-platform database (e.g. the vehicle-fleet-platform database 118). The fleet management system 116 integrates vehicle data into the vehicle-fleet-platform database based on communications with the variety of computing sources described above. Optionally, the act 308 also includes aggregating service data into the vehicle-fleet-platform database. Accordingly, in some embodiments, the fleet management system 116 aggregates, into a vehicle-fleet-platform database, vehicle data for a set of provider-rental vehicles, vehicle data for a set of personal-rental vehicles, and service data for one or more vehicle service centers.

As shown in FIG. 3, the fleet management system 116 aggregates both provider-rental-vehicle data 304 concerning provider-rental vehicles and personal-rental-vehicle data 306 concerning personal-rental vehicles. As mentioned above, the fleet management system 116 can further aggregate vehicle data concerning service status, vehicle manufacturers, and/or scheduling availability. As further shown in FIG. 3, in some embodiments, the fleet management system 116 aggregates service data 307 from a variety of vehicle service centers, including service data from vehicle-service-computing devices or vehicle computing devices.

As also shown in FIG. 3, the fleet management system 116 performs an act 310 of generating vehicle-data summaries for display in a fleet management interface. In one or more embodiments, the fleet management system 116 generates fleet-vehicle summaries including selected information from the aggregated vehicle data corresponding to various fleet vehicles. Additionally, in one or more embodiments, the fleet management system 116 generates (i) vehicle-data summaries for a set of provider-rental vehicles with (or including) corresponding service information from the service data 307 and (ii) vehicle-data summaries for a set of personal-rental vehicles with (or including) corresponding service information from the service data 307.

More specifically, as shown in FIG. 3, the fleet management system 116 generates provider-rental vehicle summaries 314 and personal-rental vehicle summaries 316. To illustrate, the fleet management system 116 generates vehicle summaries by organizing information based on corresponding vehicle and various vehicle data categories for display within a fleet management interface 312. As described below, for example, the fleet management interface 312 can include the fleet management interface illustrated in FIG. 5 and/or the fleet-location-management interfaces illustrated in FIGS. 7A-7C.

Additionally, as shown in FIG. 3, the fleet management system 116 sends data for vehicle-data summaries, including the provider-rental vehicle summaries 314 and the personal-rental vehicle summaries 316, to a computing device for organization into the fleet management interface 312. In one or more embodiments, the computing device that received the vehicle-data summaries organizes and re-organizes the vehicle-data summaries based on user selection of various criteria, including vehicle data categories.

Figure 4:
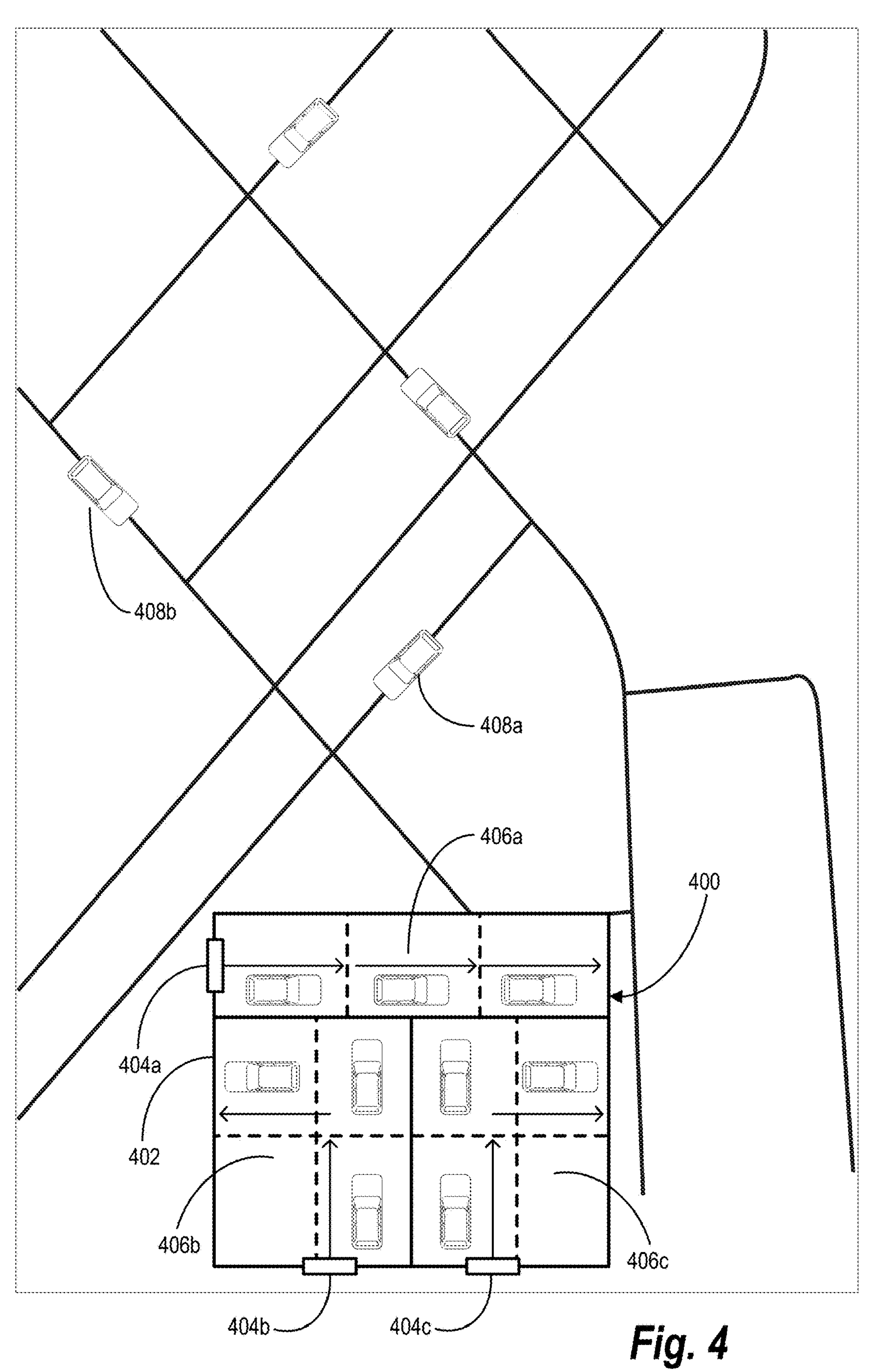
FIG. 4 illustrates an example fleet-vehicle center for the fleet management system to dynamically manage various fleet vehicle services in accordance with one or more embodiments.

As discussed briefly above, in one or more embodiments, the fleet management system 116 manages one or more fleet-vehicle centers. FIG. 4 illustrates an example of a fleet-vehicle center 402 at a location 400. The fleet-vehicle center 402 can provide a variety of types of services to fleet vehicles, including as scheduled by the fleet management system 116.

As shown in FIG. 4, for instance, the fleet-vehicle center 402 includes various vehicle tracks **404*a*-404*c*. More specifically, the fleet-vehicle center 402 includes a service track 406*a*, a maintenance track 406*b*, and a collision track 406*c*. The fleet management system 116 can utilize the service track 406*a*, the maintenance track 406*b*, and the collision track 406*c* for different types of services corresponding to general service, routine maintenance, and collision repair, respectively. Accordingly, the fleet management system 116 can utilize the fleet-vehicle center 402** to provide efficient and streamlined service to rental vehicles.

Each of the vehicle tracks **404*a*-404*c* include various bays within the vehicle tracks 404*a*-404*c*. In one or more embodiments, the fleet management system 116 tracks the progress of a vehicle through the various bays. For example, the fleet management system 116** can track progress of a vehicle through different service bays based on user input to a vehicle-service-computing device. In addition or in the alternative, a vehicle-service-computing device can automatically track movement of vehicles through service bays based on wireless communication with a vehicle and/or an in-vehicle-computing device.

In one or more embodiments, the fleet management system 116 receives the tracking information from the vehicle-service-computing device. Further, in some embodiments, the fleet management system 116 integrates the tracking information about service, maintenance, and repairs into the vehicle-fleet-platform database 118. Accordingly, in one or more embodiments, the fleet management system 116 schedules rentals for rental requestors utilizing the tracking information.

In addition to tracking scheduling and progress of vehicle repairs and maintenance, in one or more embodiments, the fleet management system 116 provides updates to a renter computing device, a rental-location computing device, and/or a vehicle-service-computing device based on the progress of a corresponding service. To illustrate, in one or more embodiments, the fleet management system 116 provides notifications as a fleet vehicle moves through the service bays. In addition or in the alternative, the fleet management system 116 can determine an estimated time of completion of the service based on the tracked progress of a rental vehicle through the service bays. Accordingly, the fleet management system 116 can provide a notification of the estimated time of completion to a corresponding renter computing device, rental-location computing device, and/or vehicle-service-computing device.

As discussed above, in one or more embodiments, the fleet management system 116 dynamically manages queues corresponding to the vehicle tracks **404*a*-404*c*. More specifically, the fleet management system 116 determines and updates a queue of vehicles scheduled for and/or waiting for services at the fleet-vehicle center 402, where each of the vehicle tracks 404*a*-404*c* can have a separate queue. In addition, the fleet management system 116 can utilize estimated times of completion of vehicles currently inside service bays to update and manage vehicle queues corresponding to the vehicle tracks 404*a*-404*c*. Further, the fleet management system 116** can utilize the estimated times to generate notifications for renter computing devices in those queues.

In addition to the vehicle tracks **404*a*-404*c*, the fleet-vehicle center 402 includes a service entrance 404*a*, a maintenance entrance 404*b*, and a collision entrance 404*c* (collectively referred to as the entrances 404*a*-404*c*). In one or more embodiments, the fleet management system 116 sends navigation instructions to a computing device associated with a fleet vehicle to travel to a particular entrance of the entrances 404*a*-404*c*. To illustrate, the fleet management system 116 can provide navigation instructions to a renter computing device for a scheduled service at the fleet-vehicle center 402. In some embodiments, as part of the navigation instructions, the fleet management system 116 provides navigation instructions specifically to a service entrance corresponding to the scheduled service type. Additionally, in one or more embodiments, the fleet management system 116** provides a renter computing device with a corresponding photo of the correct entrance for the vehicle in order to aid in navigation to the correct service track.

As further shown in FIG. 4, the fleet-vehicle center 402 also includes mobile service vehicles **408*a* and 408*b*. In one or more embodiments, the fleet-vehicle center 402 provides mobile maintenance or repair services for fleet vehicles via the mobile service vehicles 408*a* and 408*b*. More specifically, the fleet management system 116 schedules and/or dispatches the mobile service vehicles 408*a* and 408*b* for mobile services based on vehicle supplies and capabilities of the mobile service vehicles 408*a* and 408*b*. For instance, the mobile service vehicles 408*a* and 408*b* optionally include equipment or parts to repair or replace a flat tire, replace a battery, replace a windshield, supply fuel, or tow a vehicle. In one or more embodiments, the fleet management system 116 tracks availability, vehicle supplies, and vehicle parts for each of the mobile service vehicles 408*a* and 408*b* and any additional mobile service vehicles at the fleet-vehicle center 402**.

In some embodiments, the fleet management system 116 dynamically manages queues corresponding to both in-center services (e.g., on the service track **406*a*, the maintenance track 406*b*, and the collision track 406*c*) and mobile services. As discussed above, in some embodiments, the fleet management system 116 tracks progress of fleet vehicles through in-center services and provides queue notifications accordingly. Similarly, the fleet management system 116 can track progress of mobile services corresponding to the mobile service vehicles 408***a* and 408*b*. Further, in one or more embodiments, the fleet management system 116 tracks movement of the mobile service vehicles 408*a* and 408*b* between service appointments via GPS. In one or more embodiments, the fleet management system 116 utilizes this progress to provide notifications to computing devices in a mobiles service queue.

To facilitate either on-site service or mobile services, in one or more embodiments, the fleet management system 116 provides a renter computing device with a graphical user interface for scheduling an appointment at the fleet-vehicle center 402. More specifically, in some embodiments, the fleet management system 116 automatically provides a notification to a renter computing device to schedule an appointment based on aggregated vehicle data indicating an upcoming vehicle service. Such vehicle service may be fulfilled either on-site at the fleet-vehicle center 402 or by mobile services via the mobile service vehicles 408*a* or 408*b*. For example, the fleet management system 116 can utilize vehicle mileage data and service history data to determine to send a notification to schedule a visit for routine maintenance. Additionally, in some embodiments, the fleet management system 116 utilizes data from telematics devices or other in-vehicle-computing devices to determine to send a notification to schedule a repair.

Additionally, in some embodiments, the fleet management system 116 dynamically tracks availability of resources, including vehicle components, at the fleet-vehicle center 402. Thus, the fleet management system 116 can utilize the availability data to schedule vehicle appointments at fleet-vehicle centers that are equipped to perform particular service, maintenance, and/or repair. Accordingly, in one or more embodiments, the fleet management system 116 utilizes availability of vehicle supplies, vehicle parts, and service professionals to determine an appropriate location for a fleet-vehicle center or a mobile service for an appointment for a fleet vehicle.

Further, in one or more embodiments, the fleet-vehicle center 402 can also include a rental location. To illustrate, in some embodiments, the fleet-vehicle center can include rental vehicles for pickup or drop-off. Further, the fleet-vehicle center 402 can manage pickup and/or drop-off of the various rental vehicles for a rental location (e.g. a rental lot) at the fleet-vehicle center 402.

In certain implementations, the fleet management system 116 manages vehicle services and computing devices at a fleet-vehicle center (e.g., a vehicle service center) as described in Laerte Zatta et al., Vehicle Service Center Dispatch System, U.S. application Ser. No. 16/727,715 (filed Dec. 26, 2019); Laerte Zatta et al., Intelligent Management of One or More Machines of a Vehicle Service Center, U.S. application Ser. No. 16/727,746 (filed Dec. 26, 2019); and Laerte Zatta et al., Intelligent Management of One or More Display Devices of a Vehicle Service Center, U.S. application Ser. No. 16/727,773 (filed Dec. 26, 2019), each of which is incorporated by reference in its entirety.

FIG. 5 illustrates a computing device 501 presenting a fleet management interface 500 in accordance with one or more embodiments. As discussed above, the fleet management system 116 generates vehicle-data summaries corresponding to fleet vehicles of various types for the fleet management interface 500. As shown in FIG. 5, the fleet management interface 500 includes these vehicle-data summaries as rows in a vehicle-data-summaries area 506.

As discussed above, the fleet management system 116 can provide vehicle data summaries to the computing device 501 for presentation in the fleet management interface 500 according to a software application executed by the computing device 501. FIG. 5 illustrates the fleet management interface 500 that the fleet management system 116 provides for dynamic organization and reorganization of vehicle-data summaries. The fleet management system 116 can provide data to the computing device 501 to present the fleet management interface 500 according to computer-executable instructions on a software application of the computing device 501 (e.g., web browser or native application). Additionally, though FIG. 5 illustrates the fleet management interface 500 with example designs, the fleet management system 116 can provide data for a fleet management interface in accordance with a variety of visual designs.

As shown in FIG. 5, the fleet management interface 500 includes an aggregated statistics bar 502. The aggregated statistics bar 502 includes various statistics regarding the vehicle fleet as a whole. In one or more embodiments, the aggregated statistics bar 502 includes a snapshot of rental vehicles across different vehicle types according to various categories. For example, as shown in FIG. 5, the aggregated statistics bar 502 shows that 0.99% of fleet vehicles are inactive, 8.3% of fleet vehicles experienced expiration of a service-level-agreement (SLA), 0.99% of fleet vehicles are subject to repossession, 2.32% of fleet vehicles are undergoing maintenance, 3.65% of fleet vehicles are undergoing cleaning, 1.99% of fleet vehicles are involved in some sort of legal issue, and 23% of fleet vehicles are active. Though FIG. 5 illustrates the aggregated statistics bar 502 including these particular statistics, the aggregated statistics bar 502 can include a variety of types of statistics related to a fleet of rental vehicles. To illustrate, the statistics in the statistics bar 502 can change when the computing device 501 sorts and/or filters the vehicle-data summaries according to various selected criteria.

As also shown in FIG. 5, the fleet management interface 500 includes a filtering bar 504 corresponding to the vehicle-data-summaries area 506. In one or more embodiments, the fleet management system 116 can utilize an indication of user input at a filter option within the filtering bar 504 to filter presentation of vehicle-data summaries in the vehicle-data-summaries area 506. For example, as shown in FIG. 5, the filtering bar 504 includes filters corresponding to various vehicle data. More specifically, FIG. 5 illustrates that the filtering bar 504 includes filtering options (e.g., drop-down menus) corresponding to a service status, a vehicle class, vehicle tags, service locations, vehicle make (e.g. vehicle manufacturer), and vehicle model. However, the fleet management system 116 can filter the vehicle-data summaries based on a variety of types of vehicle data in addition to those illustrated in FIG. 5.

As suggested above and in FIG. 5, the computing device 501 can filter the vehicle-data summaries based on a variety of selected criteria, including based on selection of columns corresponding to a table including the vehicle-data summaries. For example, in some embodiments, the computing device 501 filters the vehicle-data summaries based on service status in response to detecting user selection of a sorting option corresponding to service status. Similarly, in one or more embodiments, the computing device 501 filters the vehicle-data summaries based on a vehicle manufacturer or vehicle models based on user selection of a sorting option corresponding to the vehicle manufacturers or the vehicle models. Additionally, the computing device 501 can order the vehicle-data summaries within the fleet management interface 500 based on various user-selected criteria.

As also shown in FIG. 5, the fleet management interface 500 includes a variety of columns corresponding to the vehicle-data summaries. In one or more embodiments, the columns corresponding to the vehicle-data summaries are user-selectable sorting options. For each vehicle-data summary, for example, the fleet management interface includes a VIN column 508 (i.e., a vehicle identification number column), a make column 510, model column 511, and a license plate column 512. As shown in FIG. 5, the VIN column 508 includes a VIN corresponding to rental vehicles. Additionally, the make column 510 includes manufacturer information. Also, the model column 511 includes model information for each rental vehicle. The license plate column 512 includes license plate information. Though each of the VIN column 508, the make column 510, and the model column 511 include placeholder information in FIG. 5 (e.g., B2345678901, Make A, Model 1), the fleet management interface 500 will include vehicle data corresponding to fleet vehicles.

In addition to the VIN, make, model, and plate columns, the fleet management interface 500 further includes a service status column 514. In one or more embodiments, the fleet management system 116 can determine service status that reflects fleet vehicles activity or inactivity for a variety of reasons. As shown in FIG. 5, fleet management system 116 can determine and provide service statuses including active, service, maintenance, and/or damaged. In addition or in the alternative, the fleet management system 116 can utilize additional service statuses, such as down, available, providing transportation, etc.

In one or more embodiments, the fleet management system 116 utilizes the aggregated vehicle data to automatically change the service status of a fleet vehicle. For example, in one or more embodiments, the fleet management system 116 receives information as to the availability of a fleet vehicle from a corresponding computing device (e.g., a renter computing device). Additionally, the fleet management system 116 can determine whether and what kind of vehicle service is scheduled for the fleet vehicle. Thus, based on vehicle availability data and service schedules, the fleet management system 116 can dynamically update service status in a vehicle-data summary under the service status column 514.

As further shown in FIG. 5, the fleet management interface 500 includes an SLA column 516 (i.e., a service-level-agreement column) and a downtime column 518. In one or more embodiments, the SLA column 516 includes information as to time remaining in a service-level agreement. Additionally, the downtime column 518 includes timing information as to the length that a vehicle has gone without providing transportation services for the transportation matching system 114.

Further, as shown in FIG. 5, the fleet management interface 500 includes a tags column 520. In one or more embodiments, the fleet management system 116 can include a variety of tags denoting a variety of information, including tags reflecting user input. For example, the fleet management system 116 can automatically generate a tag based on received vehicle status data. In addition or in the alternative, the fleet management system 116 can receive user input for a tag, including a service tag from a vehicle-service-computing device.

Further, in one or more embodiments, the tags column can include a vehicle-damage tag indicating a type of damage to a rental vehicle. As shown in FIG. 5, the tags column 520 includes a vehicle-damage tag "frnt. bumper dmg." in a vehicle-data summary 524. In one or more embodiments, the vehicle-damage tag "frnt. bumper dmg." indicates damage to the front bumper. It will be appreciated, however, that the fleet management system 116 can receive and provide a variety of vehicle-damage tags indicating a variety of damage to rental vehicles.

As an illustration of a vehicle-data summary, the computing device 501 displays the vehicle-data summary 524 within the fleet management interface 500. As shown in this particular example, the vehicle-data summary 524 includes (i) a VIN B2345678901 in the VIN column 508; (ii) "Make A" in the make column 510; (iii) "Model 1" in the model column 511; (iv) a plate identifier "CK4728" in the plate column 512; (v) an active service status in the service status column 514; (vi) an indicator of "1 d under" in the SLA column 516; (vii) an indicator of "11 days" of downtime in the downtime column 518; and (viii) the vehicle-damage tag "Frnt. Bumper Dmg" in the tags column 520.

In addition to vehicle-data summaries, the fleet management interface 500 includes an expanded-vehicle-data summary 522. As shown in FIG. 5, the expanded-vehicle-data summary 522 includes additional vehicle data corresponding to a particular selected vehicle-data summary. For example, as shown in FIG. 5, the expanded-vehicle-data summary 522 includes additional tabs for notes and vehicle components. Additionally, the computing device 501 shows various additional vehicle data, such as odometer data, maintenance information, and vehicle registration information. The expanded-vehicle-data summary 522 also shows additional vehicle data, such as location data and rental information. While FIG. 5 illustrates a particular arrangement of vehicle data in the expanded-vehicle-data summary 522, the fleet management system 116 can generate the expanded-vehicle-data summary 522 to include a variety of different vehicle data in a variety of arrangements.

In one or more embodiments, the vehicle-data summary 524 and/or the expanded-vehicle-data summary 522 can include an indicator for whether the vehicle is an express-provider-rental vehicle or a flexible-provider-rental vehicle. As indicated above, in one or more embodiments, an express-provider-rental vehicle is a provider-rental vehicle corresponding to a mileage agreement that dictates personal mileage based on user selection. To illustrate, the fleet management system 116 can receive (e.g., via a provider computing device) a user selection of personal mileage for a provider account. As further indicated above, in some embodiments, a flexible-provider-rental vehicle is a provider-rental vehicle corresponding to a mileage agreement that dictates personal mileage based on miles driven by a corresponding provider account in providing transportation services on a transportation matching system. To illustrate, the fleet management system 116 can receive mileage driven in providing transportation services from a vehicle computing device and/or from a provider computing device. Additionally, the fleet management system 116 can allocate personal mileage based on a predetermined ratio between personal mileage and mileage driven in providing transportation services.

In some embodiments, the fleet management system 116 receives a selection from a renter computing device indicating a modification to the provider-rental status or personal-rental status of a rental vehicle. To illustrate, in some embodiments, the fleet management system 116 can receive updated vehicle data from a renter computing device. For example, the fleet management system 116 can receive updated vehicle data corresponding to a rental vehicle that changes a rental vehicle from a personal-rental vehicle to a provider-rental vehicle or vice versa. Additionally or in the alternative, the fleet management system 116 can receive updated vehicle data corresponding to a rental vehicle that changes a rental vehicle from a flexible-provider-rental vehicle to an express-provider-rental vehicle or vice versa. Based on the receipt of such updated vehicle data, the fleet management system 116 can update a vehicle-data summary for the rental vehicle to indicate the corresponding change in status.

In one or more embodiments, the fleet management system 116 provides data for the vehicle-data summaries, statistics, and sorting concerning any provider-rental vehicle or personal-rental vehicle within a fleet. Further, the fleet management system 116 provides this data for provider-rental vehicles and personal-rental vehicles across various different rental locations. Additionally, the fleet management system 116 can provide data for rental provider-rental vehicles and personal-rental vehicles in different regions.

Figure 6A:
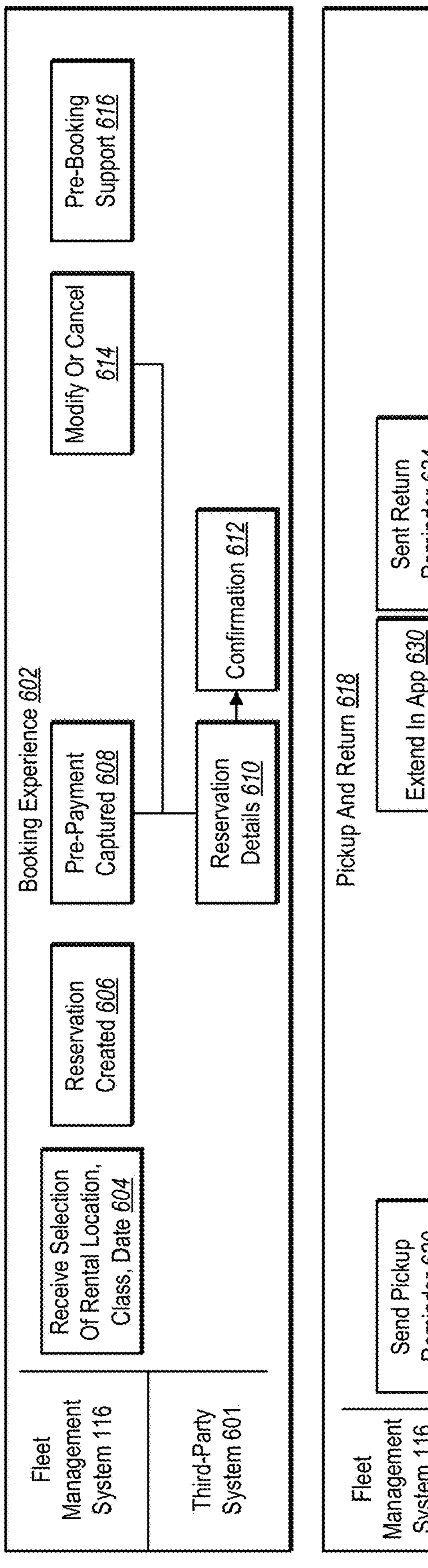
FIG. 6A illustrates an example integration of the fleet management system and a third-party system for managing fleet vehicle rentals across booking, pickup, and return in accordance with one or more embodiments.

As discussed briefly above, the fleet management system 116 can facilitate fleet vehicle rentals. FIG. 6A illustrates the fleet management system 116 communicating with a third-party system 601 to reserve a rental vehicle and facilitate pickup and return of a third-party-rental vehicle. More specifically, FIG. 6A illustrates acts undertaken during a booking experience 602 and during pickup and return 618.

As shown in FIG. 6A, the fleet management system 116 performs an act 604 of receiving a user selection of rental location, class, and date. In one or more embodiments, the fleet management system 116 receives rental location, class, and date from a renter computing device. More specifically, in some embodiments, the fleet management system 116 receives an indication of user selection of the rental location, class, and date from the renter computing device via a transportation matching system and/or rental application.

In some embodiments, after receiving the selection of the rental location, class, and date, the fleet management system 116 performs an act 606 of creating a reservation. More specifically, the fleet management system 116 utilizes the received rental location, class, and date to match the renter computing device to a particular third-party-rental vehicle of the selected class and at the selected rental location. Further, the fleet management system 116 generates a reservation for the particular third-party-rental vehicle on the selected date.

In some embodiments, upon creating a reservation, the fleet management system 116 performs an act 608 of capturing pre-payment. To illustrate, in one or more embodiments, the fleet management system 116 receives an indication of user input from the renter computing device indicating payment information. However, in one or more embodiments, the fleet management system 116 stores rather than processes the payment details. Additionally, in one or more embodiments, the fleet management system 116 provides the payment details to the third-party system 601.

Additionally, as mentioned above, the third-party system 601 performs one or more acts in rental management. For example, as shown in FIG. 6A, in one or more embodiments, the third-party system 601 performs an act 610 of receiving reservation details and an act 612 of providing a confirmation to the renter computing device. To illustrate, in one or more embodiments, the fleet management system 116 receives a rental reservation and corresponding payment details from the fleet management system 116. Further, the fleet management system 116 generates a confirmation including details from the received reservation. Additionally, in one or more embodiments, the fleet management system 116 provides the confirmation to the renter computing device.

As further shown in FIG. 6A, in some embodiments, after capturing pre-payment and forwarding reservation details to the third-party system 601, the fleet management system 116 performs an act 614 of modifying or cancelling a reservation. In one or more embodiments, the fleet management system 116 can receive an indication user input requesting modification or cancelation of a rental reservation from the renter computing device. Based on receiving this modification or cancellation information, the fleet management system 116 can modify and/or cancel the rental reservation. In one or more embodiments, the fleet management system 116 modifies and/or cancels a reservation by providing the modification and/or cancellation information to the third-party system 601.

In addition to sometimes modifying or cancelling a reservation, the fleet management system 116 also performs an act 616 of providing pre-booking support. For example, the fleet management system 116 can provide the renter computing device with various resources for questions, concerns, and direction related to the rental reservation. In one or more embodiments, the fleet management system 116 provides resources in an application or via contact information. Further, to facilitate pre-booking support, in one or more embodiments, the fleet management system 116 aggregates the rental reservation information into a fleet-vehicle database.

FIG. 6A also shows acts performed by the fleet management system 116 and the third-party system during pick-up and return 618 of rental vehicles. To illustrate, during the pickup and return 618, the fleet management system 116 can perform an act 620 of sending a pickup reminder. In one or more embodiments, the fleet management system 116 utilizes the rental reservation information to generate a notification reminding the renter computing device of an impending pickup. Further, the fleet management system 116 utilizes the rental reservation information to determine when to provide the pickup reminder to the renter computing device. For example, the fleet management system 116 can automatically provide the renter computing device with the pickup reminder 48 hours in advance, 12 hours in advance, etc.

In addition to the fleet management system 116 sending a pick-up reminder, in some embodiments, the third-party system 601 performs an act 622 of transporting to a rental location. In one or more embodiments, the third-party system 601 facilitates pick-up of a renter and drop-off of the renter at a rental pickup location. More specifically, in one or more embodiments, the third-party system 601 utilizes a transportation vehicle from a transportation matching system to drop the renter off at the pickup location. To illustrate, the third-party system 601 or renter computing device can submit a transportation request from a current location of the renter computing device to travel to the rental pickup location. Accordingly, the transportation matching system can match the transportation request with a provider device for a corresponding transportation vehicle to transport the renter to the rental location.

In addition to facilitating transport, the third-party system 601 can also perform an act 623 of receiving and processing a deposit. Utilizing the prepayment information received at the act 610, for example, the third-party system 601 processes the payment details to receive a deposit for the rental reservation. In one or more embodiments, the third-party system 601 also provides notification and/or confirmation of this deposit to the renter computing device.

In addition to receiving and processing the deposit, the third-party system 601 can perform an act 626 of facilitating contactless pick-up. As described below with regard to FIG. 8, the third-party system 601 can provide access to the rental location to the renter computing device utilizing a virtual code that the fleet management system 116 provides to the renter computing device, and the renter computing device transmits to various computing devices at the rental location to request access. Additionally, in one or more embodiments, the third-party system 601 can allow a rental vehicle accessed via a virtual code to leave the rental location.

In addition to contactless pick-up, in some embodiments, the third-party system 601 also performs an act 628 of generating an option to extend a reservation. In one or more embodiments, the third-party system 601 determines whether availability at the rental location allows for any extension of the rental reservation. Accordingly, the third-party system 601 can determine potential lengths of time that the rental reservation may be extended for. Thus, the third-party system 601 can generate and provide an option to extend the rental reservation including different length options to the renter computing device.

In one or more embodiments, after the third-party system generates the option to extend the reservation, the fleet management system 116 performs an act 630 of extending a reservation in-application. In one or more embodiments, the third-party system 601 provides the option to extend the reservation to the fleet management system 116 to provide via a rental and/or transportation matching system application. Accordingly, in some embodiments, the fleet management system 116 receives an indication of user interaction with the option to extend the reservation. Thus, the fleet management system 116 can extend the reservation based on receiving such an indication to extend. In one or more embodiments, the fleet management system 116 provides the extension information to the third-party system 601.

As shown in FIG. 6A, the third-party system 601 can perform an act 632 of receiving a return of a rental vehicle. In one or more embodiments, the third-party system 601 receives a return of a rental vehicle at a rental location. The third-party system 601 can receive the return via a rental-location-computing device. For example, the third-party system 601 can receive user input indicating successful return of the rental vehicle via a rental-location-computing device. In addition or in the alternative, the third-party system 601 can facilitate contactless drop-off utilizing a virtual code and/or other vehicle sensors.

Additionally, in one or more embodiments, before receiving a return of a rental vehicle, the fleet management system 116 performs an act 634 of sending a return reminder. Similar to the discussion above with regard to a pickup reminder, in one or more embodiments, the fleet management system 116 utilizes the rental reservation information to generate a notification reminding the renter computing device of an impending rental vehicle return. Further, the fleet management system 116 utilizes the rental reservation information to determine when to provide the return reminder to the renter computing device.

Further, as shown in FIG. 6A, upon receiving the return of the rental vehicle, the third-party system 601 can perform an act 636 of scheduling transportation for the renter. Similar to the discussion above with regard to transport to the rental location, the third-party system 601 can provide a rental request to a transportation matching system for the renter after return of a rental vehicle. In one or more embodiments, the third-party system 601 or a renter computing device requests pick-up of a renter at the rental location and drop-off of the renter at another location.

Also after the return of the rental vehicle, the third-party system 601 can also perform an act of 638 of providing post-booking support. For example, the third-party system 601 can provide the renter computing device with various resources for questions, concerns, and direction related to the rental reservation. Further, to facilitate post-booking support, the third-party system 601 may maintain records of the past rental reservation.

In one or more embodiments, the fleet management system 116 integrates third-party vehicles into graphical user interfaces, including rental selection graphical user interfaces, fleet management interfaces, and/or fleet-location-management interfaces. In some embodiments, the fleet management system 116 integrates rental options corresponding to a third-party system into a rental selection graphical user interface. For example, the fleet management system 116 can provide data for user selectable elements corresponding to third-party-rental vehicles in graphical user interfaces as depicted in FIGS. 7A-8D of and further described by Keith Abdulla et al., Dynamically Determining Provider-Transportation Routes and Rental Vehicle Routes for a Multi-Modal Graphical User Interface, U.S. application Ser. No. 16/834,977 (filed Mar. 30, 2020) (hereinafter, Abdulla), which is incorporated by reference in its entirety.

Additionally, in one or more embodiments, the fleet management system 116 utilizes one or more application programming interfaces (APIs) to provide third-party information via a rental selection graphical user interface. To illustrate, the fleet management system 116 can receive information from the third-party system 601 regarding scheduling, availability, rental vehicle data, etc. For example, the fleet management system 116 can utilize a rental locations API, a calendar API, and/or vehicle APIs to receive information from the third-party system 601 for display on the graphical user interfaces depicted by FIGS. 6B-6M.

To retrieve such information from the third-party system 601, the fleet management system 116 can issue an API call to the third-party system 601. The fleet management system 116 can utilize various APIs to issue various API calls that query different information. To illustrate, the fleet management system 116 can utilize a rental locations API call to query information about rental locations, a calendar API to query information about time-slot availability, and vehicle APIs to query information about rental vehicle availability and characteristics. Accordingly, the fleet management system 116 can receive an API response indicating various information for presentation in a graphical user interface.

Figure 6C:
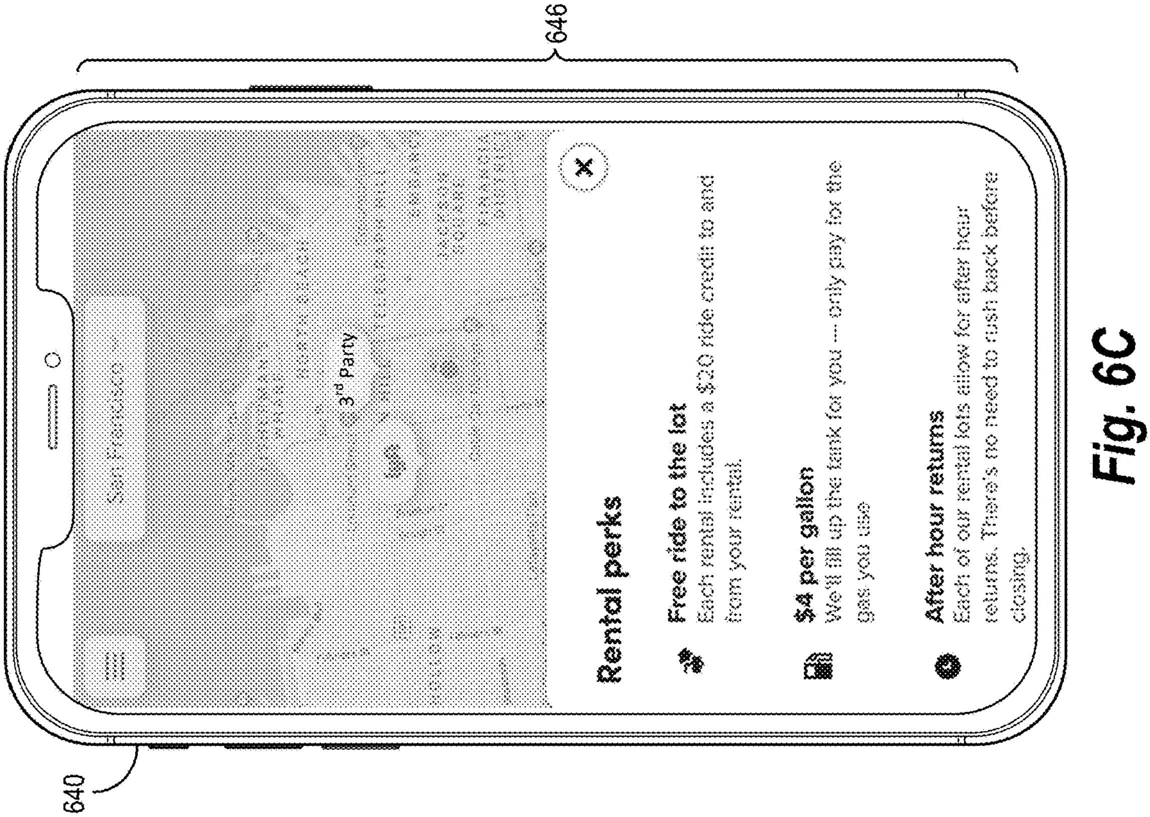
FIGS. 6B-6M illustrate example graphical user interfaces for selecting, reserving, and adjusting a reservation for a third-party-rental vehicle in accordance with one or more embodiments.
Figure 6B:
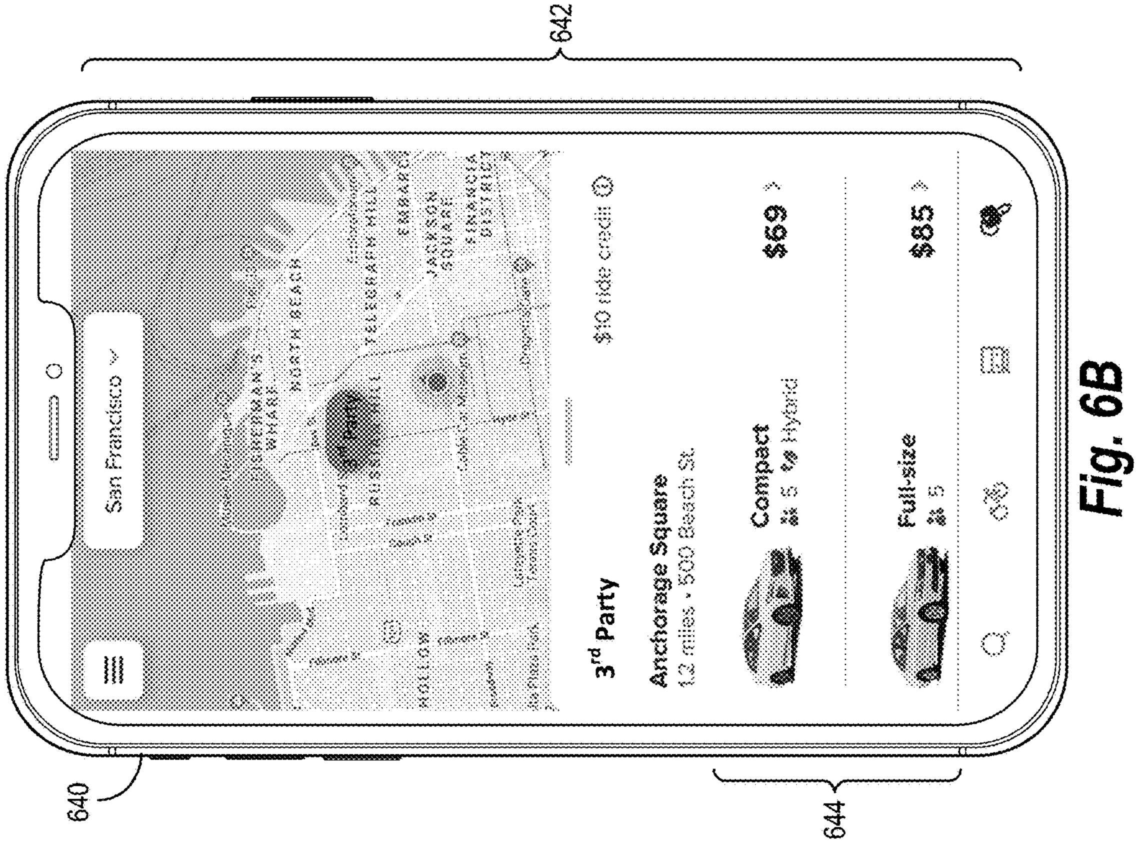

In some embodiments, the fleet management system 116 provides this information to a renter computing device for presentation in a graphical user interface. FIGS. 6B-6M illustrate a renter computing device 640 presenting various example graphical user interfaces for booking and managing a vehicle rental corresponding to a software application (e.g., a transportation matching system application, a rental application). For example, FIG. 6B illustrates the renter computing device 640 presenting a third-party-vehicle-selection interface 642.

As shown in FIG. 6B, the third-party-vehicle-selection interface 642 includes a rental vehicle listing 644 corresponding to a rental location "Anchorage Square." The rental vehicle listing 644 includes information about different vehicle classes available at the rental location and accompanying data, including vehicle features and pricing.

Though the third-party-vehicle-selection interface 642 includes particular information for the "Anchorage Square" location, the fleet management system 116 can receive vehicle information from various locations associated with the third-party system 601.

In one or more embodiments, the fleet management system 116 utilizes a rental locations API to populate the third-party-vehicle-selection interface 642 with vehicle information corresponding to the particular rental location. In some embodiments, the fleet management system 116 generates a rental locations API call to the third-party system 601. In response, in one or more embodiments, the fleet management system 116 receives a listing of regions, a current region for a renter computing device, and a list of rental locations corresponding to the different regions. Additionally, in one or more embodiments, the fleet management system 116 receives a list of available vehicle types. As shown in FIG. 6B, the fleet management system 116 can provide this received data to the renter computing device 640 for presentation in the third-party-vehicle-selection interface 642.

In some cases, the renter computing device 640 presents information associated with rental vehicles in general. As shown in FIG. 6C, the renter computing device 640 presents a rental information interface 646. In some embodiments, the renter computing device 640 presents the rental information interface 646 based on detecting a selection of a menu or a rental information icon (e.g., a circular icon with the letter "I" inside). The rental information interface 646 includes information about amenities offered at a selected rental location. For example, as shown in FIG. 6C, the rental information interface 646 includes information about the amenities "Free ride to the lot," "$4 per gallon," and "After hours returns." However, the renter computing device 640 can present a rental perks interface including a variety of perks received from the fleet management system 116.

More specifically, the fleet management system 116 can utilize the rental locations API to query the third-party system 601 for information about amenities at a rental location. Accordingly, the fleet management system 116 can receive the information about the amenities at the rental location from the third-party system 601. Thus, in one or more embodiments, the fleet management system 116 provides the information about amenities at rental locations to the renter computing device 640 for presentation in the rental information interface 646.

Figure 6D:
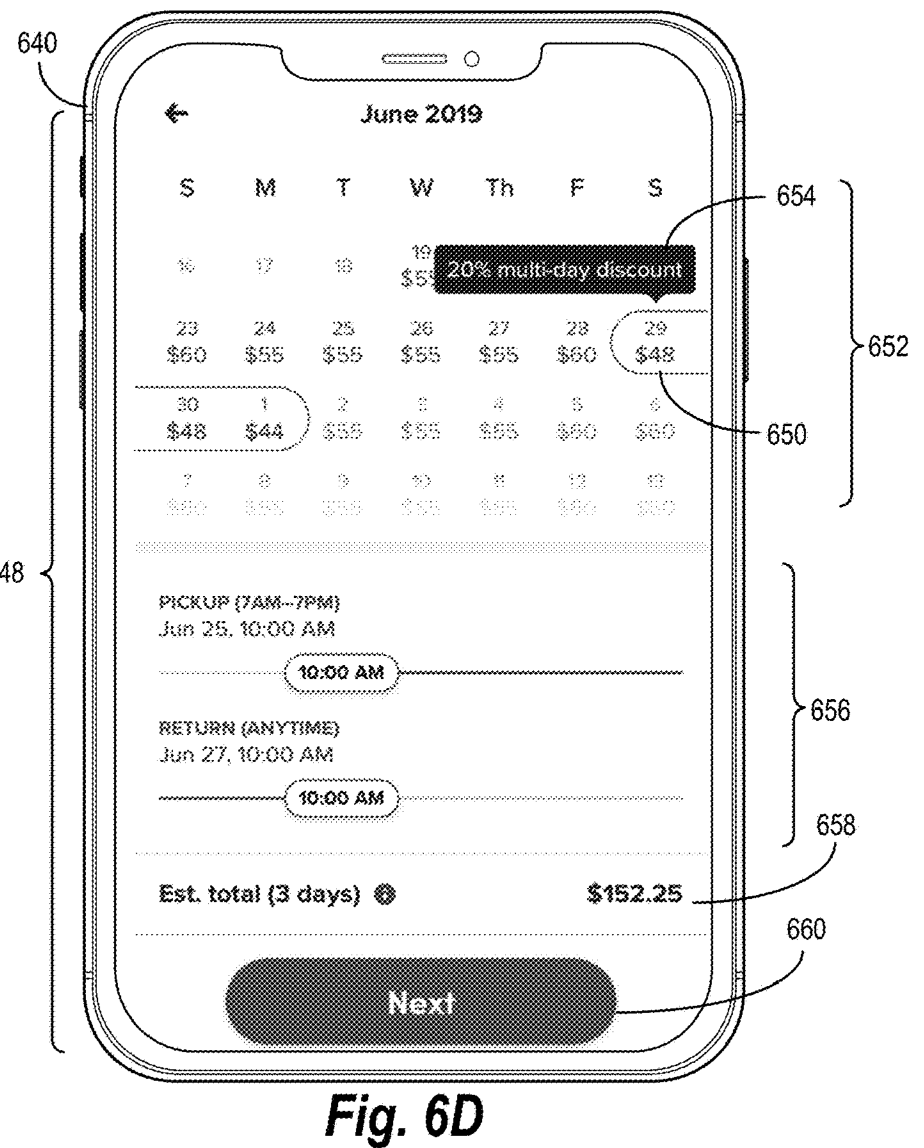

FIG. 6D illustrates the renter computing device 640 displaying a rental-reservation-user interface 648 as an example graphical user interface by which a renter can generate or modify a rental-vehicle reservation. Based on user interaction with elements of the rental-reservation-user interface 648, the fleet management system 116 modifies the rental parameters. As illustrated in FIG. 6D, for instance, the rental-reservation-user interface 648 includes a calendar 652 including a selected-rental-duration indicator 650 and a duration-discount notification 654. The rental-reservation-user interface 648 further comprises a vehicle pickup and return time elements 656, a rental-vehicle rate 658, and a confirmation element 660.

As illustrated in FIG. 6D, the calendar 652 comprises a visual representation of a monthly calendar. The renter computing device 640 presents the calendar 652, which visually indicates (e.g., by including a circle around) the selected-rental-duration indicator 650 based on renter interaction with the rental-reservation-user interface 648. For example, the renter computing device 640 can generate the selected-rental-duration indicator 650 based on detecting a user tap of the first and last dates or a dragging motion between the dates of the desired rental duration. As illustrated in FIG. 6D, the renter computing device 640 generates the selected-rental-duration indicator 650 to show that the renter selected the rental duration of June 29-July 1.

As further shown in FIG. 6D, the rental-reservation-user interface 648 also includes the duration-discount notification 654. The renter computing device 640 presents the duration-discount notification 654 based on determining that the rental duration meets a threshold length. The duration-discount notification 654 indicates the discount value and the reason for the discount. The renter computing device 640 may also present additional notifications in place of (or in addition to) the duration-discount notification 654. For example, the renter computing device 640 can present a notification indicating a reduced rate contingent on returning the rental vehicle at a particular rental-vehicle location.

As further illustrated in FIG. 6D, the calendar 652 includes both date values as well as predicted daily rates. For example, the fleet management system 116 associates each date with a predicted daily rate. In one or more embodiments, the fleet management system 116 receives the calendar information from the third-party system 601 utilizing a calendar API. More specifically, the fleet management system 116 can send an API call to the third-party system 601 for such calendar information. Accordingly, the fleet management system 116 can receive an API response including various calendar information from the third-party system 601 in response to the API call.

To illustrate, in one or more embodiments, the fleet management system 116 receives rental rate information for the calendar dates. Additionally, the fleet management system 116 can receive availability information for the calendar dates. The fleet management system 116 can provide this information to the renter computing device 640 for presentation in the calendar 652. In one or more embodiments, the fleet management system 116 determines (and the renter computing device 640 presents) a total rental rate for multiple selected dates based on the received rental rates for calendar dates.

As further illustrated in FIG. 6D, the rental-reservation-user interface 648 includes the vehicle pickup and return time elements 656. The renter computing device 640 can receive user input selecting and/or modifying pick-up and return times. Based on detected requestor interaction with the vehicle pickup and return time elements 656 at the renter computing device 640, the fleet management system 116 adjusts the rental vehicle pickup time and the rental vehicle return time.

In addition to a calendar and return times in FIG. 6D, the renter computing device 640 presents the rental-vehicle rate 658. More specifically, the requestor device 640 generates the rental-vehicle rate 658 based on the received renter input and the daily calendar rates received from the fleet management system 116. In addition or in the alternative, the fleet management system 116 and/or the third-party system 601 generate the rental-vehicle rate 658 and provide the rental-vehicle rate 658 to the renter computing device 640. Based on detecting selection of the confirmation element 660, the fleet management system 116 confirms the received renter selections.

Figure 6E:
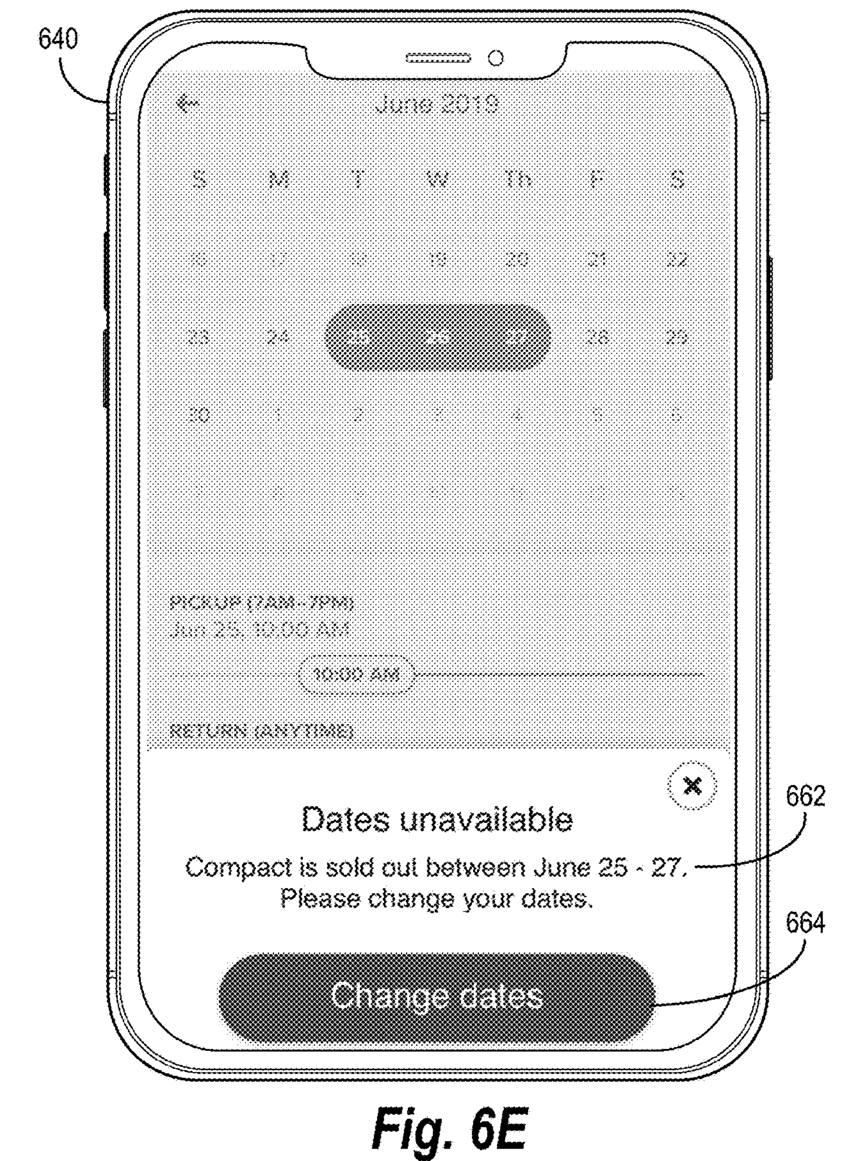

In some cases, the renter computing device 640 selects dates (or receives a selection of dates) for which a rental vehicle (e.g., a third-party-rental vehicle) is unavailable. As shown in FIG. 6E, for instance, the renter computing device 640 presents an unavailability notice 662 within a graphical user interface. The unavailability notice 662 includes the text "Dates unavailable," "Compact is sold out between June 25-27," and "Please change your dates." The unavailability notice 662 also includes an acknowledgement button 664. Though FIG. 6E illustrates an example unavailability notice 662, the renter computing device 640 can present various unavailability notices based on different rental vehicle availability and user selections.

More specifically, in one or more embodiments, the fleet management system 116 receives rental vehicle availability from the third-party system 601. Additionally, the fleet management system 116 receives an indication of user selection of particular dates. Based on determining that rental vehicles in a particular location are not available for the selected dates, the fleet management system 116 provides the unavailability notice 662 to the renter computing device 640. In addition or in the alternative, the renter computing device 640 can receive rental-vehicle-availability information from the fleet management system 116 and can detect the user selection of calendar dates. In some such embodiments, the fleet management system 116 can determine vehicles are unavailable for the user-selected dates and can accordingly generate and provide the unavailability notice 662.

Figure 6F:
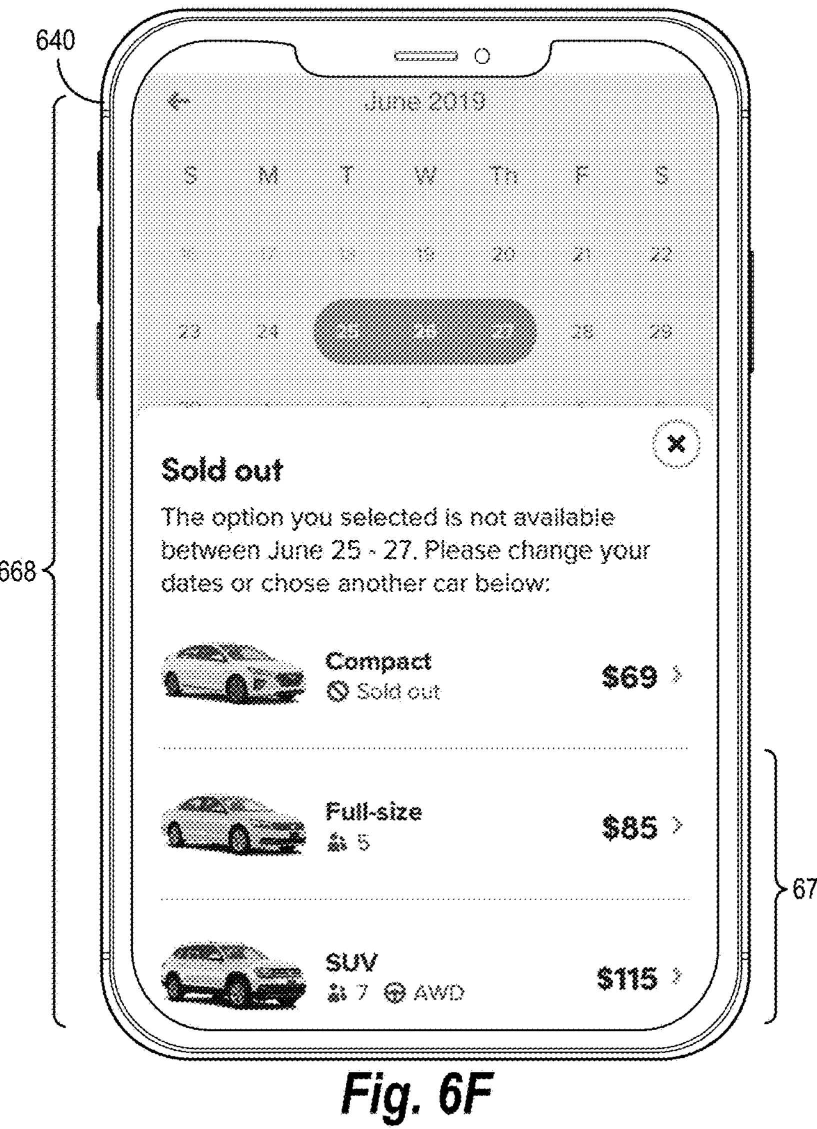

In addition or in the alternative to showing such an unavailability notice, in some embodiments, the renter computing device 640 displays alternative rental options or alternative rental date options within a graphical user interface. As illustrated in FIG. 6F, for instance, the renter computing device 640 can also present an alternative options interface 668 in response to determining a user selection is unavailable. The alternative options interface 668 includes the text "Sold out," "The option you selected is not available between June 25-27," and "Please change your dates or choose another car below." As shown in FIG. 6F, the alternative options interface 668 also includes alternate rental vehicles 670, including listing of availability and pricing information for "Full-size" and "SUV" categories, despite "Compact" being sold out.

To illustrate, the fleet management system 116 and/or the renter computing device 640 can determine alternate vehicle types to a selected unavailable vehicle type that are available at a rental location during selected calendar dates, including other third-party-rental vehicles. As discussed above, the fleet management system 116 can receive vehicle availability data from the third-party system 601 and can further provide this availability data to the renter computing device 640. Accordingly, in one or more embodiments, the renter computing device 640 presents the availability information for various rental vehicle options.

Figure 6G:
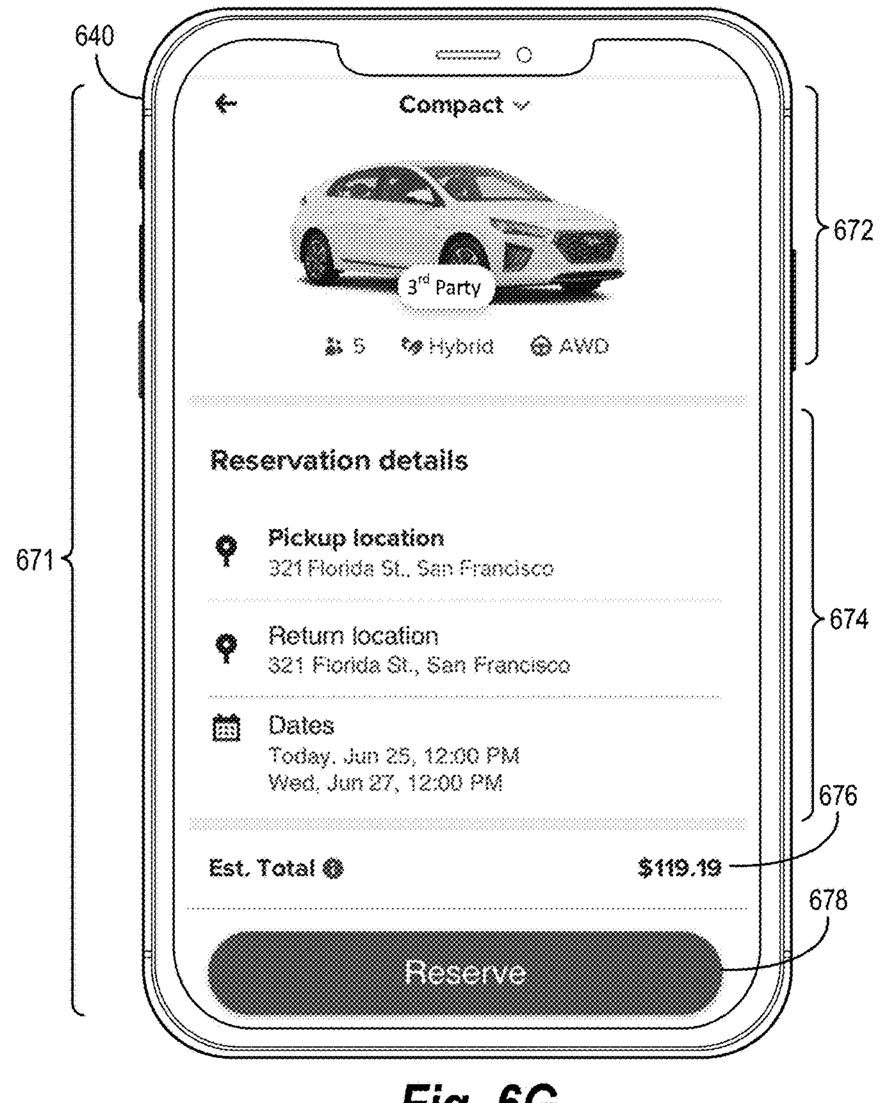

When a selected third-party-rental vehicle is available on selected rental dates, the fleet management system 116 can provide and the renter computing device 640 can present additional information concerning the third-party-rental vehicle. As shown in FIG. 6G, for instance, the renter computing device 640 presents a reservation-review-user interface 671 to provide an overview of the rental reservation—including various conformation elements—based on the renter selections. As illustrated in FIG. 6G, the reservation-review-user interface 671 includes vehicle information 672, reservation details 674, and a rental-vehicle rate 676.

As shown in FIG. 6G, the renter computing device 640 presents the vehicle information 672. As discussed above, the fleet management system 116 can receive vehicle data from the third-party system 601 and can further provide this availability data to the renter computing device 640. For example, as shown in FIG. 6G, the vehicle information 672 includes information on the type, seating capacity, handling type, and fuel type for a selected rental vehicle.

As further shown in FIG. 6G, the renter computing device 640 also presents the reservation details 674. More specifically, the renter computing device 640 presents information regarding the rental-vehicle location, return location information, and rental duration dates. Based on receiving an indication of detected interaction with the reservation details 674, the fleet management system 116 can adjust the corresponding rental parameter. For example, based on detecting requestor selection of a return location, the fleet management system 116 may generate and transmit prompts for selecting a different rental-vehicle location for picking up the rental vehicle.

As further shown in FIG. 6G, the reservation-review-user interface 671 also includes the rental-vehicle rate 676. As discussed above, the fleet management system 116 and/or the renter computing device 640 can determine the rental-vehicle rate 676 based on received user selections and received rate information. Further, the renter computing device 640 presents a confirmation option 678. Based on receiving an indication of user interaction at the confirmation option 678, the fleet management system 116 can confirm the reservation and its corresponding details.

Figures 6H, 6I:
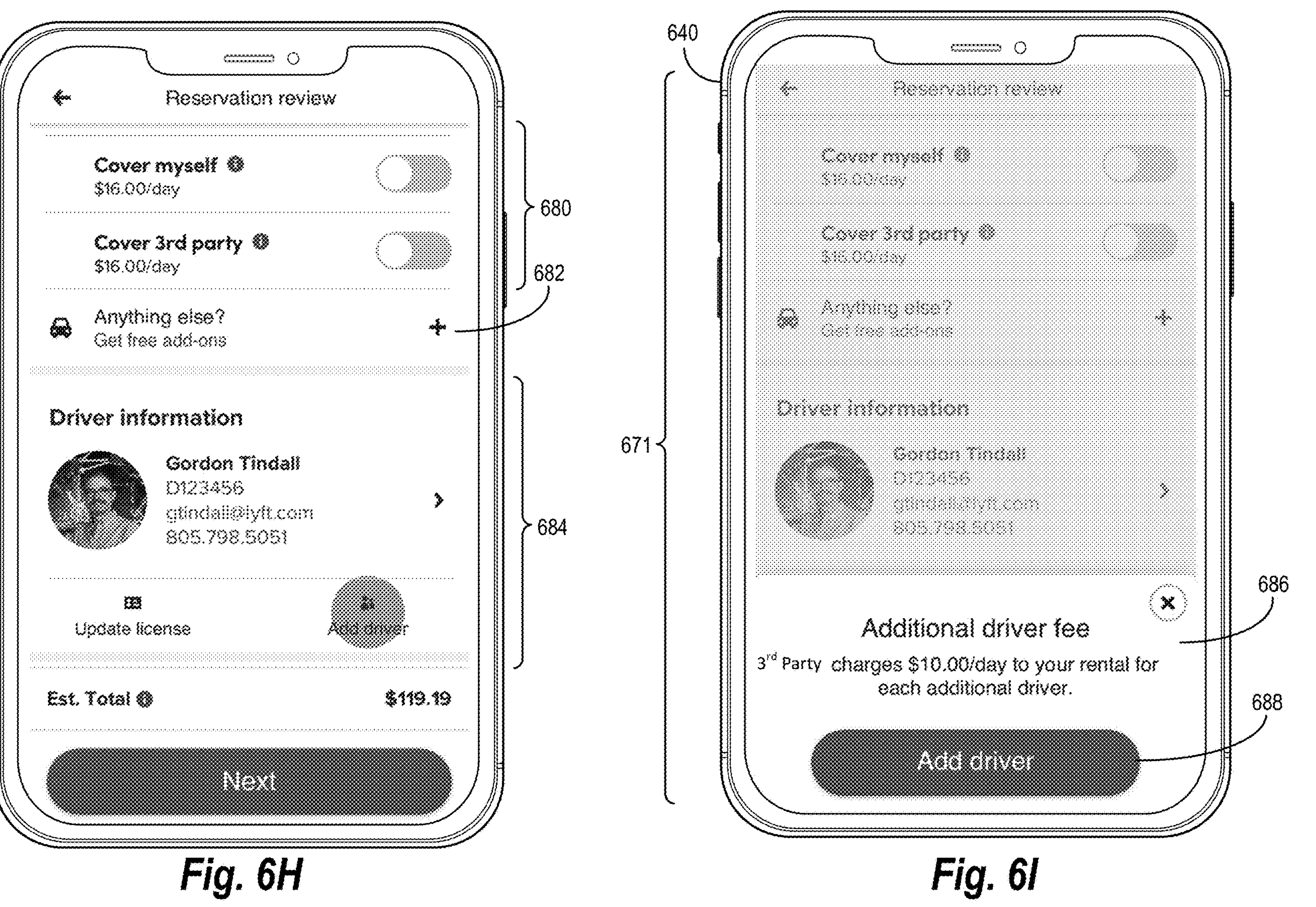

As shown in FIG. 6H, the renter computing device 640 can present additional conformation elements within the reservation-review-user interface 671 beyond the information illustrated in FIG. 6G. For example, as illustrated in FIG. 6H, the renter computing device 640 can present additional confirmation elements, including rental coverage elements 680, an add-on-selection element 682, and a driver information area 684.

As shown in FIG. 6H, the renter computing device 640 presents the rental coverage elements 680, each of which can be selected by the rental requestor by interacting with corresponding options (e.g., toggle buttons). In one or more embodiments, based on user interaction with the rental coverage elements 680, the fleet management system 116 adds and/or adjusts rental coverage information for insurance purposes. In at least one embodiment, the fleet management system 116 provides various degrees of insurance coverage. Based on selection of one or more of the rental coverage elements 680, the fleet management system 116 may also transmit, for display on the renter computing device 640, additional coverage options, including coverage provided by the payment companies associated with the payment option selected by the rental requestor.

In addition to coverage options, the renter computing device 640 presents interactive elements for selecting rental vehicle add-ons. As illustrated in FIG. 6H, the fleet management system 116 also provides the add-on-selection element 682. Based on selection of the add-on-selection element 682, the requestor device 116 presents various add-on options. To illustrate, the fleet management system 116 may provide additional options including child/baby seats, bike or other gear racks, snow gear, GPS navigation units, and other add-ons.

As further shown in FIG. 6H, the renter computing device 640 presents the driver information area 684. In at least one embodiment, the fleet management system 116 presents the driver information area 684 based on information from the renter computing device 640 and/or a corresponding renter account. For example, the fleet management system 116 accesses information stored by the dynamic transportation matching system 114 regarding the requestor account. As illustrated, the driver information area 684 includes the name, driver's license number, and contact information for the corresponding rental requestor. The rental requestor may select the driver information and provide updated driver information.

Additionally, as shown in FIG. 6H, the driver information area 684 includes an option to add another driver. As shown in FIG. 6I, in some embodiments, in response to detecting selection of an add-driver option, the renter computing device provides the additional driver overlay 686 within the reservation-review-user interface 671. The additional driver overlay 686 includes the text "Additional driver fee" and a corresponding explanation: "Third-party charges $10.00/day to your rental for each additional driver." However, the additional driver overlay 686 can include a variety of fee information based on rental location information that the fleet management system 116 receives from the third-party system 601.

As further shown in FIG. 6I, the additional driver overlay 686 includes an add-driver-confirmation option 688. Based on receiving an indication of a selection of the add-driver-confirmation option 688, the fleet management system 116 can provide a prompt to the renter computing device 640 for input of information regarding the additional driver.

Figure 6J:
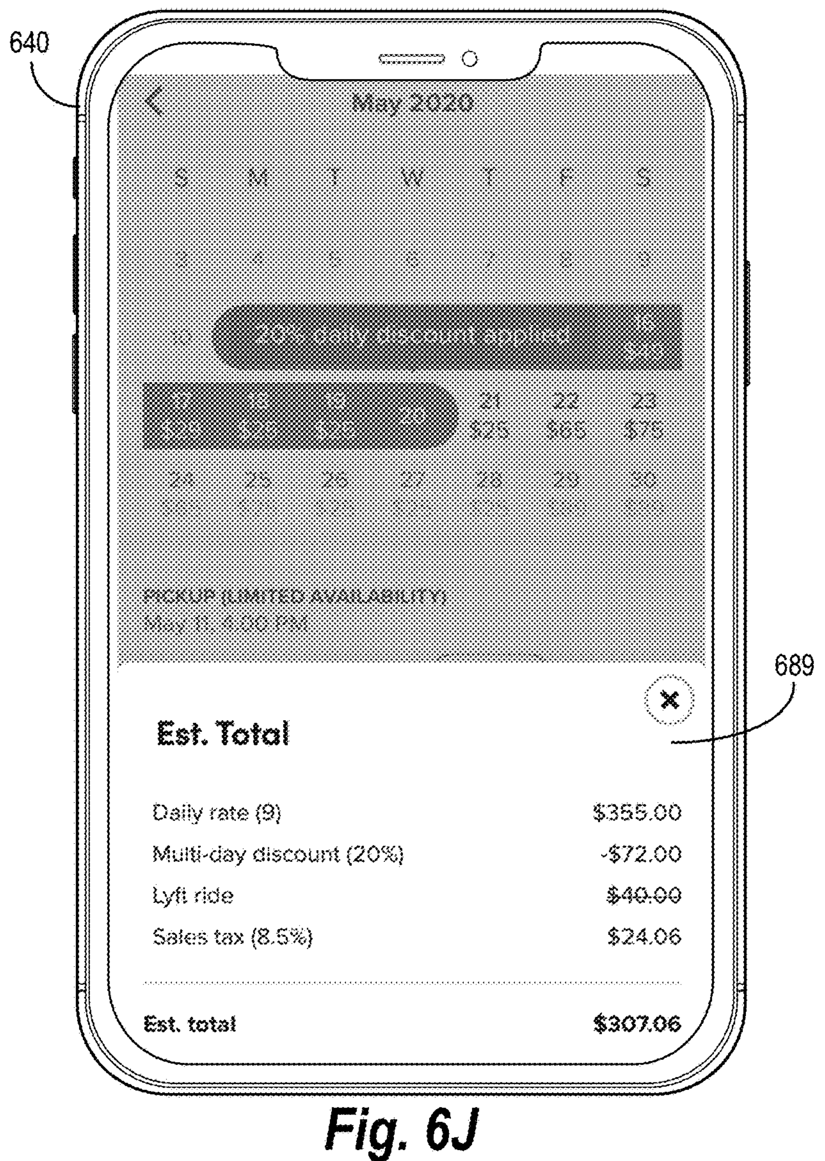

As discussed above, in one or more embodiments, the renter computing device 640 and/or the fleet management system 116 determine a total rental rate for selected dates based on rental rates for calendar dates received from the third-party system 601. Based on detecting a rental-rate-information icon (e.g., a circular icon with the letter "I" inside as shown in FIG. 6D), the renter computing device 640 can provide more details concerning a rental rate. As shown in FIG. 6J, for example, the renter computing device 640 presents a total rate overlay 689 within a graphical user interface. As shown, the renter computing device 640 can provide an itemized listing of costs corresponding to the total rate in the total rate overlay 689.

Figure 6K:
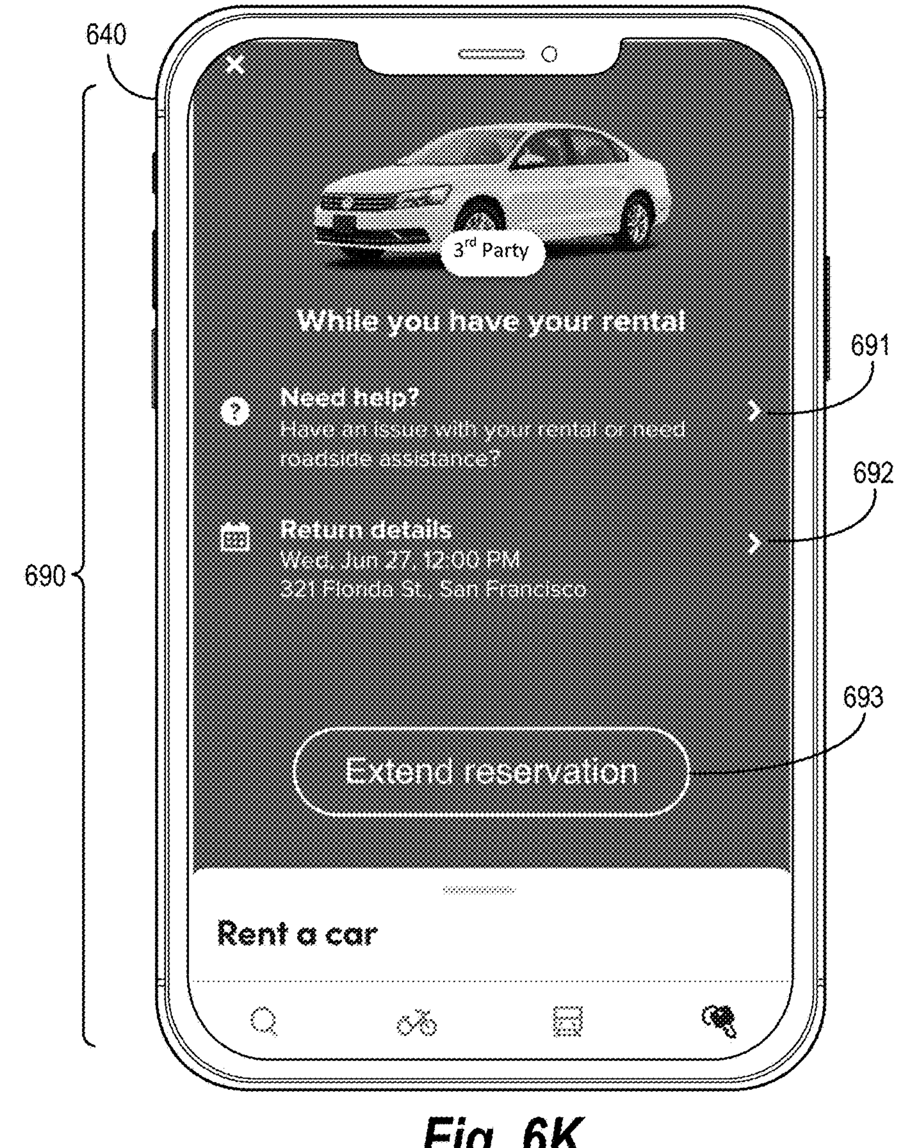

In addition to graphical user interfaces for reserving a third-party-rental vehicle, the fleet management system 116 can also provide graphical user interfaces to confirm a reservation or to facilitate additional options or features for a reservation. As shown in FIG. 6K, for instance, the renter computing device 640 presents a rental information interface 690. In one or more embodiments, the renter computing device 640 presents the rental information interface 690 during an active rental period. As shown in FIG. 6K, the rental information interface 690 includes a help element 691, a return details element 692, and an extend reservation element 693.

In one or more embodiments, in response to receiving user interaction at the help element 691, the renter computing device 640 presents different options for assistance with a rental vehicle. For example, the renter computing device 640 can provide options for roadside assistance. Additionally, in response to receiving user interaction at the return details element 692, the renter computing device 640 can provide information about returning the third-party-rental vehicle, such as driving guidance to the return location. In one or more embodiments, the fleet management system 116 can provide the reservation-review-user interface illustrated in FIG. 6G based on detecting a selection of the return details element 692 illustrated in FIG. 6K.

Figure 6L:
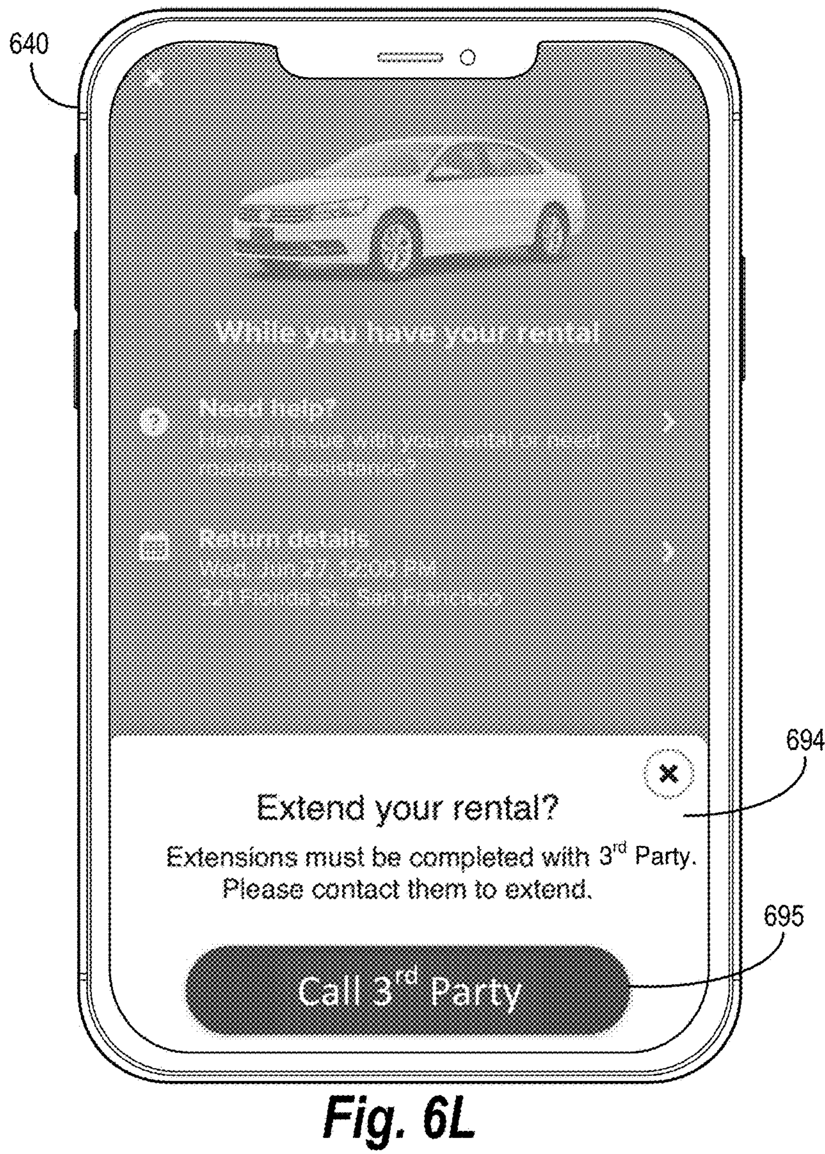

As also shown in FIG. 6K, the rental information interface 690 includes an extend reservation option 693. In one or more embodiments, in response to detecting user interaction at the extend reservation option 693, the renter computing device 640 provides the rental extension overlay 694 as illustrated in FIG. 6L. As shown in FIG. 6L, the rental extension overlay 694 includes the text "Extensions must be completed with 3rd party" and "Please contact them to extend."

As further shown in FIG. 6L, the rental extension overlay 694 includes a third-party-call option 695. In one or more embodiments, in response to detecting a user selection of the third-party-call option 695, the renter computing device 640 can provide contact information for the third party (e.g., third-party-rental company). For example, the renter computing device 640 can display a mobile call application with a phone number corresponding to the third-party system 601.

Figure 6M:
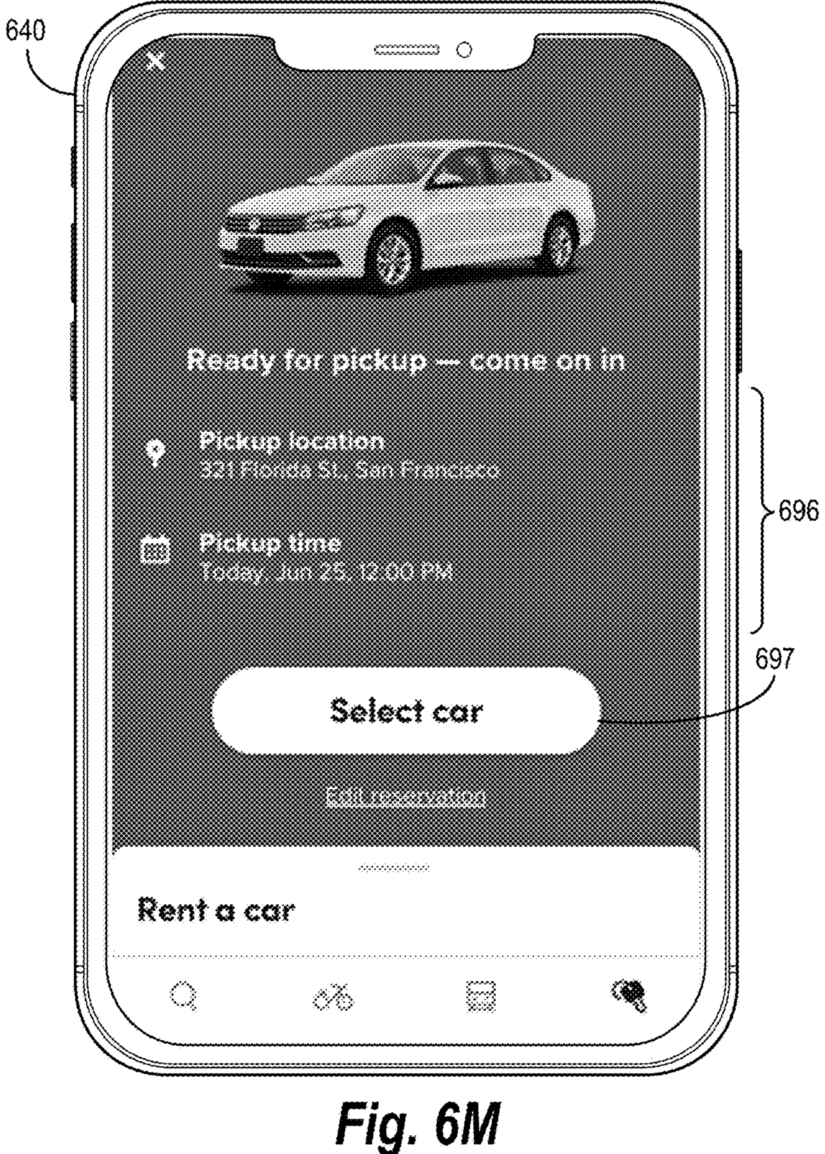

In addition to graphical user interfaces for extending a reservation for a third-party-rental vehicle, the fleet management system 116 can also provide graphical user interfaces for confirmation a reservation or selecting a particular third-party-rental vehicle for pickup. As shown in FIG. 6M, for instance, the renter computing device 640 can present a pickup information interface 696. In one or more embodiments, the renter computing device 640 presents the pickup information interface 969 in response to determining that pickup is within a threshold time (e.g. 24 hours, 1 hour). To illustrate, the pickup information interface 696 can include information about the pickup location and/or pickup time associated with a rental reservation. In one or more embodiments, in response to receiving user selection of pickup information, the renter computing device 640 provides options to modify the pickup information.

As further shown in FIG. 6M, the pickup information interface 696 includes a select car option 697. In one or more embodiments, in response to detecting user interaction at the select car option 697, the renter computing device 640 presents one or more rental vehicles for selection. Similar to the discussion above with regard to FIGS. 6B and 6F, the renter computing device 640 can provide rental vehicle data received from the third-party system 601 via the fleet management system 116.

FIGS. 7A-7C illustrate example fleet-location-management interfaces for the fleet management system 116. As discussed above, the fleet management system 116 can provide location-specific vehicle data in fleet-location-management interfaces. FIGS. 7A-7C have a fleet-location-management interface that differs from that fleet management interface shown in FIG. 5 in part because the fleet-location-management interfaces depicted in FIGS. 7A-7C are region specific or location specific, including the example vehicle-data summaries in FIG. 7C. FIGS. 7A-7C illustrate example fleet-location-management interfaces that the fleet management system 116 provides for regions and locations corresponding to a vehicle fleet. The fleet management system 116 can provide data to a computing device 701 to present the fleet-location-management interfaces depicted in FIGS. 7A-7C according to computer-executable instructions on a software application of the computing device 701 (e.g., web browser or native application). Additionally, though FIGS. 7A-7C illustrate fleet-location-management interfaces with example designs, the fleet management system 116 can provide data for graphical user interfaces in accordance with a variety of visual designs.

For example, FIG. 7A illustrates the computing device 701 displaying a fleet-location-management interface 700 including various regions. More specifically, the fleet-location-management interface 700 includes data regarding the types of fleet locations in various regions. As shown in FIG. 7A, the fleet-location-management interface 700 includes a region ID column 702. In this particular example, the fleet-location-management interface 700 includes regions corresponding to airports. However, in one or more embodiments, the fleet management system 116 can generate the fleet-location-management interface 700 including regions generated based on a variety of criteria.

Additionally, as shown in FIG. 7A, the computing device 701 displays, within the fleet-location-management interface 700, various columns 704-716 listing a number of locations of various types in the regions indicated in the region ID column 702. More specifically, the fleet-location-management interface 700 includes a hubs column 704, a vehicle service column 706, an express drive column 708, a rental lots column 710, an impound lots column 712, a storage facility column 714, and a miscellaneous column 716. In one or more embodiments, the fleet management system 116 aggregates data regarding fleet locations in the variety of regions and generates the fleet-location-management interface 700 to reflect a number of associated fleet locations corresponding to the category set forth in each column (e.g., a number of hubs within the region in the hubs column 704, a number of express drive locations within the region in the express drive column 708).

In response to receiving user input at a region of the region ID column 702, in some embodiments, the fleet management system 116 provides a fleet-location-management interface corresponding to the selected region. FIG. 7B illustrates the computing device 701 displaying a fleet-location-management interface 720 corresponding to the region "SFO." The computing device 701 displays, within the fleet-location-management interface 720, various locations in the SFO region and information corresponding to these regions. As shown in FIG. 7B, the computing device 701 displays, within the fleet-location-management interface 720, first-party locations 722 and service locations 724. Accordingly, in one or more embodiments, the fleet management system 116 provides location information for the fleet-location-management interface 720 based on vehicle data received from first-party and third-party computing devices and systems.

As further shown in FIG. 7B, the computing device 701 also displays, within the fleet-location-management interface 720, various columns that include various information corresponding to the region. For example, the computing device 701 displays, within the fleet-location-management interface 720, a location name column 726 that shows the name of various locations in the region. In one or more embodiments, the fleet management system 116 receives name data from rental-location-computing devices, administrator computing devices, and/or other computing devices at the locations.

Additionally, the computing device 701 displays, within the fleet-location-management interface 720, a location type column 728, which indicates whether the location is a first-party location or a third-party location. As discussed above, the fleet management system 116 can utilize both first-party and third-party rental and service locations to manage a vehicle fleet. The fleet management system 116 can track whether each of the locations in the fleet-location-management interface 720 are first-party or third-party locations. For example, as shown in FIG. 7, the fleet-location-management interface 720 includes a third-party location 727. Accordingly, the location type column 728 indicates that the third-party location 727 is a third-party location.

As further shown in FIG. 7B, the computing device 701 displays a location queue column 730 within the fleet-location-management interface 720. The location queue column 730 includes information corresponding to queue types available at the corresponding location. As discussed above with regard to FIG. 4, the fleet management system 116 can manage various queue types in a fleet location. Accordingly, the fleet management system 116 can track the queue types at different rental locations and provide the information in the location queue column 730. In one or more embodiments, the fleet management system 116 receives queue information from various vehicle-service-computing devices corresponding to the locations.

Additionally, as shown in FIG. 7B, the computing device 701 displays, within the fleet-location-management interface 720, a location address column 732. The location address column 732 includes physical addresses corresponding to the locations listed under the location name column 726. Similar to the discussion above, in one or more embodiments, the fleet management system 116 receives queue information from various vehicle-service-computing devices corresponding to the locations.

Further, as shown in FIG. 7B, the computing device 701 displays, within the fleet-location-management interface 720, a location services column 734. The location services column 734 includes a listing of one or more services provided at a fleet location listed under the location name column 726. In one or more embodiments, the fleet management system 116 receives service information from one or more vehicle-service-computing devices corresponding to a location.

In addition to the region-specific details in the fleet-location-management interface 720, in some embodiments, the fleet management system 116 can provide data for a location-specific fleet-location-management interface in response to receiving user selection of a fleet location in the fleet-location-management interface 720. FIG. 7C illustrates a fleet-location-management interface 740 corresponding to the "Lyft Driver Center—San Francisco." To illustrate, the fleet management system 116 can provide data for the fleet-location-management interface 740 in response to receiving user selection of an option for the Lyft Driver Center—San Francisco in the fleet-location-management interface 720. Such an option may be visible as a graphical element within the fleet-location-management interface 720, embedded in the text for the name of a fleet-vehicle center (e.g., Lyft Driver Center—San Francisco), or have some other suitable representation within the fleet-location-management interface 720.

As shown in FIG. 7C, the fleet-location-management interface 740 includes a listing of a variety of vehicle data corresponding to renters at a particular fleet location. In one or more embodiments, the computing device 701 displays vehicle-data summaries in rows with data corresponding to each column. For example, the computing device 701 displays a renter indicator column 744 within the fleet-location-management interface 740. The renter indicator column 744 includes renter indicators including renter names and renter profile pictures. In one or more embodiments, the fleet management system 116 receives the renter names and renter profile pictures from renter computing devices, provider devices, and/or requestor devices corresponding to the vehicles at the fleet location. As described below with regard to FIGS. 8A-8B, in response to receiving user selection of a renter indicator, the fleet management system 116 can provide a renter-activity summary corresponding to a particular renter.

As further shown in FIG. 7C, the fleet-location-management interface 740 includes a queue column 746. As discussed above, the fleet management system 116 can dynamically manage a variety of different queues corresponding to a single fleet location. As shown in FIG. 7C, the fleet management system 116 manages both a vehicle service queue and a mobile service queue at this fleet location. The fleet management system 116 can provide vehicle data corresponding to a variety of vehicle queues in the fleet-location-management interface 740.

As also shown in FIG. 7C, the fleet-location-management interface 740 includes a service type column 748. In one or more embodiments, the fleet management system 116 manages vehicle queues including vehicles undergoing a variety of types of services. In some embodiments, the fleet management system 116 receives information about service types corresponding to fleet vehicles based on appointment and/or reservation requests received from renter computing devices. Accordingly, the fleet management system 116 provides the information about service types to the computing device 701 for presentation in the service type column 748 of the fleet-location-management interface 740.

In one or more embodiments, the computing device 701 further displays a vehicle identifier column 750 within the fleet-location-management interface 740. As shown in FIG. 7C, the vehicle identifier column 750 includes a listing of a manufacturer, model, and vehicle identification number corresponding to each fleet vehicle. The fleet management system 116 provides manufacturer, model, and vehicle identification number to the computing device 701 for presentation in the vehicle identifier column 750 of the fleet-location-management interface 740.

In some embodiments, the computing device 701 displays a notes column 752 within the fleet-location-management interface 740. The notes column 752 can include a variety of information received from a vehicle-service-computing device. As shown in FIG. 7C, the notes column 752 includes service notes related to specific issues experienced by each fleet vehicle. For example, the notes column 752 includes notes such as "cabin air filter, oil change" denoting services performed or to be performed. In some embodiments, the fleet management system 116 can automatically generate notes for a fleet vehicle based on vehicle data received from a renter computing device during a reservation request.

As further shown in FIG. 7C, the computing device 701 can also display a reservation column 754 within the fleet-location-management interface 740. The reservation column 754 includes a quoted reservation time corresponding to a service appointment for each fleet vehicle. In one or more embodiments, the fleet management system 116 receives the reservation time from a vehicle-service-computing device at the fleet location and/or from the renter computing device during a reservation request.

In addition to the columns described above, in one or more embodiments, the computing device 701 also displays a time column 756 and a service stage column 758 within the fleet-location-management interface 740. As discussed above with regard to FIG. 4, the fleet management system 116 can track the progress of a fleet vehicle during a service at a fleet location (e.g. a fleet-vehicle center). More specifically, the fleet management system 116 can receive information about the progress of a fleet vehicle through service from vehicle-service-computing devices. The fleet management system 116 can utilize this information to determine time elapsed since the beginning of a service for the time column 756. Similarly, the fleet management system 116 can utilize this information to provide a stage of the service for the service stage column 758, such as check-in or check-out. The fleet management system 116 can provide this information to the computing device 701 for presentation within the time column 756 or the service stage column 758 of the fleet-location-management interface.

As an example of a vehicle-data summary with data according to the columns 744-758, the computing device 701 displays a vehicle-data summary 760 within the fleet-location-management interface 740. To illustrate, the vehicle-data summary 760 corresponds to the driver "Dan Ruble." As shown in FIG. 7C, the vehicle-data summary 760 corresponds to a vehicle in a vehicle service queue for a service. Further, the vehicle-data summary 760 includes a "Make A, Model 2" with a VIN "C927369198." Additionally, the vehicle-data summary 760 includes notes reading "PV, Something Else, Tire and TPMS Sensors messed up." The vehicle-data summary 760 also includes a reservation time of 10:30 AM with 9 minutes in service. The vehicle-data summary 760 shows that the corresponding vehicle is pending check-out.

Figure 8A:
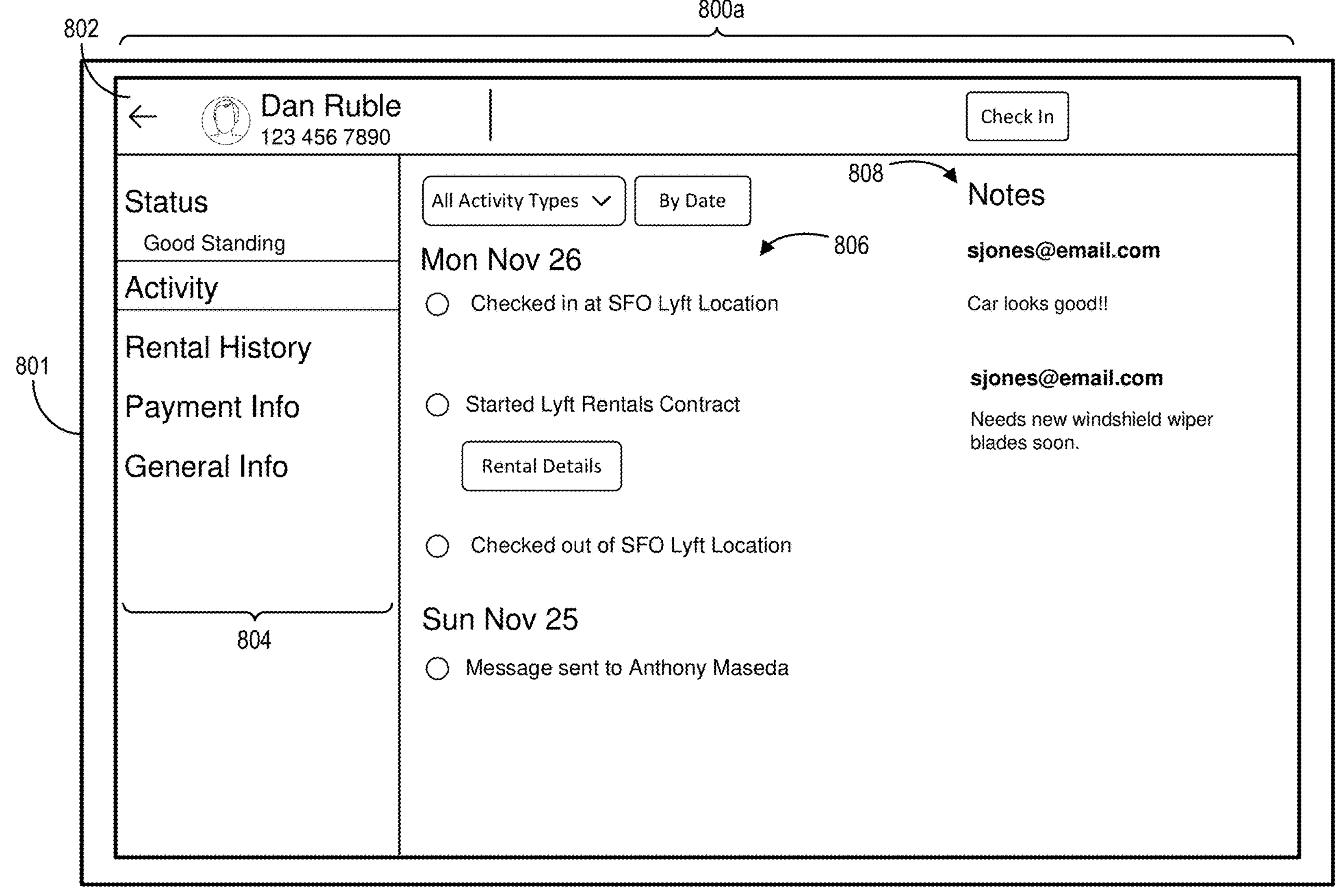
FIGS. 8A-8B illustrate a computing device presenting example graphical user interfaces including renter-activity summaries in accordance with one or more embodiments.
Figure 8B:
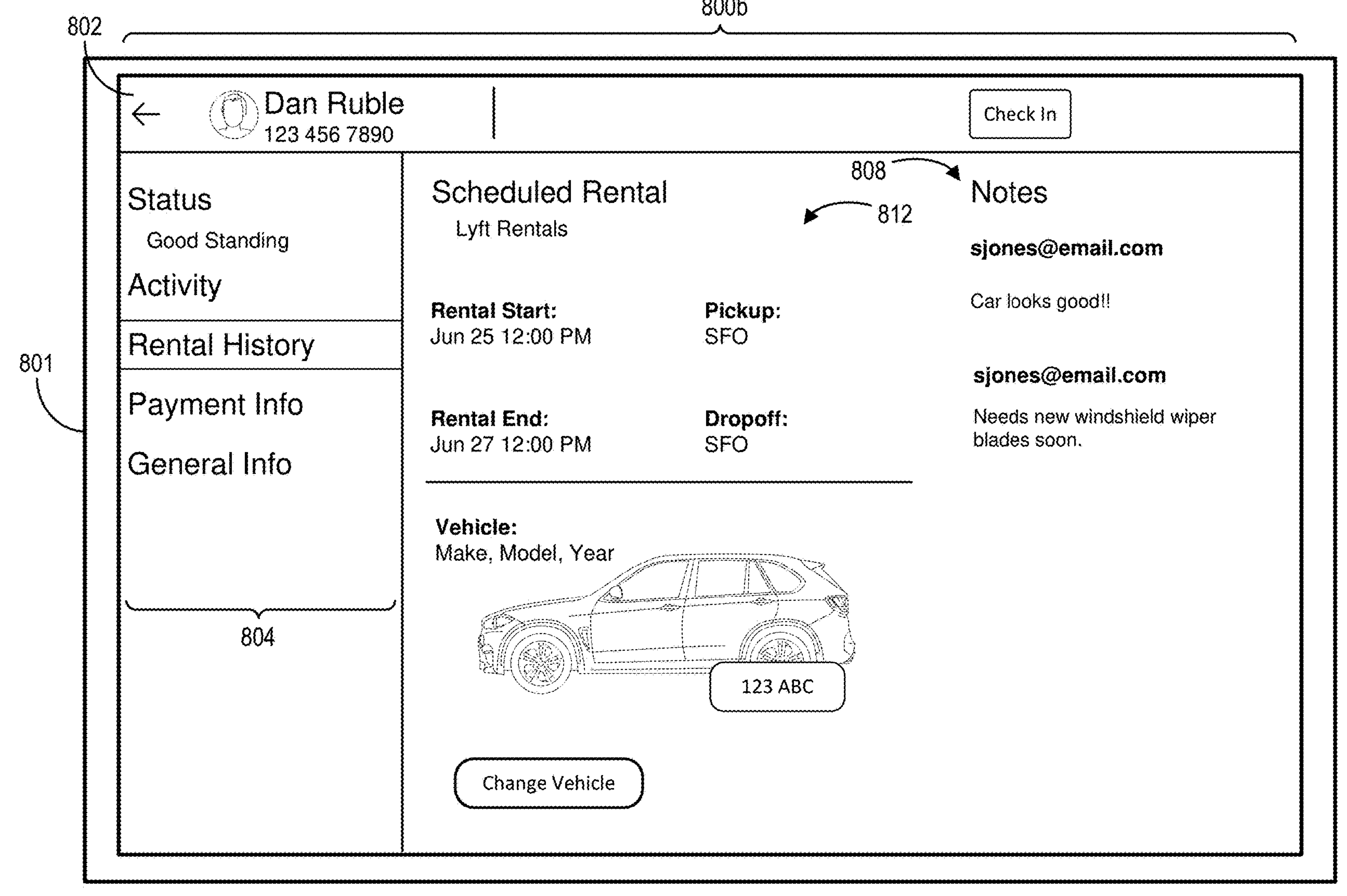

In addition to providing fleet-location-management interfaces corresponding to various fleet locations, the fleet management system 116 can also generate and provide renter-activity summaries corresponding to particular renters and/or renter accounts. As mentioned briefly above, the fleet management system 116 can provide a renter-activity summary corresponding to a renter based on a user selection of a renter indicator corresponding to the renter from the vehicle-data summary 760 in FIG. 7C. FIGS. 8A-8B illustrate example graphical user interfaces including renter-activity summaries corresponding to "Dan Ruble."

FIG. 8A illustrates a computing device 801 displaying a renter-activity summary 800*a*. As shown in FIG. 8A, the computing device 801 displays the renter-activity summary 800*a* including a renter indicator 802. The renter indicator 802 includes a renter name, renter identification number, and renter profile photo. Similar to the discussion above with regard to FIG. 7C, the renter indicator 802 can also or alternatively include a username or account identifier corresponding to a renter.

As further shown in FIG. 8A, the computing device 801 displays a sidebar 804 including various selectable tabs for different renter-activity data within the renter-activity summary 800*a*. In FIG. 8A, an activity tab is selected. However, the sidebar 804 also includes tabs for rental history, payment information, and general information. The fleet management system 116 can provide vehicle data corresponding to each category to the computing device 801 for presentation in the renter-activity summary 800*a*.

As further shown in FIG. 8A, the renter-activity summary 800*a* includes an activity section 806. In one or more embodiments, the fleet management system 116 generates the activity section 806 including various system activities corresponding to the renter. For example, in FIG. 8A, the activity section 806 lists "Checked in at SFO Lyft Location," "Started Lyft Rentals Contract," and "Message sent to Anthony Maseda." However, the fleet management system 116 can generate an activity section including a variety of activities undergone by a renter related to a particular rental vehicle or the fleet management system 116.

As further shown in FIG. 8A, the renter-activity summary 800*a* also includes a notes section 808. The notes section 808 includes notes about the rental account received by the fleet management system 116 from various computing devices. For example, the fleet management system 116 can include notes from a vehicle-service-computing device and/or a rental-location-computing device. In FIG. 8A, the notes section 808 includes the notes "Car looks good! !" and "Needs new windshield wiper blades soon." In one or more embodiments, the fleet management system 116 receives these notes from vehicle-service computing devices and/or rental-location computing devices as user input corresponding to the renter account. Additionally, the notes have a corresponding email address or handle indicating the note's author. In addition or in the alternative to the notes shown in FIG. 8A, the fleet management system 116 can receive and provide a variety of notes from a variety of computing devices.

FIG. 8B illustrates the computing device 801 displays a renter-activity summary 800*b* with the "Rental History" tab selected at the sidebar 804. As shown in FIG. 8B, the computing device 801 displays a rental history section 812 within the renter-activity summary 800*b*. The rental history section 812 includes details for rental reservations associated with the renter of the renter-activity summary 800*b*. FIG. 8B shows the rental history section 812 including a rental reservation from June 25 to June 27 at SFO for a particular fleet rental vehicle. However, the fleet management system 116 can generate the rental history section 812 to include a variety of rental reservations in the past, present, and future.

In one or more embodiments, the computing device may also display additional vehicle information corresponding to other tabs in the sidebar 804. For example, in one or more embodiments, in response to detecting user selection of the "payment info," the computing device 801 displays information corresponding to renter payments. Additionally, in some embodiments, in response to detecting user selection of "general info," the computing device 801 displays renter profile and/or demographic information of the renter.

Figure 9:
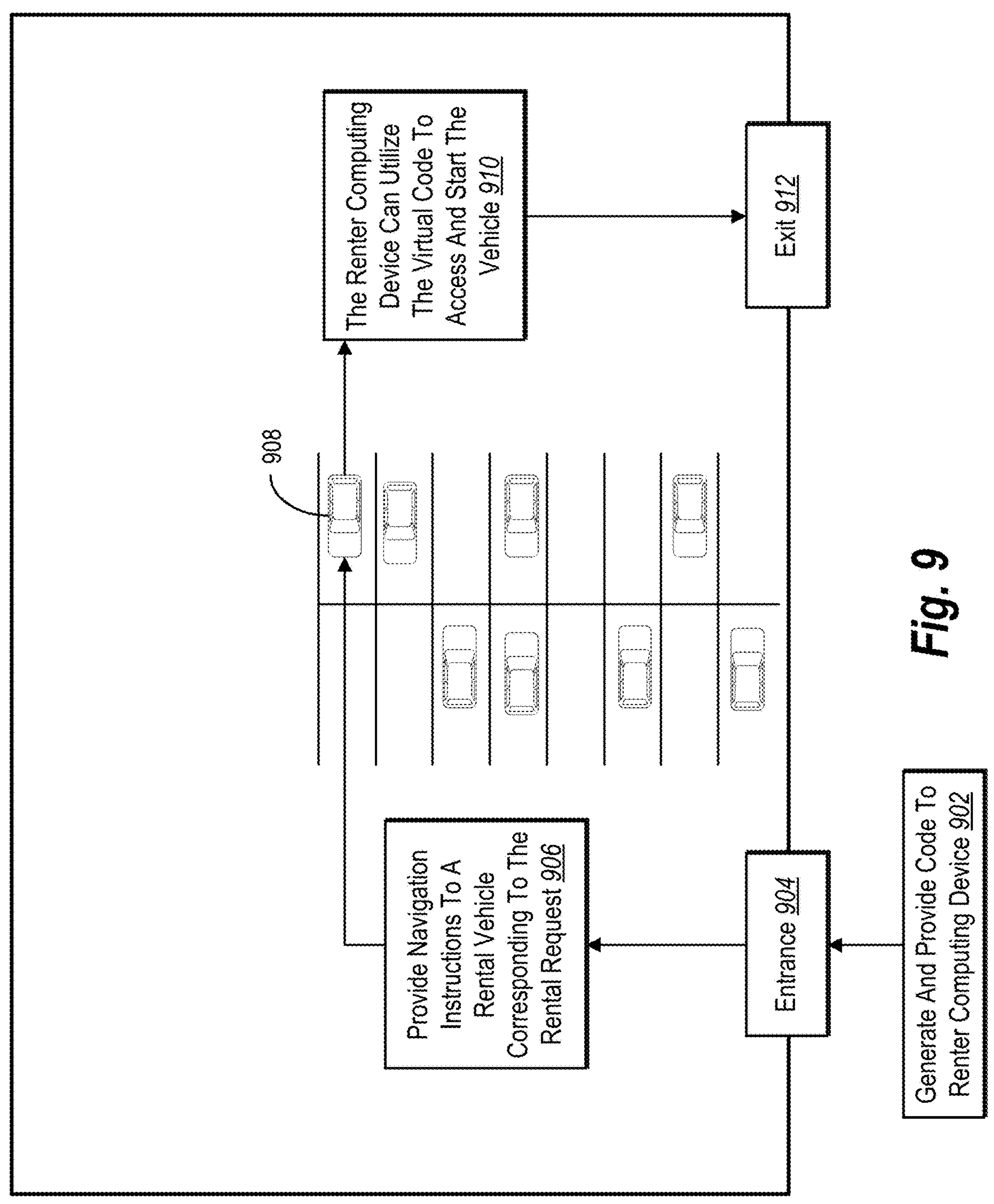
FIG. 9 illustrates an example process of the fleet management system utilizing a virtual code for contactless pickup of a rental vehicle in accordance with one or more embodiments.

As discussed briefly above, the fleet management system 116 can facilitate contactless pick-up of a vehicle utilizing a virtual code. FIG. 9 illustrates an overview for the contactless vehicle pick-up process. More specifically, FIG. 9 illustrates the process of a renter computing device requesting access to a rental location, receiving navigation instructions to a rental car, requesting access to the rental car, and requesting to exit the rental location.

As shown in FIG. 9, the fleet management system 116 can perform an act 902 of generating and providing a virtual code to a renter computing device. More specifically, the fleet management system 116 can generate and store a virtual code associated with a particular fleet rental vehicle 908. As explained below, in some embodiments, the virtual code may constitute a radio frequency identification code, such as a Near Field Communications ("NFC") code for an NFC coil.

In one or more embodiments, the fleet management system 116 provides the virtual code to a renter computing device upon confirming a rental reservation. In addition or in the alternative, the fleet management system 116 can provide the virtual code to the renter computing device at a predetermined time prior to a scheduled pick-up. The fleet management system 116 can also provide the virtual code to the renter computing device upon receiving payment details from the renter computing device.

As further shown in FIG. 9, the fleet management system 116 provides the renter computing device access to the entrance 904 of the rental location. In one or more embodiments, the fleet management system 116 utilizes a computing device at the entrance 904 of the rental location to receive the virtual code. In response to receiving the virtual code at the entrance 904 of the rental location, the fleet management system 116 can provide access to the rental location. More specifically, the fleet management system 116 can determine that the received virtual code corresponds to a rental vehicle 908 at the rental location. In one or more embodiments, in response to determining that the received virtual code corresponds to the rental vehicle 908 at the rental location, the fleet management system 116 provides the renter computing device access to the entrance 904 of the rental location.

After providing access to the rental location, the fleet management system 116 performs an act 906 of providing navigation instructions to a rental vehicle corresponding to the rental request. The fleet management system 116 determines a parking location corresponding to the rental vehicle 908 based on vehicle data received from a rental-location-computing device and/or from an in-vehicle-computing device. Accordingly, the fleet management system 116 can provide the renter computing device with navigation instructions to the specific parking location of the rental vehicle 908 corresponding to the rental request.

As also shown in FIG. 9, the renter computing device can perform an act 910 of utilizing the virtual code to access and start the vehicle. More specifically, the fleet management system 116 can transmit the virtual code to an in-vehicle-computing device in the rental vehicle 908. In one or more embodiments, the rental vehicle 908 includes an in-vehicle-computing device connected to an on-board diagnostics port of the rental vehicle 908. In addition or in the alternative, the rental vehicle 908 can include an in-vehicle-computing device integrated during manufacture of the rental vehicle 908. In one or more embodiments, the in-vehicle-computing device can provide keyless access to the rental vehicle 908 based on receiving its corresponding virtual code.

In some embodiments, the virtual code is a radio frequency identification code, including a near field communication code. To illustrate, the fleet management system 116 can utilize an NFC code to communicate wirelessly between two devices across short differences. For example, in some embodiments, the rental vehicle 908 includes an NFC coil mounted to the windshield or dashboard of the rental vehicle 908. In some cases, the NFC coil is part of a telematics device. In addition or in the alternative, the NFC coil is plugged into the on-board diagnostics port of the rental vehicle 908 and/or spliced into a vehicle harness. In some embodiments, the NFC coil communicates with the rental vehicle 908 utilizing a controller area network corresponding to the rental vehicle 908.

The NFC coil sends and receives information exchanged at short distances. Based on detecting that the renter computing device transmitting the NFC code is within a proximity range of the NFC coil, the computing device in the rental vehicle 908 may unlock and otherwise enable access to the rental vehicle 908 and functions of the rental vehicle 908. Thus, the renter computing device can access the rental vehicle 908 without internet access.

By utilizing the NFC code or other virtual code, the fleet management system 116 can facilitate pick-up of a rental vehicle without utilizing a vehicle key (e.g. a physical key or key fob). To illustrate, in a rental vehicle with a push to start operation, the rental vehicle can include the key in an inaccessible location. The rental vehicle can provide power to the key only in response to receiving an indication of a detection of a corresponding virtual code. In some embodiments, the fleet management system 116 utilizes a key power module integrated into an on-board diagnostics port. In addition or in the alternative, the fleet management system 116 can utilize the key power module integrated using a T harness installed into the wiring harness behind it. In one or more embodiments, the key power module can include the NFC coil and/or LTE and NFC connectivity. Thus, the rental car can detect interaction from a renter computing device and can power the key to the rental vehicle based on the detected interaction.

As just indicated, in one or more embodiments, the in-vehicle-computing device can allow the renter and/or the renter computing device to start the rental vehicle 908 based on receiving the virtual code. Thus, the renter can start the rental vehicle 908 and drive the rental vehicle 908 out of the rental location through an exit 912. In one or more embodiments, the fleet management system 116 can utilize a rental-location-computing device at the exit 912 to monitor the movement of the rental vehicle 908 out of the rental location. Similar to the discussion above with regard to the entrance 904, the fleet management system 116 can utilize receiving the virtual code to allow removal of the rental vehicle 908 from the rental location. In one or more embodiments, the fleet management system utilizes virtual codes (e.g., for near field communications) as described in Abdulla.

Figure 10:
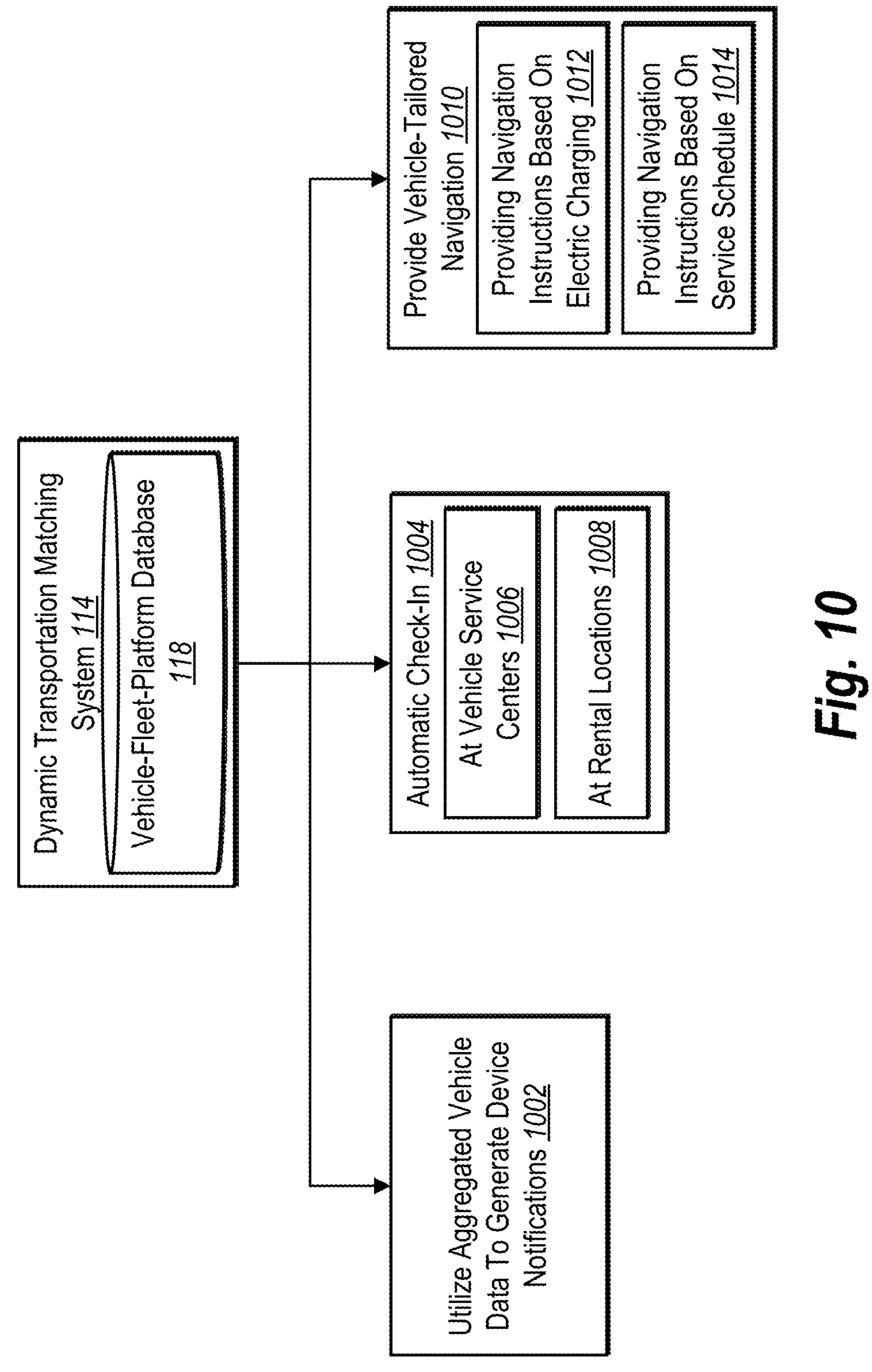
FIG. 10 illustrates the fleet management system using aggregated fleet vehicle information to send notifications, check in, tailored navigation and other individualized services for fleet vehicles in accordance with one or more embodiments.

As discussed above, the fleet management system 116 can utilize the vehicle-fleet-platform database 118 to perform a variety of acts based on vehicle data. FIG. 10 provides an overview of several examples of actions performed by the fleet management system 116. As illustrated in FIG. 10, the fleet management system 116 can perform an act 1002 of utilizing aggregated vehicle data to generate device notifications. To illustrate, the fleet management system 116 can receive a variety of information about a vehicle from in-vehicle-computing devices, including telematic devices. The fleet management system 116 can utilize this telematic data to generate notifications for a corresponding renter computing device.

For example, the fleet management system 116 can receive odometer readings from a telematic device corresponding to a rental vehicle. The fleet management system 116 can utilize this odometer reading in combination with a service history stored at the vehicle-fleet-platform database to determine that the rental vehicle is due for an oil change. Based on this determination, the fleet management system 116 can generate and provide a notification of the need for an oil change to a corresponding renter computing device.

Additionally, as shown in FIG. 10, the fleet management system 116 can utilize vehicle data to facilitate automatic check-in 1004 of rental vehicles at fleet-vehicle centers 1006 and at rental locations 1008. For example, in one or more embodiments, the fleet management system 116 can receive global positioning data from a renter computing device associated with a rental vehicle. The fleet management system 116 can utilize this global positioning data in combination with location data corresponding to the fleet-vehicle centers 1006 the rental locations 1008 to determine when a renter computing device is at a fleet location. In response to determining that a renter computing device is at a fleet location corresponding to a reservation stored at the vehicle-fleet-platform database 118, the fleet management system 116 can automatically check in the corresponding rental vehicle.

Further, as shown in FIG. 10, the fleet management system 116 can perform an act 1010 of providing vehicle-tailored navigation. To illustrate, the fleet management system 116 can perform an act 1012 of providing navigation instructions based on electric charging. In one or more embodiments, the fleet management system 116 can store the locations of electric charging stations in the vehicle-fleet-platform database 118. The fleet management system 116 can provide navigation instructions based on vehicle data regarding battery levels and capability such that the fleet vehicle will not run out of charge.

In addition, the fleet management system 116 can perform an act 1014 of providing navigation instructions based on a service schedule. In one or more embodiments, a provider-rental vehicle may provide for a dynamic transportation matching system around the time of a service reservation at a fleet-vehicle center. In one or more embodiments, the fleet management system 116 provides matches for the provider-rental vehicle to provide that will not interfere with the scheduled service. Further, the fleet management system 116 can provide navigational instructions to the fleet-vehicle center based on the time of the service reservation while a renter computing device is in a providing mode.

FIGS. 1-10, the corresponding text, and the examples provide several different systems, methods, techniques, components and/or devices of the fleet management system 116 in accordance with one or more embodiments. In addition to the above description, one or more embodiments can also be described in terms of flowcharts including acts for accomplishing a particular result. For example, FIG. 11 illustrates a flowchart of an example sequence of acts in accordance with one or more embodiments. In addition, the acts illustrated in FIG. 11 may be performed with more or fewer acts. Further, the acts may be performed in different orders. The acts described herein may be repeated or performed in parallel with one another or in parallel with different instances of the same or similar acts.

As mentioned, FIG. 11 illustrates a flowchart of a series of acts 1100 for aggregating vehicle data and generating vehicle-data summaries in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 for receiving vehicle data for a set of provider-rental vehicles and vehicle data for a set of personal-rental vehicles. In particular, the act 1102 can include receiving vehicle data for a set of provider-rental vehicles used in part for transporting requestors according to a provider-use rental and vehicle data for a set of personal-rental vehicles operated by a renter according to a personal-use rental. Similarly, the act 1102 can include receiving vehicle data based on data inputs associated with a set of provider-rental vehicles used in part by providers for transporting requestors according to a provider-use rental and vehicle data based on data inputs associated with a set of personal-rental vehicles operated by renters for self-transportation according to a personal-use rental. Specifically, the act 1102 can include wherein the set of provider-rental vehicles comprises a subset of flexible-provider-rental vehicles used in part by a subset of providers for transporting requestors under a first mileage scheme and a subset of express-provider-rental vehicles used in part by an additional subset of providers for transporting requestors under a second mileage scheme.

As further shown in FIG. 11, the series of acts 1100 optionally includes an act 1103 for identifying service data for vehicle service centers associated with the set of provider-renal vehicles and the set of personal-rental vehicles. In particular, the act 1003 can include identifying service data for one or more vehicle service centers associated with the set of provider-rental vehicles and the set of personal-rental vehicles.

As shown in FIG. 11, the series of acts 1100 also includes an act 1104 for aggregating the vehicle data and/or the service data for the set of provider-rental vehicles and the set of personal-rental vehicles. In particular, the act 1104 can include aggregating, into a vehicle-fleet-platform database, the vehicle data for the set of provider-rental vehicles and the vehicle data for the set of personal-rental vehicles. Alternatively, the act 1104 can include aggregating, into a vehicle-fleet-platform database, the vehicle data for the set of provider-rental vehicles, the vehicle data for the set of personal-rental vehicles, and the service data for the one or more vehicle service centers. Specifically, the act 1104 can include wherein the vehicle data comprises one or more of vehicle manufacturer, vehicle model, vehicle identification number, vehicle mileage, vehicle service history, vehicle warranty data, vehicle collision data, vehicle appointment data, current renter, or vehicle transportation history.

As shown in FIG. 11, the series of acts 1100 includes an act 1106 for generating vehicle-data summaries for the set of provider-rental vehicles and for the set of personal-rental vehicles based on the aggregated vehicle data. Alternatively, the act 1106 can include, based on the aggregated vehicle data and service data, generating, for display within a fleet management interface, vehicle-data summaries for the set of provider-rental vehicles with corresponding service information from the service data and vehicle-data summaries for the set of personal-rental vehicles with corresponding service information from the service data. In particular, the act 1106 can include generating, for display within a fleet management interface, vehicle-data summaries for the set of provider-rental vehicles and for the set of personal-rental providing, for display within the fleet management interface, a renter indicator for a particular renter associated with a vehicle-data summary from the vehicle-data summaries, receiving an indication of a user selection of the renter indicator, and based on the user selection of the renter indicator, providing a renter-activity summary of tracked activities from a rental account for the particular renter. The act 1106 can also include providing, for display on a computing device, a vehicle-data summary for a provider-rental vehicle or a personal-rental vehicle, the vehicle-data summary comprising a renter indicator for a particular renter; receive an indication of a user selection of the renter indicator; and, based on the user selection of the renter indicator, provide, for display on the computing device, a renter-activity summary of tracked activities from a rental account for the particular renter.

Specifically, the act 1106 can include receiving, from a vehicle-service-computing device, a vehicle-damage tag indicating damage to a first rental vehicle from the set of provider-rental vehicles or the set of personal-rental vehicles, receiving, from a vehicle computing device, a vehicle-maintenance tag indicating a vehicle part requiring maintenance detected by a telematics device of a second rental vehicle from the set of provider-rental vehicles or the set of personal-rental vehicles, and providing, for display within the fleet management interface, a first vehicle-data summary comprising the vehicle-damage tag for the first rental vehicle and a second vehicle-data summary comprising the vehicle-maintenance tag for the second rental vehicle. Further, in one or more embodiments, the act 1106 includes aggregating the vehicle data by aggregating service statuses indicating one of an active status, a maintenance status, a service status, or a damaged status, receiving, from a computing device, an indication of a user selection of a sorting option corresponding to the service statuses, and providing, for display within the fleet management interface, the vehicle-data summaries ordered according to the service statuses of the active status, the maintenance status, the service status, or the damaged status.

Also, in one or more embodiments, the act 1106 can include aggregating the vehicle data by aggregating vehicle manufacturers or vehicle models for the set of provider-rental vehicles and the set of personal-rental vehicles, receiving, from a computing device, an indication of a user selection of a sorting option corresponding to the vehicle manufacturers or the vehicle models, and providing, for display within the fleet management interface, the vehicle-data summaries ordered according to the vehicle manufacturers or the vehicle models. Additionally, in some embodiments, the act 1106 can include identifying fleet-vehicle centers and third-party-vehicle centers in a geographical region, determining services available at the fleet-vehicle centers and services available at the third-party-vehicle centers, and providing, for display within a fleet-location-management interface, identifiers for the fleet-vehicle centers and the third-party-vehicle centers and the services available at the fleet-vehicle centers and the third-party-vehicle centers. Also, the act 1106 can include identifying a subset of vehicle service centers and a subset of third-party-vehicle centers in a geographical region; determining services available at the subset of vehicle service centers and services available at the subset of third-party-vehicle centers; and providing, for display within a fleet-location-management interface, identifiers for the subset of vehicle service centers and the subset of third-party-vehicle centers and the services available at the subset of vehicle service centers and the subset of third-party-vehicle centers.

Additionally, in one or more embodiments, the series of acts 1100 includes receiving vehicle data for third-party-rental vehicles, assigning one or more of the third-party-rental vehicles to the set of provider-rental vehicles or the set of personal-rental vehicles, and aggregating, into the vehicle-fleet-platform database, the vehicle data for the third-party-rental vehicles as assigned to the set of provider-rental vehicles or the set of personal-rental vehicles. Further, in some embodiments, the series of acts 1100 includes receiving, from a computing device, updated vehicle data for a personal-rental vehicle indicating a change from a particular personal-use rental to a particular provider-user rental, based on the updated vehicle data, modifying a status for the personal-rental vehicle within the vehicle-fleet-platform database from the particular personal-use rental to the particular provider-use rental, and based on the modification to the particular provider-use rental, updating a vehicle-data summary for the personal-rental vehicle to become a provider-rental vehicle for display within the fleet management interface. Additionally, the series of acts 1100 can include receiving, from a computing device, updated vehicle data for a personal-rental vehicle; based on the updated vehicle data, determining a status change for the personal-rental vehicle within the vehicle-fleet-platform database from a particular personal-use rental to a particular provider-use rental; and, based on determining the status change to the particular provider-use rental, updating a vehicle-data summary for the personal-rental vehicle to become a provider-rental vehicle for display within a fleet management interface.

Further, the series of acts 1100 can include receiving, from a rental requestor device, a rental request corresponding to a rental vehicle from the set of provider-rental vehicles or the set of personal-rental vehicles, based on the rental request, generating a virtual code for the rental requestor device to send to an in-vehicle-computing device connected by an on-board-diagnostics port to the rental vehicle, and providing the virtual code to the rental requestor device to access and start the rental vehicle based on the rental request.

Additionally, the series of acts 1100 can include receiving, from a vehicle-service-computing device, a vehicle-damage tag indicating damage to a first rental vehicle from the set of provider-rental vehicles or the set of personal-rental vehicles; dispatching the first rental vehicle to a first vehicle service center from the one or more vehicle service centers based on the vehicle-damage tag; receiving, from a vehicle computing device, a vehicle-maintenance tag indicating a vehicle part requiring maintenance detected by a telematics device of a second rental vehicle from the set of provider-rental vehicles or the set of personal-rental vehicles; and dispatching the second rental vehicle to a second vehicle service center from the one or more vehicle service centers based on the vehicle-maintenance tag.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 12 illustrates, in block diagram form, an exemplary computing device 1200 (e.g., the server 113, the personal-renter-computing device 106, the provider-renter computing device 112, the third-party renter computing device 119, the rental-location-computing device 120, the vehicle-service-computing device 122, and/or the third-party device 124) that may be configured to perform one or more of the processes described above. One will appreciate that the fleet management system 116 can comprise implementations of the computing device 1200, including, but not limited to, the personal-renter-computing device(s) 106, provider-renter computing device 112, the third-party-renter computing device 119 and/or the server(s) 113. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, the processor 1202 includes hardware for executing instructions, such as those making up a computer program. As an example, and not by way of limitation, to execute instructions, the processor 1202 may retrieve (or fetch) the instructions from an internal register, an internal cache, memory 1204, or a storage device 1206 and decode and execute them.

The computing device 1200 includes memory 1204, which is coupled to the processor 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, storage device 1206 can comprise a non-transitory storage medium described above. The storage device 1206 may include a hard disk drive ("HDD"), flash memory, a Universal Serial Bus ("USB") drive or a combination of these or other storage devices.

The computing device 1200 also includes one or more input or output interface 1208 (or "I/O interface 1208"), which are provided to allow a user (e.g., requestor or provider) to provide input to (such as user strokes), receive output from, and otherwise transfer data to and from the computing device 1200. The I/O interface 1208 may include a mouse, keypad or a keyboard, a touch screen, camera, optical scanner, network interface, modem, other known I/O devices or a combination of such. The touch screen may be activated with a stylus or a finger.

The I/O interface 1208 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example, and not by way of limitation, communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can comprise hardware, software, or both that connects components of computing device 1200 to each other.

Figure 13:
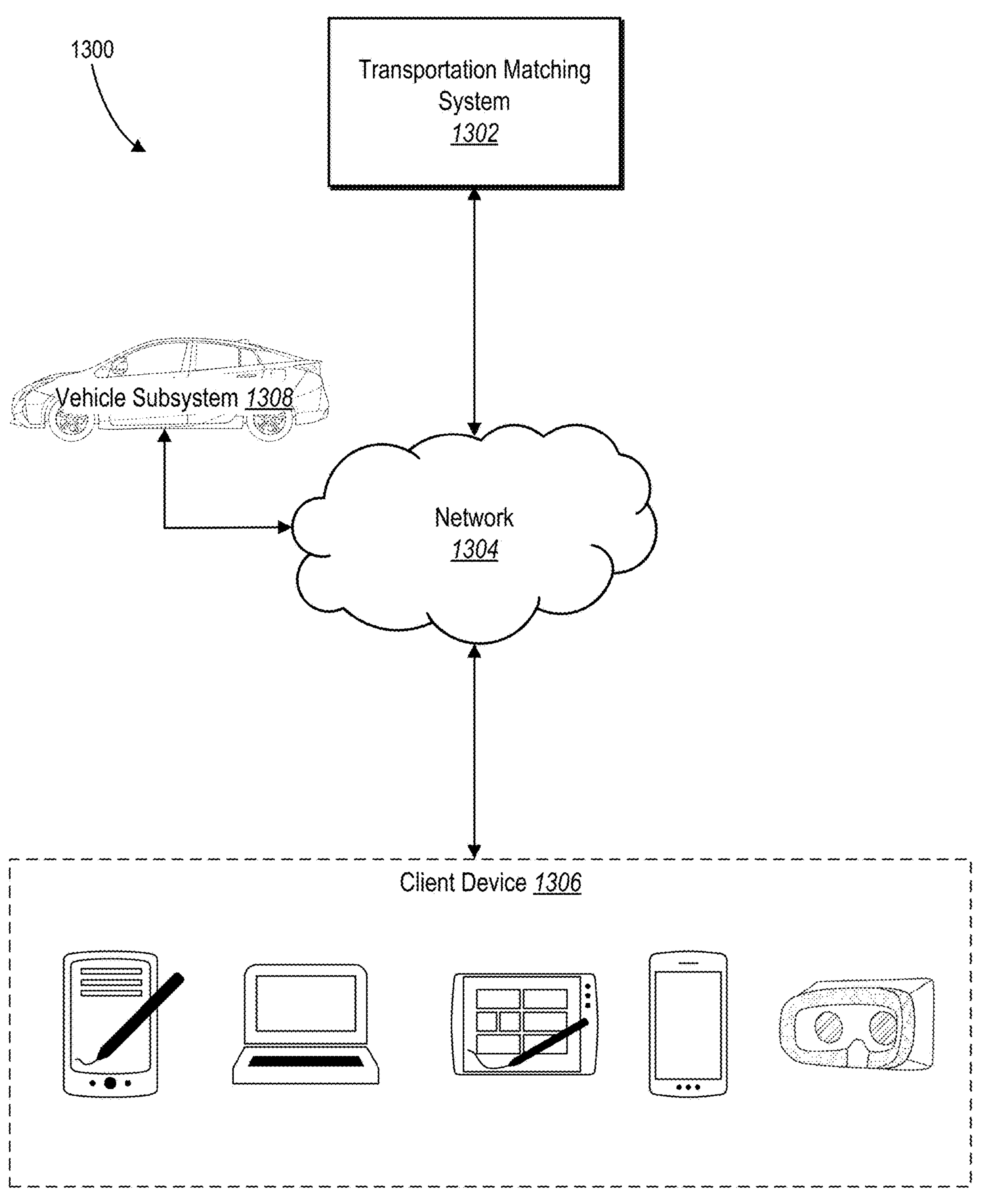
FIG. 13 illustrates an example environment for a dynamic transportation system in accordance with one or more embodiments.

FIG. 13 illustrates an example network environment 1300 of a dynamic transportation matching system 1302 (e.g. the dynamic transportation matching system 114). The network environment 1300 includes a client device 1306 (e.g., the personal-renter-computing device 106, the provider-renter-computing device 112, the third-party-vehicle-renter-computing device 119, the rental-location-computing device 120, the vehicle-service-computing device 122), the dynamic transportation matching system 114, and a vehicle subsystem 1308 connected to each other by a network 1304. Although FIG. 13 illustrates a particular arrangement of the client device 1306, the dynamic transportation matching system 114, the vehicle subsystem 1308, and the network 1304, this disclosure contemplates any suitable arrangement of client device 1306, the dynamic transportation matching system 114, the vehicle subsystem 1308, and the network 1304. As an example, and not by way of limitation, two or more of client device 1306, the dynamic transportation matching system 114, and the vehicle subsystem 1308 communicate directly, bypassing network 1304. As another example, two or more of client device 1306, the dynamic transportation matching system 114, and the vehicle subsystem 1308 may be physically or logically co-located with each other in whole or in part.

Moreover, although FIG. 13 illustrates a particular number of client devices 1306, dynamic transportation matching system 114, vehicle sub systems 1308, and networks 1304, this disclosure contemplates any suitable number of client devices 1306, dynamic transportation matching system 114, vehicle subsystems 1308, and networks 1304. As an example, and not by way of limitation, network environment 1300 may include multiple client device 1306, dynamic transportation matching system 114, vehicle sub systems 1308, and/or networks 1304.

This disclosure contemplates any suitable network 1304. As an example, and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, fleet management system 116, and vehicle subsystem 1308 to network 1304 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client device 1306 may be an electronic device including hardware, software, or embedded logic components or a combination of two or more such components and capable of carrying out the appropriate functionalities implemented or supported by client device 1306. As an example, and not by way of limitation, a client device 1306 may include any of the computing devices discussed above in relation to FIG. 13. A client device 1306 may enable a network user at the client device 1306 to access the network 1304. A client device 1306 may enable its user to communicate with other users at other client devices 1306.

In particular embodiments, the client device 1306 may include a requestor application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1306 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1306 one or more Hyper Text Markup Language ("HTML") files responsive to the HTTP request. The client device 1306 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, dynamic transportation matching system 114 may be a network-addressable computing system that can host a transportation matching network. The dynamic transportation matching system 114 may generate, store, receive, and send data, such as, for example, user-profile data, concept-profile data, text data, transportation request data, GPS location data, provider data, requestor data, vehicle data, or other suitable data related to the transportation matching network. This may include authenticating the identity of providers and/or vehicles who are authorized to provide transportation services through the dynamic transportation matching system 114. In addition, the dynamic transportation matching system 114 may manage identities of service requestors such as users/requestors. In particular, the dynamic transportation matching system 114 may maintain requestor data such as driving/riding histories, personal data, or other user data in addition to navigation and/or traffic management services or other location services (e.g., GPS services).

In particular embodiments, the dynamic transportation matching system 114 may manage transportation matching services to connect a user/requestor with a vehicle and/or provider. By managing the transportation matching services, the dynamic transportation matching system 114 can manage the distribution and allocation of resources from vehicle systems and user resources such as GPS location and availability indicators, as described herein.

The dynamic transportation matching system 114 may be accessed by the other components of network environment 1300 either directly or via network 1304. In particular embodiments, the dynamic transportation matching system 114 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the dynamic transportation matching system 114 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1306, or a dynamic transportation matching system 114 to manage, retrieve, modify, add, or delete, the information stored in data store.

In particular embodiments, the dynamic transportation matching system 114 may provide users with the ability to take actions on various types of items or objects, supported by the dynamic transportation matching system 114. As an example, and not by way of limitation, the items and objects may include transportation matching networks to which users of the dynamic transportation matching system 114 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the dynamic transportation matching system 114 or by an external system of a third-party system, which is separate from dynamic transportation matching system 114 and coupled to the dynamic transportation matching system 114 via a network 1304.

In particular embodiments, the dynamic transportation matching system 114 may be capable of linking a variety of entities. As an example, and not by way of limitation, the dynamic transportation matching system 114 may enable users to interact with each other or other entities, or to allow users to interact with these entities through an application programming interface ("API") or other communication channels.

In particular embodiments, the dynamic transportation matching system 114 may include a variety of servers, sub-systems, programs, modules, logs, and data stores. In particular embodiments, the dynamic transportation matching system 114 may include one or more of the following: a web server, action logger, API-request server, relevanceand-ranking engine, content-object classifier, notification controller, action log, third-party-content-object-exposure log, inference module, authorization/privacy server, search module, advertisement-targeting module, user-interface module, user-profile (e.g., provider profile or requestor profile) store, connection store, third-party content store, or location store. The dynamic transportation matching system 114 may also include suitable components such as network interfaces, security mechanisms, load balancers, failover servers, management-and-network-operations consoles, other suitable components, or any suitable combination thereof. In particular embodiments, the dynamic transportation matching system 114 may include one or more user-profile stores for storing user profiles for transportation providers and/or transportation requestors. A user profile may include, for example, biographic information, demographic information, behavioral information, social information, or other types of descriptive information, such as interests, affinities, or location.

The web server may include a mail server or other messaging functionality for receiving and routing messages between the dynamic transportation matching system 114 and one or more client devices 1306. An action logger may be used to receive communications from a web server about a user's actions on or off the dynamic transportation matching system 114. In conjunction with the action log, a third-party-content-object log may be maintained of user exposures to third-party-content objects. A notification controller may provide information regarding content objects to a client device 1306. Information may be pushed to a client device 1306 as notifications, or information may be pulled from client device 1306 responsive to a request received from client device 1306. Authorization servers may be used to enforce one or more privacy settings of the users of the dynamic transportation matching system 114. A privacy setting of a user determines how particular information associated with a user can be shared. The authorization server may allow users to opt in to or opt out of having their actions logged by the dynamic transportation matching system 114 or shared with other systems, such as, for example, by setting appropriate privacy settings. Third-party-content-object stores may be used to store content objects received from third parties. Location stores may be used for storing location information received from client devices 1306 associated with users.

In addition, the vehicle subsystem 1308 can include a human-operated vehicle or an autonomous vehicle. A provider of a human-operated vehicle can perform maneuvers to pick up, transport, and drop off one or more requestors according to the embodiments described herein. In certain embodiments, the vehicle subsystem 1308 can include an autonomous vehicle—i.e., a vehicle that does not require a human operator. In these embodiments, the vehicle subsystem 1308 can perform maneuvers, communicate, and otherwise function without the aid of a human provider, in accordance with available technology.

In particular embodiments, the vehicle subsystem 1308 may include one or more sensors incorporated therein or associated thereto. For example, sensor(s) can be mounted on the top of the vehicle subsystem 1308 or else can be located within the interior of the vehicle subsystem 1308. In certain embodiments, the sensor(s) can be located in multiple areas at once—i.e., split up throughout the vehicle subsystem 1308 so that different components of the sensor(s) can be placed in different locations in accordance with optimal operation of the sensor(s). In these embodiments, the sensor(s) can include motion-related components such as an inertial measurement unit ("IMU") including one or more accelerometers, one or more gyroscopes, and one or more magnetometers. The sensor(s) can additionally or alternatively include a wireless IMU ("WIMU"), one or more cameras, one or more microphones, or other sensors or data input devices capable of receiving and/or recording information relating to navigating a route to pick up, transport, and/or drop off a requestor.

In particular embodiments, the vehicle subsystem 1308 may include a communication device capable of communicating with the client device 1306 and/or the fleet management system 116. For example, the vehicle subsystem 1308 can include an on-board computing device communicatively linked to the network 1304 to transmit and receive data such as GPS location information, sensor-related information, requestor location information, or other relevant information.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:

at least one processor; and a non-transitory computer-readable medium comprising instructions that, when executed by the at least one processor, cause the system to:

generate a set of application programming interface (API) calls, each API call corresponding to a respective data source of a plurality of data sources;

issue the set of API calls to the plurality of data sources;

receive, based on issuing the set of API calls, vehicle data based on data inputs associated with a set of provider-rental vehicles designated for use in part by transportation providers for fulfilling transportation requests from requestor devices according to a provider-use rental;

receive, based on issuing the set of API calls, vehicle data based on data inputs associated with a set of personal-rental vehicles designated for operation by renters for self-transportation according to a personal-use rental;

identify service data for one or more vehicle service centers associated with the set of provider-rental vehicles and the set of personal-rental vehicles;

receive, from one or more on-board diagnostics vehicle ports, telematic measurements taken by physical telematic computing devices in communication with the one or more on-board diagnostics vehicle ports;

aggregate, into an aggregated dataset, the vehicle data for the set of provider-rental vehicles comprising data indicating a designation for the provider-use rental, the vehicle data for the set of personal-rental vehicles comprising data indicating a designation for the personal-use rental, the telematic measurements, and the service data for the one or more vehicle service centers;

generate a vehicle-fleet-platform database that indicates the aggregated dataset that includes information from the plurality of data sources in response to issuing the set of API calls;

provide, based on retrieving information from the vehicle-fleet-platform database that indicates the aggregated dataset, an integrated fleet management interface comprising vehicle-data summaries for the set of provider-rental vehicles indicating the designation for provider-use rental and the set of personal-rental vehicles indicating the designation for personal-use rental;

receive a rental request comprising an indication of intent for use in part by transportation providers for fulfilling transportation requests from requestor devices according to a provider-use rental via a transportation matching system;

generate a rental match for the rental request utilizing the vehicle data for the set of provider-rental vehicles comprising data indicating a designation for the provider-use rental, the vehicle data for the set of personal-rental vehicles comprising data indicating a designation for the personal-use rental, and the service data for the one or more vehicle service centers comprising a service status of the vehicle indicated by the rental match;

continuously update a vehicle-data summary corresponding to the rental match based on transportation data received via the transportation matching system;

identify a set of mobile service vehicles in a geographical region;

determine services available at the set of mobile service vehicles;

generate, based on the vehicle-data summary corresponding to the rental match and vehicle supplies corresponding to the set of mobile service vehicles, a mobile service vehicle match; and automatically dispatch, via computer executable instructions from one or more computing devices of the system in response to generating the mobile service vehicle match, a mobile service vehicle corresponding to the mobile service vehicle match to the vehicle indicated by the rental match based on the telematic measurements from the physical telematic computing devices indicating vehicle repair services are due, wherein dispatching the mobile service vehicle comprises autonomously maneuvering the mobile service vehicle using at least one motion-related component mounted on top of or within an interior of the mobile service vehicle.

2. The system as recited in claim 1, further comprising instructions that, when executed by the at least one processor, cause the system to:

receive the vehicle data for third-party-rental vehicles;

assign one or more of the third-party-rental vehicles to the set of personal-rental vehicles; and aggregate, into the vehicle-fleet-platform database, the vehicle data for the third-party-rental vehicles as assigned to the set of personal-rental vehicles.

3. The system as recited in claim 1, further comprising instructions that, when executed by the at least one processor, cause the system to:

receive, from a computing device, updated vehicle data for a personal-rental vehicle;

based on the updated vehicle data, determine a status change for the personal-rental vehicle within the vehicle-fleet-platform database from a particular personal-use rental to a particular provider-use rental;

based on determining the status change to the particular provider-use rental, update the vehicle-data summary for the personal-rental vehicle to become a provider-rental vehicle for display within a fleet management interface; and generate an additional rental match for an additional provider-use rental request utilizing the vehicle-data summary for the personal-rental vehicle.

4. The system as recited in claim 1, further comprising instructions that, when executed by the at least one processor, cause the system to:

provide, for display on a computing device, the vehicle-data summary for a provider-rental vehicle or a personal-rental vehicle, the vehicle-data summary comprising a renter indicator for a particular renter;

receive an indication of a user selection of the renter indicator; and based on the user selection of the renter indicator, provide, for display on the computing device, a renter-activity summary of tracked activities from a rental account for the particular renter.

5. The system as recited in claim 1, wherein the set of provider-rental vehicles comprises a subset of flexible-provider-rental vehicles used in part by a subset of providers for transporting requestors under a first mileage scheme that dictates personal mileage based on miles driven by a corresponding provider account in providing transportation services and a subset of express-provider-rental vehicles used in part by an additional subset of providers for transporting requestors under a second mileage scheme that dictates personal mileage based on user selection.

6. The system as recited in claim 1, further comprising instructions that, when executed by the at least one processor, cause the system to:

receive, from a vehicle-service-computing device, a vehicle-damage tag indicating damage to a first rental vehicle from the set of provider-rental vehicles or the set of personal-rental vehicles;

dispatch the first rental vehicle to a first vehicle service center from the one or more vehicle service centers based on the vehicle-damage tag;

receive, from a vehicle computing device, a vehicle-maintenance tag indicating a vehicle part requiring maintenance detected by a telematics device of a second rental vehicle from the set of provider-rental vehicles or the set of personal-rental vehicles; and dispatch the second rental vehicle to a second vehicle service center from the one or more vehicle service centers based on the vehicle-maintenance tag.

7. The system as recited in claim 1, further comprising instructions that, when executed by the at least one processor, cause the system to:

automatically dispatch an autonomous vehicle for the rental match by transmitting, to the autonomous vehicle, computer executable instructions from the one or more computing devices of the system.

8. The system as recited in claim 1, further comprising instructions that, when executed by the at least one processor, cause the system to:

receive, from a rental requestor device, the rental request corresponding to a rental vehicle from the set of provider-rental vehicles or the set of personal-rental vehicles;

based on the rental request, generate a radio frequency identification code for the rental requestor device to send to an in-vehicle-computing device connected by an on-board-diagnostics port to the rental vehicle; and provide the radio frequency identification code to the rental requestor device to access and start the rental vehicle based on the rental request.

9. A non-transitory computer-readable medium comprising instructions that, when executed by at least one processor, cause a computing device to:

generate a set of application programming interface (API) calls, each API call corresponding to a respective data source of a plurality of data sources;

issue the set of API calls to the plurality of data sources;

receive, based on issuing the set of API calls, vehicle data based on data inputs associated with a set of provider-rental vehicles designated for use in part by transportation providers for fulfilling transportation requests from requestor devices according to a provider-use rental;

receive, based on issuing the set of API calls, vehicle data based on data inputs associated with a set of personal-rental vehicles designated for operation by renters for self-transportation according to a personal-use rental;

identify service data for one or more vehicle service centers associated with the set of provider-rental vehicles and the set of personal-rental vehicles;

receive, from one or more on-board diagnostics vehicle ports, telematic measurements taken by physical telematic computing devices in communication with the one or more on-board diagnostics vehicle ports;

aggregate, into an aggregated dataset, the vehicle data for the set of provider-rental vehicles comprising data indicating a designation for the provider-use rental, the vehicle data for the set of personal-rental vehicles comprising data indicating a designation for the personal-use rental, the telematic measurements, and the service data for the one or more vehicle service centers;

generate a vehicle-fleet-platform database that indicates the aggregated dataset that includes information from the plurality of data sources in response to issuing the set of API calls;

based on the vehicle-fleet-platform database, generate, for display within a fleet management interface:

vehicle-data summaries for the set of provider-rental vehicles comprising the designation for provider-use rental and corresponding service information from the service data; and vehicle-data summaries for the set of personal-rental vehicles comprising the designation for personal-use rental and corresponding service information from the service data;

receive a rental request comprising an indication of intent for use in part by transportation providers for fulfilling transportation requests from requestor devices according to a provider-use rental via a transportation matching system;

generate a rental match for the rental request utilizing the vehicle data for the set of provider-rental vehicles comprising data indicating a designation for the provider-use rental, the vehicle data for the set of personal-rental vehicles comprising data indicating a designation for the personal-use rental, and the service data for the one or more vehicle service centers comprising a service status of the vehicle indicated by the rental match;

continuously update a vehicle-data summary corresponding to the rental match based on transportation data received via the transportation matching system;

identify a set of mobile service vehicles in a geographical region;

determine services available at the set of mobile service vehicles;

generate, based on the vehicle-data summary corresponding to the rental match and vehicle supplies corresponding to the set of mobile service vehicles, a mobile service vehicle match; and automatically dispatch, via computer executable instructions from one or more computing devices of the system in response to generating the mobile service vehicle match, a mobile service vehicle corresponding to the mobile service vehicle match to the vehicle indicated by the rental match based on the telematic measurements from the physical telematic computing devices indicating vehicle repair services are due, wherein dispatching the mobile service vehicle comprises autonomously maneuvering the mobile service vehicle using at least one motion-related component mounted on top of or within an interior of the mobile service vehicle.

10. The non-transitory computer-readable medium as recited in claim 9, further comprising instructions, that when executed by the at least one processor, cause the computing device to:

aggregate the vehicle data by aggregating vehicle manufacturers or vehicle models for the set of provider-rental vehicles and the set of personal-rental vehicles;

receive, from an additional computing device, an indication of a user selection of a sorting option corresponding to the vehicle manufacturers or the vehicle models; and provide, for display within the fleet management interface, the vehicle-data summaries ordered according to the vehicle manufacturers or the vehicle models.

11. The non-transitory computer-readable medium as recited in claim 9, further comprising instructions, that when executed by the at least one processor, cause the computing device to, before displaying the fleet management interface:

identify a subset of vehicle service centers and a subset of third-party-vehicle centers in the geographical region;

determine services available at the subset of vehicle service centers and services available at the subset of third-party-vehicle centers; and provide, for display within a fleet-location-management interface, identifiers for the subset of vehicle service centers and the subset of third-party-vehicle centers and the services available at the subset of vehicle service centers and the subset of third-party-vehicle centers.

12. The non-transitory computer-readable medium as recited in claim 9, further comprising instructions, that when executed by the at least one processor, cause the computing device to:

receive, from a vehicle-service-computing device, a vehicle-damage tag indicating damage to a first rental vehicle from the set of provider-rental vehicles or the set of personal-rental vehicles;

receive, from a vehicle computing device, a vehicle-maintenance tag indicating a vehicle part requiring maintenance detected by a telematics device of a second rental vehicle from the set of provider-rental vehicles or the set of personal-rental vehicles; and provide, for display within the fleet management interface, a first vehicle-data summary comprising the vehicle-damage tag for the first rental vehicle and a second vehicle-data summary comprising the vehicle-maintenance tag for the second rental vehicle.

13. A method comprising:

generating a set of application programming interface (API) calls, each API call corresponding to a respective data source of a plurality of data sources;

issuing the set of API calls to the plurality of data sources;

receiving, based on issuing the set of API calls, vehicle data based on data inputs associated with a set of provider-rental vehicles designated for use in part by transportation providers for fulfilling transportation requests from requestor devices according to a provider-use rental;

receiving, based on issuing the set of API calls, vehicle data based on data inputs associated with a set of personal-rental vehicles designated for operation by renters for self-transportation according to a personal-use rental;

identifying service data for one or more vehicle service centers associated with the set of provider-rental vehicles and the set of personal-rental vehicles;

receiving, from one or more on-board diagnostics vehicle ports, telematic measurements taken by physical telematic computing devices in communication with the one or more on-board diagnostics vehicle ports;

aggregating, into an aggregated dataset, the vehicle data for the set of provider-rental vehicles comprising data indicating a designation for the provider-use rental, the vehicle data for the set of personal-rental vehicles comprising data indicating a designation for the personal-use rental, and the telematic measurements;

generating a vehicle-fleet-platform database that indicates the aggregated dataset that includes information from the plurality of data sources in response to issuing the set of API calls;

generating, based on retrieving information from the vehicle-fleet-platform database that indicates the aggregated dataset and for display within an integrated fleet management interface, vehicle-data summaries for the set of provider-rental vehicles and for the set of personal-rental vehicles based on the aggregated vehicle data;

providing the integrated fleet management interface comprising vehicle-data summaries for the set of provider-rental vehicles indicating the designation for provider-use rental and the set of personal-rental vehicles indicating the designation for personal-use rental;

receiving a rental request comprising an indication of intent for use in part by transportation providers for fulfilling transportation requests from requestor devices according to a provider-use rental via a transportation matching system;

generating a rental match for the rental request utilizing the vehicle data for the set of provider-rental vehicles comprising data indicating a designation for the provider-use rental, the vehicle data for the set of personal-rental vehicles comprising data indicating a designation for the personal-use rental, and the service data for the one or more vehicle service centers comprising a service status of the vehicle indicated by the rental match;

continuously updating a vehicle-data summary corresponding to the rental match based on transportation data received via the transportation matching system;

identifying a set of mobile service vehicles in a geographical region;

determining services available at the set of mobile service vehicles;

generating, based on the vehicle-data summary corresponding to the rental match and vehicle supplies corresponding to the set of mobile service vehicles, a mobile service vehicle match; and automatically dispatching, via computer executable instructions from one or more computing devices of the system in response to generating the mobile service vehicle match, a mobile service vehicle corresponding to the mobile service vehicle match to the vehicle indicated by the rental match based on the telematic measurements from the physical telematic computing devices indicating vehicle repair services are due, wherein dispatching the mobile service vehicle comprises autonomously maneuvering the mobile service vehicle using at least one motion-related component mounted on top of or within an interior of the mobile service vehicle.

14. The method of claim 13, further comprising:

aggregating the vehicle data by aggregating service statuses indicating one of an active status, a maintenance status, a service status, or a damaged status;

receiving, from a computing device, an indication of a user selection of a sorting option corresponding to the service statuses;

providing, for display within the integrated fleet management interface, the vehicle-data summaries ordered according to the service statuses of the active status, the maintenance status, the service status, or the damaged status; and providing, within the vehicle-data summaries, vehicle rental statuses within the integrated fleet management interface.

15. The method of claim 13, further comprising:

aggregating the vehicle data by aggregating vehicle manufacturers or vehicle models for the set of provider-rental vehicles and the set of personal-rental vehicles;

receiving, from a computing device, an indication of a user selection of a sorting option corresponding to the vehicle manufacturers or the vehicle models; and providing, for display within the integrated fleet management interface, the vehicle-data summaries ordered according to the vehicle manufacturers or the vehicle models.

16. The method of claim 13, further comprising, before displaying the integrated fleet management interface:

identifying fleet-vehicle centers and third-party-vehicle centers in the geographical region;

determining services available at the fleet-vehicle centers and services available at the third-party-vehicle centers; and providing, for display within a fleet-location-management interface, identifiers for the fleet-vehicle centers and the third-party-vehicle centers and the services available at the fleet-vehicle centers and the third-party-vehicle centers.

17. The method of claim 13, further comprising:

receiving the vehicle data from renter computing devices, telematic computing devices, in-vehicle-computing devices, rental-location-computing devices, and vehicle-service-computing devices; and aggregating the vehicle data from the renter computing devices, the telematic computing devices, the in-vehicle-computing devices, the rental-location-computing devices, and the vehicle-service-computing devices into the vehicle-data summary.

18. The method of claim 13, further comprising:

receiving, from a vehicle-service-computing device, a vehicle-damage tag indicating damage to a first rental vehicle from the set of provider-rental vehicles or the set of personal-rental vehicles;

receiving, from a vehicle computing device, a vehicle-maintenance tag indicating a vehicle part requiring maintenance detected by a telematics device of a second rental vehicle from the set of provider-rental vehicles or the set of personal-rental vehicles; and providing, for display within the integrated fleet management interface, a first vehicle-data summary comprising the vehicle-damage tag for the first rental vehicle and a second vehicle-data summary comprising the vehicle-maintenance tag for the second rental vehicle.

19. The method of claim 13, further comprising:

receiving, from a computing device, updated vehicle data for a personal-rental vehicle indicating a change from a particular personal-use rental to a particular provider-use rental;

based on the updated vehicle data, modifying a status for the personal-rental vehicle within the vehicle-fleet-platform database from the particular personal-use rental to the particular provider-use rental; and based on the modified status forte the particular provider-use rental, updating a vehicle-data summary for the personal-rental vehicle to become a provider-rental vehicle for display within the integrated fleet management interface.

20. The method of claim 13, further comprising:

providing, for display within the integrated fleet management interface, a renter indicator for a particular renter associated with a vehicle-data summary from the vehicle-data summaries;

receiving an indication of a user selection of the renter indicator; and based on the user selection of the renter indicator, providing a renter-activity summary of tracked activities from a rental account for the particular renter.

* * * * *